US012284479B2

(12) United States Patent
Veselinovic et al.

(10) Patent No.: US 12,284,479 B2
(45) Date of Patent: Apr. 22, 2025

(54) AUTO FOCUS, AUTO FOCUS WITHIN REGIONS, AND AUTO PLACEMENT OF BEAMFORMED MICROPHONE LOBES WITH INHIBITION FUNCTIONALITY

(71) Applicant: Shure Acquisition Holdings, Inc., Niles, IL (US)

(72) Inventors: Dusan Veselinovic, Chicago, IL (US); Mathew T. Abraham, Colorado Springs, CO (US); Michael Ryan Lester, Colorado Springs, CO (US); Avinash K. Vaidya, Riverwoods, IL (US)

(73) Assignee: Shure Acquisition Holdings, Inc., Niles, IL (US)

( * ) Notice: Subject to any disclaimer, the term of this patent is extended or adjusted under 35 U.S.C. 154(b) by 0 days.

(21) Appl. No.: 18/450,190

(22) Filed: Aug. 15, 2023

(65) Prior Publication Data

US 2024/0244367 A1 Jul. 18, 2024

Related U.S. Application Data

(63) Continuation of application No. 17/929,467, filed on Sep. 2, 2022, now Pat. No. 11,778,368, which is a continuation of application No. 16/826,115, filed on Mar. 20, 2020, now Pat. No. 11,438,691.

(60) Provisional application No. 62/971,648, filed on Feb. 7, 2020, provisional application No. 62/855,187, filed (Continued)

(51) Int. Cl.
*H04R 1/32* (2006.01)
*H04R 3/00* (2006.01)

(52) U.S. Cl.
CPC ............ *H04R 1/326* (2013.01); *H04R 3/005* (2013.01)

(58) Field of Classification Search
None
See application file for complete search history.

(56) References Cited

U.S. PATENT DOCUMENTS

| | | | |
|---|---|---|---|
| 1,535,408 | A | 4/1925 | Fricke |
| 1,540,788 | A | 6/1925 | McClure |
| 1,965,830 | A | 7/1934 | Hammer |

(Continued)

FOREIGN PATENT DOCUMENTS

| | | |
|---|---|---|
| AU | 2004200802 | 3/2004 |
| CA | 2359771 | 4/2003 |

(Continued)

OTHER PUBLICATIONS

Soda et al., Introducing Multiple Microphone Arrays for Enhancing Smart Home Voice Control, The Institute of Electronics, Information and Communication Engineers, Technical Report of IEICE, Jan. 2013, 6 pgs.

(Continued)

*Primary Examiner* — Paul W Huber
(74) *Attorney, Agent, or Firm* — Neal, Gerber & Eisenberg LLP

(57) ABSTRACT

Array microphone systems and methods that can automatically focus and/or place beamformed lobes in response to detected sound activity are provided. The automatic focus and/or placement of the beamformed lobes can be inhibited based on a remote far end audio signal. The quality of the coverage of audio sources in an environment may be improved by ensuring that beamformed lobes are optimally picking up the audio sources even if they have moved and changed locations.

24 Claims, 18 Drawing Sheets

Related U.S. Application Data on May 31, 2019, provisional application No. 62/821,800, filed on Mar. 21, 2019.

(56) References Cited

U.S. PATENT DOCUMENTS

| | | | |
|---|---|---|---|
| 2,075,588 | A | 3/1937 | Meyers |
| 2,113,219 | A | 4/1938 | Olson |
| 2,164,655 | A | 7/1939 | Kleerup |
| D122,771 | S | 10/1940 | Doner |
| 2,233,412 | A | 3/1941 | Hill |
| 2,268,529 | A | 12/1941 | Stiles |
| 2,343,037 | A | 2/1944 | Adelman |
| 2,377,449 | A | 6/1945 | Prevette |
| 2,481,250 | A | 9/1949 | Schneider |
| 2,521,603 | A | 9/1950 | Prew |
| 2,533,565 | A | 12/1950 | Eichelman |
| 2,539,671 | A | 1/1951 | Olson |
| 2,777,232 | A | 1/1957 | Kulicke |
| 2,828,508 | A | 4/1958 | Labarre |
| 2,840,181 | A | 6/1958 | Wildman |
| 2,882,633 | A | 4/1959 | Howell |
| 2,912,605 | A | 11/1959 | Tibbetts |
| 2,938,113 | A | 5/1960 | Schnell |
| 2,950,556 | A | 8/1960 | Larios |
| 3,019,854 | A | 2/1962 | Obryant |
| 3,132,713 | A | 5/1964 | Seeler |
| 3,143,182 | A | 8/1964 | Sears |
| 3,160,225 | A | 12/1964 | Sechrist |
| 3,161,975 | A | 12/1964 | McMillan |
| 3,205,601 | A | 9/1965 | Gawne |
| 3,239,973 | A | 3/1966 | Hannes |
| 3,240,883 | A | 3/1966 | Seeler |
| 3,310,901 | A | 3/1967 | Sarkisian |
| 3,321,170 | A | 5/1967 | Vye |
| 3,509,290 | A | 4/1970 | Mochida |
| 3,573,399 | A | 4/1971 | Schroeder |
| 3,657,490 | A | 4/1972 | Scheiber |
| 3,696,885 | A | 10/1972 | Grieg |
| 3,755,625 | A | 8/1973 | Maston |
| 3,828,508 | A | 8/1974 | Moeller |
| 3,857,191 | A | 12/1974 | Sadorus |
| 3,895,194 | A | 7/1975 | Fraim |
| 3,906,431 | A | 9/1975 | Clearwaters |
| D237,103 | S | 10/1975 | Fisher |
| 3,936,606 | A | 2/1976 | Wanke |
| 3,938,617 | A | 2/1976 | Forbes |
| 3,941,638 | A | 3/1976 | Horky |
| 3,992,584 | A | 11/1976 | Dugan |
| 4,007,461 | A | 2/1977 | Luedtke |
| 4,008,408 | A | 2/1977 | Kodama |
| 4,029,170 | A | 6/1977 | Phillips |
| 4,032,725 | A | 6/1977 | McGee |
| 4,070,547 | A | 1/1978 | Dellar |
| 4,072,821 | A | 2/1978 | Bauer |
| 4,096,353 | A | 6/1978 | Bauer |
| 4,127,156 | A | 11/1978 | Brandt |
| 4,131,760 | A | 12/1978 | Christensen |
| 4,169,219 | A | 9/1979 | Beard |
| 4,184,048 | A | 1/1980 | Alcaide |
| 4,198,705 | A | 4/1980 | Massa |
| D255,234 | S | 6/1980 | Wellward |
| D256,015 | S | 7/1980 | Doherty |
| 4,212,133 | A | 7/1980 | Lufkin |
| 4,237,339 | A | 12/1980 | Bunting |
| 4,244,096 | A | 1/1981 | Kashichi |
| 4,244,906 | A | 1/1981 | Heinemann |
| 4,254,417 | A | 3/1981 | Speiser |
| 4,275,694 | A | 6/1981 | Nagaishi |
| 4,296,280 | A | 10/1981 | Richie |
| 4,305,141 | A | 12/1981 | Massa |
| 4,308,425 | A | 12/1981 | Momose |
| 4,311,874 | A | 1/1982 | Wallace, Jr. |
| 4,330,691 | A | 5/1982 | Gordon |
| 4,334,740 | A | 6/1982 | Wray |
| 4,365,449 | A | 12/1982 | Liautaud |
| 4,373,191 | A | 2/1983 | Fette |
| 4,393,631 | A | 7/1983 | Krent |
| 4,414,433 | A | 11/1983 | Horie |
| 4,429,850 | A | 2/1984 | Weber |
| 4,436,966 | A | 3/1984 | Botros |
| 4,449,238 | A | 5/1984 | Lee |
| 4,466,117 | A | 8/1984 | Rudolf |
| 4,485,484 | A | 11/1984 | Flanagan |
| 4,489,442 | A | 12/1984 | Anderson |
| 4,518,826 | A | 5/1985 | Caudill |
| 4,521,908 | A | 6/1985 | Miyaji |
| 4,566,557 | A | 1/1986 | Lemaitre |
| 4,593,404 | A | 6/1986 | Bolin |
| 4,594,478 | A | 6/1986 | Gumb |
| D285,067 | S | 8/1986 | Delbuck |
| 4,625,827 | A | 12/1986 | Bartlett |
| 4,653,102 | A | 3/1987 | Hansen |
| 4,658,425 | A | 4/1987 | Julstrom |
| 4,669,108 | A | 5/1987 | Deinzer |
| 4,675,906 | A | 6/1987 | Sessler |
| 4,693,174 | A | 9/1987 | Anderson |
| 4,696,043 | A | 9/1987 | Iwahara |
| 4,712,231 | A | 12/1987 | Julstrom |
| 4,741,038 | A | 4/1988 | Elko |
| 4,752,961 | A | 6/1988 | Kahn |
| 4,768,086 | A | 8/1988 | Paist |
| 4,805,730 | A | 2/1989 | O'Neill |
| 4,815,132 | A | 3/1989 | Minami |
| 4,860,366 | A | 8/1989 | Fukushi |
| 4,862,507 | A | 8/1989 | Woodard |
| 4,866,868 | A | 9/1989 | Kass |
| 4,881,135 | A | 11/1989 | Heilweil |
| 4,888,807 | A | 12/1989 | Reichel |
| 4,903,247 | A | 2/1990 | Van Gerwen |
| 4,923,032 | A | 5/1990 | Nuernberger |
| 4,928,312 | A | 5/1990 | Hill |
| 4,969,197 | A | 11/1990 | Takaya |
| 5,000,286 | A | 3/1991 | Crawford |
| 5,038,935 | A | 8/1991 | Wenkman |
| 5,058,170 | A | 10/1991 | Kanamori |
| 5,088,574 | A | 2/1992 | Kertesz, III |
| D324,780 | S | 3/1992 | Sebesta |
| 5,121,426 | A | 6/1992 | Baumhauer |
| D329,239 | S | 9/1992 | Hahn |
| 5,189,701 | A | 2/1993 | Jain |
| 5,204,907 | A | 4/1993 | Staple |
| 5,214,709 | A | 5/1993 | Ribic |
| 5,224,170 | A | 6/1993 | Waite, Jr. |
| D340,718 | S | 10/1993 | Leger |
| 5,289,544 | A | 2/1994 | Franklin |
| D345,346 | S | 3/1994 | Alfonso |
| D345,379 | S | 3/1994 | Chan |
| 5,297,210 | A | 3/1994 | Julstrom |
| 5,322,979 | A | 6/1994 | Cassity |
| 5,323,459 | A | 6/1994 | Hirano |
| 5,329,593 | A | 7/1994 | Lazzeroni |
| 5,335,011 | A | 8/1994 | Addeo |
| 5,353,279 | A | 10/1994 | Koyama |
| 5,359,374 | A | 10/1994 | Schwartz |
| 5,371,789 | A | 12/1994 | Hirano |
| 5,383,293 | A | 1/1995 | Royal |
| 5,384,843 | A | 1/1995 | Masuda |
| 5,396,554 | A | 3/1995 | Hirano |
| 5,400,413 | A | 3/1995 | Kindel |
| D363,045 | S | 10/1995 | Phillips |
| 5,473,701 | A | 12/1995 | Cezanne |
| 5,509,634 | A | 4/1996 | Gebka |
| 5,513,265 | A | 4/1996 | Hirano |
| 5,525,765 | A | 6/1996 | Freiheit |
| 5,550,924 | A | 8/1996 | Helf |
| 5,550,925 | A | 8/1996 | Hori |
| 5,555,447 | A | 9/1996 | Kotzin |
| 5,574,793 | A | 11/1996 | Hirschhorn |
| 5,602,962 | A | 2/1997 | Kellermann |
| 5,612,929 | A | 3/1997 | Lopes |
| 5,633,936 | A | 5/1997 | Oh |
| 5,645,257 | A | 7/1997 | Ward |
| D382,118 | S | 8/1997 | Ferrero |
| 5,657,393 | A | 8/1997 | Crow |

(56) References Cited

U.S. PATENT DOCUMENTS

| | | | |
|---|---|---|---|
| 5,661,813 | A | 8/1997 | Shimauchi |
| 5,673,327 | A | 9/1997 | Julstrom |
| 5,687,229 | A | 11/1997 | Sih |
| 5,706,344 | A | 1/1998 | Finn |
| 5,715,319 | A | 2/1998 | Chu |
| 5,717,171 | A | 2/1998 | Miller |
| D392,977 | S | 3/1998 | Kim |
| D394,061 | S | 5/1998 | Fink |
| 5,761,318 | A | 6/1998 | Shimauchi |
| 5,766,702 | A | 6/1998 | Lin |
| 5,787,183 | A | 7/1998 | Chu |
| 5,796,819 | A | 8/1998 | Romesburg |
| 5,848,146 | A | 12/1998 | Slattery |
| 5,870,482 | A | 2/1999 | Loeppert |
| 5,878,147 | A | 3/1999 | Killion |
| 5,888,412 | A | 3/1999 | Sooriakumar |
| 5,888,439 | A | 3/1999 | Miller |
| D416,315 | S | 11/1999 | Nanjo |
| 5,978,211 | A | 11/1999 | Hong |
| 5,991,277 | A | 11/1999 | Maeng |
| 6,035,962 | A | 3/2000 | Lin |
| 6,039,457 | A | 3/2000 | O'Neal |
| 6,041,127 | A | 3/2000 | Elko |
| 6,049,607 | A | 4/2000 | Marash |
| D424,538 | S | 5/2000 | Hayashi |
| 6,069,961 | A | 5/2000 | Nakazawa |
| 6,125,179 | A | 9/2000 | Wu |
| D432,518 | S | 10/2000 | Muto |
| 6,128,395 | A | 10/2000 | De Vries |
| 6,137,887 | A | 10/2000 | Anderson |
| 6,144,746 | A | 11/2000 | Azima |
| 6,151,399 | A | 11/2000 | Killion |
| 6,173,059 | B1 | 1/2001 | Huang |
| 6,198,831 | B1 | 3/2001 | Azima |
| 6,205,224 | B1 | 3/2001 | Underbrink |
| 6,215,881 | B1 | 4/2001 | Azima |
| 6,266,427 | B1 | 7/2001 | Mathur |
| 6,285,770 | B1 | 9/2001 | Azima |
| 6,301,357 | B1 | 10/2001 | Romesburg |
| 6,329,908 | B1 | 12/2001 | Frecska |
| 6,332,029 | B1 | 12/2001 | Azima |
| D453,016 | S | 1/2002 | Nevill |
| 6,386,315 | B1 | 5/2002 | Roy |
| 6,393,129 | B1 | 5/2002 | Conrad |
| 6,424,635 | B1 | 7/2002 | Song |
| 6,442,272 | B1 | 8/2002 | Osovets |
| 6,449,593 | B1 | 9/2002 | Valve |
| 6,481,173 | B1 | 11/2002 | Roy |
| 6,488,367 | B1 | 12/2002 | Debesis |
| D469,090 | S | 1/2003 | Tsuji |
| 6,505,057 | B1 | 1/2003 | Finn |
| 6,507,659 | B1 | 1/2003 | Iredale |
| 6,510,919 | B1 | 1/2003 | Roy |
| 6,526,147 | B1 | 2/2003 | Rung |
| 6,556,682 | B1 | 4/2003 | Gilloire |
| 6,592,237 | B1 | 7/2003 | Pledger |
| 6,622,030 | B1 | 9/2003 | Romesburg |
| D480,923 | S | 10/2003 | Neubourg |
| 6,633,647 | B1 | 10/2003 | Markow |
| 6,665,971 | B2 | 12/2003 | Lowry |
| 6,694,028 | B1 | 2/2004 | Matsuo |
| 6,704,422 | B1 | 3/2004 | Jensen |
| D489,707 | S | 5/2004 | Kobayashi |
| 6,731,334 | B1 | 5/2004 | Maeng |
| 6,741,720 | B1 | 5/2004 | Myatt |
| 6,757,393 | B1 | 6/2004 | Spitzer |
| 6,768,795 | B2 | 7/2004 | Feltstroem |
| 6,868,377 | B1 | 3/2005 | Laroche |
| 6,885,750 | B2 | 4/2005 | Egelmeers |
| 6,885,986 | B1 | 4/2005 | Gigi |
| D504,889 | S | 5/2005 | Andre |
| 6,889,183 | B1 | 5/2005 | Gunduzhan |
| 6,895,093 | B1 | 5/2005 | Ali |
| 6,931,123 | B1 | 8/2005 | Hughes |
| 6,944,312 | B2 | 9/2005 | Mason |
| D510,729 | S | 10/2005 | Chen |
| 6,968,064 | B1 | 11/2005 | Ning |
| 6,990,193 | B2 | 1/2006 | Beaucoup |
| 6,993,126 | B1 | 1/2006 | Kyrylenko |
| 6,993,145 | B2 | 1/2006 | Combest |
| 7,003,099 | B1 | 2/2006 | Zhang |
| 7,013,267 | B1 | 3/2006 | Huart |
| 7,031,269 | B2 | 4/2006 | Lee |
| 7,035,398 | B2 | 4/2006 | Matsuo |
| 7,035,415 | B2 | 4/2006 | Belt |
| 7,050,576 | B2 | 5/2006 | Zhang |
| 7,054,451 | B2 | 5/2006 | Janse |
| D526,643 | S | 8/2006 | Ishizaki |
| D527,372 | S | 8/2006 | Allen |
| 7,092,516 | B2 | 8/2006 | Furuta |
| 7,092,882 | B2 | 8/2006 | Arrowood |
| 7,098,865 | B2 | 8/2006 | Christensen |
| 7,106,876 | B2 | 9/2006 | Santiago |
| 7,120,269 | B2 | 10/2006 | Lowell |
| 7,130,309 | B2 | 10/2006 | Boaz |
| D533,177 | S | 12/2006 | Andre |
| 7,149,320 | B2 | 12/2006 | Haykin |
| 7,161,534 | B2 | 1/2007 | Tsai |
| 7,187,765 | B2 | 3/2007 | Popovic |
| 7,203,308 | B2 | 4/2007 | Kubota |
| D542,543 | S | 5/2007 | Bruce |
| 7,212,628 | B2 | 5/2007 | Popovic |
| D546,318 | S | 7/2007 | Yoon |
| D546,814 | S | 7/2007 | Takita |
| D547,748 | S | 7/2007 | Tsuge |
| 7,239,714 | B2 | 7/2007 | De Blok |
| D549,673 | S | 8/2007 | Niitsu |
| 7,269,263 | B2 | 9/2007 | Dedieu |
| D552,570 | S | 10/2007 | Niitsu |
| D559,553 | S | 1/2008 | Mischel |
| 7,333,476 | B2 | 2/2008 | LeBlanc |
| D566,685 | S | 4/2008 | Koller |
| 7,359,504 | B1 | 4/2008 | Reuss |
| 7,366,310 | B2 | 4/2008 | Stinson |
| 7,387,151 | B1 | 6/2008 | Payne |
| 7,412,376 | B2 | 8/2008 | Florencio |
| 7,415,117 | B2 | 8/2008 | Tashev |
| D578,509 | S | 10/2008 | Thomas |
| D581,510 | S | 11/2008 | Albano |
| D582,391 | S | 12/2008 | Morimoto |
| D587,709 | S | 3/2009 | Niitsu |
| D589,605 | S | 3/2009 | Reedy |
| 7,503,616 | B2 | 3/2009 | Linhard |
| 7,515,719 | B2 | 4/2009 | Hooley |
| 7,536,769 | B2 | 5/2009 | Pedersen |
| D595,402 | S | 6/2009 | Miyake |
| D595,736 | S | 7/2009 | Son |
| 7,558,381 | B1 | 7/2009 | Ali |
| 7,561,700 | B1 | 7/2009 | Bernardi |
| 7,565,949 | B2 | 7/2009 | Tojo |
| D601,585 | S | 10/2009 | Andre |
| 7,651,390 | B1 | 1/2010 | Profeta |
| 7,660,428 | B2 | 2/2010 | Rodman |
| 7,667,728 | B2 | 2/2010 | Kenoyer |
| 7,672,445 | B1 | 3/2010 | Zhang |
| D613,338 | S | 4/2010 | Marukos |
| 7,701,110 | B2 | 4/2010 | Fukuda |
| 7,702,116 | B2 | 4/2010 | Stone |
| D614,871 | S | 5/2010 | Tang |
| 7,724,891 | B2 | 5/2010 | Beaucoup |
| D617,441 | S | 6/2010 | Koury |
| 7,747,001 | B2 | 6/2010 | Kellermann |
| 7,756,278 | B2 | 7/2010 | Moorer |
| 7,783,063 | B2 | 8/2010 | Pocino |
| 7,787,328 | B2 | 8/2010 | Chu |
| 7,830,862 | B2 | 11/2010 | James |
| 7,831,035 | B2 | 11/2010 | Stokes |
| 7,831,036 | B2 | 11/2010 | Beaucoup |
| 7,856,097 | B2 | 12/2010 | Tokuda |
| 7,881,486 | B1 | 2/2011 | Killion |
| 7,894,421 | B2 | 2/2011 | Kwan |
| D636,188 | S | 4/2011 | Kim |
| 7,925,006 | B2 | 4/2011 | Hirai |
| 7,925,007 | B2 | 4/2011 | Stokes |

(56) References Cited

U.S. PATENT DOCUMENTS 7,936,886 B2 5/2011 Kim
7,970,123 B2 6/2011 Beaucoup
7,970,151 B2 6/2011 Oxford
D642,385 S 8/2011 Lee
D643,015 S 8/2011 Kim
7,991,167 B2 8/2011 Oxford
7,995,768 B2 8/2011 Miki
8,000,481 B2 8/2011 Nishikawa
8,005,238 B2 8/2011 Tashev
8,019,091 B2 9/2011 Burnett
8,041,054 B2 10/2011 Yeldener
8,059,843 B2 11/2011 Hung
8,064,629 B2 11/2011 Jiang
8,085,947 B2 12/2011 Haulick
8,085,949 B2 12/2011 Kim
8,095,120 B1 1/2012 Blair
8,098,842 B2 1/2012 Florencio
8,098,844 B2 1/2012 Elko
8,103,030 B2 1/2012 Barthel
8,109,360 B2 2/2012 Stewart, Jr.
8,112,272 B2 2/2012 Nagahama
8,116,500 B2 2/2012 Oxford
8,121,834 B2 2/2012 Rosec
D655,271 S 3/2012 Park
D656,473 S 3/2012 Laube
8,130,969 B2 3/2012 Buck
8,130,977 B2 3/2012 Chu
8,135,143 B2 3/2012 Ishibashi
8,144,886 B2 3/2012 Ishibashi
D658,153 S 4/2012 Woo
8,155,331 B2 4/2012 Nakadai
8,170,882 B2 5/2012 Davis
8,175,291 B2 5/2012 Chan
8,175,871 B2 5/2012 Wang
8,184,801 B1 5/2012 Hamalainen
8,189,765 B2 5/2012 Nishikawa
8,189,810 B2 5/2012 Wolff
8,194,863 B2 6/2012 Takumai
8,199,927 B1 6/2012 Raftery
8,204,198 B2 6/2012 Adeney
8,204,248 B2 6/2012 Haulick
8,208,664 B2 6/2012 Iwasaki
8,213,596 B2 7/2012 Beaucoup
8,213,634 B1 7/2012 Daniel
8,219,387 B2 7/2012 Cutler
8,229,134 B2 7/2012 Duraiswami
8,233,352 B2 7/2012 Beaucoup
8,243,951 B2 8/2012 Ishibashi
8,244,536 B2 8/2012 Arun
8,249,273 B2 8/2012 Inoda
8,259,959 B2 9/2012 Marton
8,275,120 B2 9/2012 Stokes, III
8,280,728 B2 10/2012 Chen
8,284,949 B2 10/2012 Farhang
8,284,952 B2 10/2012 Reining
8,286,749 B2 10/2012 Stewart
8,290,142 B1 10/2012 Lambert
8,291,670 B2 10/2012 Gard
8,297,402 B2 10/2012 Stewart
8,315,380 B2 11/2012 Liu
8,331,582 B2 12/2012 Steele
8,345,898 B2 1/2013 Reining
8,355,521 B2 1/2013 Larson
8,370,140 B2 2/2013 Guillaume
8,379,823 B2 2/2013 Ratmanski
8,385,557 B2 2/2013 Tashev
D678,329 S 3/2013 Lee
8,395,653 B2 3/2013 Feng
8,403,107 B2 3/2013 Stewart
8,406,436 B2 3/2013 Craven
8,428,661 B2 4/2013 Chen
8,433,061 B2 4/2013 Cutler
D682,266 S 5/2013 Wu
8,437,490 B2 5/2013 Marton
8,443,930 B2 5/2013 Stewart, Jr.
8,447,590 B2 5/2013 Ishibashi
8,472,639 B2 6/2013 Reining
8,472,640 B2 6/2013 Marton
D685,346 S 7/2013 Szymanski
D686,182 S 7/2013 Ashiwa
8,479,871 B2 7/2013 Stewart
8,483,398 B2 7/2013 Fozunbal
8,498,423 B2 7/2013 Thaden
D687,432 S 8/2013 Duan
8,503,653 B2 8/2013 Ahuja
8,515,089 B2 8/2013 Nicholson
8,515,109 B2 8/2013 Dittberner
8,522,263 B2 8/2013 Amada
8,526,633 B2 9/2013 Ukai
8,553,904 B2 10/2013 Said
8,559,611 B2 10/2013 Ratmanski
D693,328 S 11/2013 Goetzen
8,583,481 B2 11/2013 Viveiros
8,599,194 B2 12/2013 Lewis
8,600,443 B2 12/2013 Kawaguchi
8,605,890 B2 12/2013 Zhang
8,620,650 B2 12/2013 Walters
8,630,431 B2 1/2014 Gran
8,631,897 B2 1/2014 Stewart
8,634,569 B2 1/2014 Lu
8,638,951 B2 1/2014 Zurek
D699,712 S 2/2014 Bourne
8,644,477 B2 2/2014 Gilbert
8,654,955 B1 2/2014 Lambert
8,654,990 B2 2/2014 Faller
8,660,274 B2 2/2014 Wolff
8,660,275 B2 2/2014 Buck
8,670,581 B2 3/2014 Harman
8,672,087 B2 3/2014 Stewart
8,675,890 B2 3/2014 Schmidt
8,675,899 B2 3/2014 Jung
8,676,728 B1 3/2014 Velusamy
8,682,675 B2 3/2014 Togami
8,724,829 B2 5/2014 Visser
8,730,156 B2 5/2014 Weising
8,744,069 B2 6/2014 Cutler
8,744,101 B1 6/2014 Burns
8,755,536 B2 6/2014 Chen
8,787,560 B2 7/2014 Buck
8,811,601 B2 8/2014 Mohammad
8,818,002 B2 8/2014 Tashev
8,824,693 B2 9/2014 Per
8,842,851 B2 9/2014 Beaucoup
8,855,326 B2 10/2014 Derkx
8,855,327 B2 10/2014 Tanaka
8,861,713 B2 10/2014 Xu
8,861,756 B2 10/2014 Zhu
8,873,789 B2 10/2014 Bigeh
D717,272 S 11/2014 Kim
8,886,343 B2 11/2014 Ishibashi
8,893,849 B2 11/2014 Hudson
8,898,633 B2 11/2014 Bryant
D718,731 S 12/2014 Lee
8,903,106 B2 12/2014 Meyer
8,923,529 B2 12/2014 McCowan
8,929,564 B2 1/2015 Kikkeri
8,942,382 B2 1/2015 Elko
8,965,546 B2 2/2015 Visser
D725,059 S 3/2015 Kim
D725,631 S 3/2015 McNamara
8,976,977 B2 3/2015 De
8,983,089 B1 3/2015 Chu
8,983,834 B2 3/2015 Davis
D726,144 S 4/2015 Kang
D727,968 S 4/2015 Onoue
9,002,028 B2 4/2015 Haulick
D729,767 S 5/2015 Lee
9,038,301 B2 5/2015 Zelbacher
9,084,037 B2 7/2015 Derkx
9,088,336 B2 7/2015 Mani
9,094,496 B2 7/2015 Teutsch
D735,717 S 8/2015 Lam
D737,245 S 8/2015 Fan
9,099,094 B2 8/2015 Burnett

(56) References Cited

U.S. PATENT DOCUMENTS

| | | | |
|---|---|---|---|
| 9,107,001 | B2 | 8/2015 | Diethorn |
| 9,111,543 | B2 | 8/2015 | Per |
| 9,113,242 | B2 | 8/2015 | Hyun |
| 9,113,247 | B2 | 8/2015 | Chatlani |
| 9,126,827 | B2 | 9/2015 | Hsieh |
| 9,129,223 | B1 | 9/2015 | Velusamy |
| 9,140,054 | B2 | 9/2015 | Oberbroeckling |
| D740,279 | S | 10/2015 | Wu |
| 9,172,345 | B2 | 10/2015 | Kok |
| D743,376 | S | 11/2015 | Kim |
| D743,939 | S | 11/2015 | Seong |
| 9,196,261 | B2 | 11/2015 | Burnett |
| 9,197,974 | B1 | 11/2015 | Clark |
| 9,203,494 | B2 | 12/2015 | Tarighat Mehrabani |
| 9,215,327 | B2 | 12/2015 | Bathurst |
| 9,215,543 | B2 | 12/2015 | Sun |
| 9,226,062 | B2 | 12/2015 | Sun |
| 9,226,070 | B2 | 12/2015 | Hyun |
| 9,226,088 | B2 | 12/2015 | Pandey |
| 9,232,185 | B2 | 1/2016 | Graham |
| 9,237,391 | B2 | 1/2016 | Benesty |
| 9,247,367 | B2 | 1/2016 | Nobile |
| 9,253,567 | B2 | 2/2016 | Morcelli |
| 9,257,132 | B2 | 2/2016 | Gowreesunker |
| 9,264,553 | B2 | 2/2016 | Pandey |
| 9,264,805 | B2 | 2/2016 | Buck |
| 9,280,985 | B2 | 3/2016 | Tawada |
| 9,286,908 | B2 | 3/2016 | Zhang |
| 9,294,839 | B2 | 3/2016 | Lambert |
| 9,301,049 | B2 | 3/2016 | Elko |
| D754,103 | S | 4/2016 | Fischer |
| 9,307,326 | B2 | 4/2016 | Elko |
| 9,319,532 | B2 | 4/2016 | Bao |
| 9,319,799 | B2 | 4/2016 | Salmon |
| 9,326,060 | B2 | 4/2016 | Nicholson |
| D756,502 | S | 5/2016 | Lee |
| 9,330,673 | B2 | 5/2016 | Cho |
| 9,338,301 | B2 | 5/2016 | Pocino |
| 9,338,549 | B2 | 5/2016 | Haulick |
| 9,354,310 | B2 | 5/2016 | Visser |
| 9,357,080 | B2 | 5/2016 | Beaucoup |
| 9,403,670 | B2 | 8/2016 | Schelling |
| 9,426,598 | B2 | 8/2016 | Walsh |
| D767,748 | S | 9/2016 | Nakai |
| 9,451,078 | B2 | 9/2016 | Yang |
| D769,239 | S | 10/2016 | Li |
| 9,462,378 | B2 | 10/2016 | Kuech |
| 9,473,868 | B2 | 10/2016 | Huang |
| 9,479,627 | B1 | 10/2016 | Rung |
| 9,479,885 | B1 | 10/2016 | Ivanov |
| 9,489,948 | B1 | 11/2016 | Chu |
| 9,510,090 | B2 | 11/2016 | Lissek |
| 9,514,723 | B2 | 12/2016 | Silfvast |
| 9,516,412 | B2 | 12/2016 | Shigenaga |
| 9,521,057 | B2 | 12/2016 | Klingbeil |
| 9,549,245 | B2 | 1/2017 | Frater |
| 9,560,446 | B1 | 1/2017 | Chang |
| 9,560,451 | B2 | 1/2017 | Eichfeld |
| 9,565,493 | B2 | 2/2017 | Abraham |
| 9,565,507 | B2 | 2/2017 | Case |
| 9,578,413 | B2 | 2/2017 | Sawa |
| 9,578,440 | B2 | 2/2017 | Otto |
| 9,589,556 | B2 | 3/2017 | Gao |
| 9,591,123 | B2 | 3/2017 | Sorensen |
| 9,591,404 | B1 | 3/2017 | Chhetri |
| D784,299 | S | 4/2017 | Cho |
| 9,615,173 | B2 | 4/2017 | Sako |
| 9,628,596 | B1 | 4/2017 | Bullough |
| 9,635,186 | B2 | 4/2017 | Pandey |
| 9,635,474 | B2 | 4/2017 | Kuster |
| D787,481 | S | 5/2017 | Tyss |
| D788,073 | S | 5/2017 | Silvera |
| 9,640,187 | B2 | 5/2017 | Niemisto |
| 9,641,688 | B2 | 5/2017 | Pandey |
| 9,641,929 | B2 | 5/2017 | Li |
| 9,641,935 | B1 | 5/2017 | Ivanov |
| 9,653,091 | B2 | 5/2017 | Matsuo |
| 9,653,092 | B2 | 5/2017 | Sun |
| 9,655,001 | B2 | 5/2017 | Metzger |
| 9,659,576 | B1 | 5/2017 | Kotvis |
| D789,323 | S | 6/2017 | Mackiewicz |
| 9,674,604 | B2 | 6/2017 | Deroo |
| 9,692,882 | B2 | 6/2017 | Mani |
| 9,706,057 | B2 | 7/2017 | Mani |
| 9,716,944 | B2 | 7/2017 | Yliaho |
| 9,721,582 | B1 | 8/2017 | Huang |
| 9,734,835 | B2 | 8/2017 | Fujieda |
| 9,754,572 | B2 | 9/2017 | Salazar |
| 9,761,243 | B2 | 9/2017 | Taenzer |
| D801,285 | S | 10/2017 | Timmins |
| 9,788,119 | B2 | 10/2017 | Miikka |
| 9,813,806 | B2 | 11/2017 | Graham |
| 9,818,425 | B1 | 11/2017 | Ayrapetian |
| 9,818,426 | B2 | 11/2017 | Kotera |
| 9,826,211 | B2 | 11/2017 | Sawa |
| 9,854,101 | B2 | 12/2017 | Pandey |
| 9,854,363 | B2 | 12/2017 | Sladeczek |
| 9,860,439 | B2 | 1/2018 | Sawa |
| 9,866,952 | B2 | 1/2018 | Pandey |
| D811,393 | S | 2/2018 | Ahn |
| 9,894,434 | B2 | 2/2018 | Rollow, IV |
| 9,930,448 | B1 | 3/2018 | Chen |
| 9,936,290 | B2 | 4/2018 | Mohammad |
| 9,966,059 | B1 | 5/2018 | Ayrapetian |
| 9,973,848 | B2 | 5/2018 | Chhetri |
| 9,980,042 | B1 | 5/2018 | Benattar |
| D819,607 | S | 6/2018 | Chui |
| D819,631 | S | 6/2018 | Matsumiya |
| 10,015,589 | B1 | 7/2018 | Ebenezer |
| 10,021,506 | B2 | 7/2018 | Johnson |
| 10,021,515 | B1 | 7/2018 | Mallya |
| 10,034,116 | B2 | 7/2018 | Kadri |
| 10,038,769 | B2 | 7/2018 | Ukai |
| 10,054,320 | B2 | 8/2018 | Choi |
| 10,061,009 | B1 | 8/2018 | Family |
| 10,062,379 | B2 | 8/2018 | Katuri |
| 10,080,088 | B1 | 9/2018 | Yang |
| 10,153,744 | B1 | 12/2018 | Every |
| 10,165,386 | B2 | 12/2018 | Lehtiniemi |
| D841,589 | S | 2/2019 | Böhmer |
| 10,206,030 | B2 | 2/2019 | Matsumoto |
| 10,210,882 | B1 | 2/2019 | McCowan |
| 10,231,062 | B2 | 3/2019 | Pedersen |
| 10,244,121 | B2 | 3/2019 | Mani |
| 10,244,219 | B2 | 3/2019 | Sawa |
| 10,269,343 | B2 | 4/2019 | Wingate |
| 10,341,784 | B2 | 7/2019 | Recker |
| 10,366,702 | B2 | 7/2019 | Morton |
| 10,367,948 | B2 | 7/2019 | Wells-Rutherford |
| D857,873 | S | 8/2019 | Shimada |
| 10,389,861 | B2 | 8/2019 | Mani |
| 10,389,885 | B2 | 8/2019 | Sun |
| D860,319 | S | 9/2019 | Beruto |
| D860,997 | S | 9/2019 | Jhun |
| 10,425,727 | B2 | 9/2019 | Jost |
| D864,136 | S | 10/2019 | Kim |
| 10,440,469 | B2 | 10/2019 | Barnett |
| D865,723 | S | 11/2019 | Cho |
| 10,566,008 | B2 | 2/2020 | Thorpe |
| 10,602,267 | B2 | 3/2020 | Grosche |
| D883,952 | S | 5/2020 | Lucas |
| 10,650,797 | B2 | 5/2020 | Kumar |
| D888,020 | S | 6/2020 | Lyu |
| 10,728,653 | B2 | 7/2020 | Graham |
| D900,070 | S | 10/2020 | Lantz |
| D900,071 | S | 10/2020 | Lantz |
| D900,072 | S | 10/2020 | Lantz |
| D900,073 | S | 10/2020 | Lantz |
| D900,074 | S | 10/2020 | Lantz |
| 10,827,263 | B2 | 11/2020 | Christoph |
| 10,863,270 | B1 | 12/2020 | Cornelius |
| 10,930,297 | B2 | 2/2021 | Christoph |
| 10,959,018 | B1 | 3/2021 | Shi |
| 10,979,805 | B2 | 4/2021 | Chowdhary |

(56) References Cited

U.S. PATENT DOCUMENTS

| | | | |
|---|---|---|---|
| D924,189 | S | 7/2021 | Park |
| 11,109,133 | B2 | 8/2021 | Lantz |
| D940,116 | S | 1/2022 | Cho |
| 11,218,802 | B1 | 1/2022 | Kandadai |
| 11,310,592 | B2 | 4/2022 | Abraham |
| 2001/0031058 | A1 | 10/2001 | Anderson |
| 2002/0015500 | A1 | 2/2002 | Belt |
| 2002/0041679 | A1 | 4/2002 | Beaucoup |
| 2002/0048377 | A1 | 4/2002 | Vaudrey |
| 2002/0064158 | A1 | 5/2002 | Yokoyama |
| 2002/0064287 | A1 | 5/2002 | Kawamura |
| 2002/0069054 | A1 | 6/2002 | Arrowood |
| 2002/0110255 | A1 | 8/2002 | Killion |
| 2002/0126861 | A1 | 9/2002 | Colby |
| 2002/0131580 | A1 | 9/2002 | Smith |
| 2002/0140633 | A1 | 10/2002 | Rafii |
| 2002/0146282 | A1 | 10/2002 | Wilkes |
| 2002/0149070 | A1 | 10/2002 | Sheplak |
| 2002/0159603 | A1 | 10/2002 | Hirai |
| 2003/0026437 | A1 | 2/2003 | Janse |
| 2003/0053639 | A1 | 3/2003 | Beaucoup |
| 2003/0059061 | A1 | 3/2003 | Tsuji |
| 2003/0063762 | A1 | 4/2003 | Tajima |
| 2003/0063768 | A1 | 4/2003 | Cornelius |
| 2003/0072461 | A1 | 4/2003 | Moorer |
| 2003/0107478 | A1 | 6/2003 | Hendricks |
| 2003/0118200 | A1 | 6/2003 | Beaucoup |
| 2003/0122777 | A1 | 7/2003 | Grover |
| 2003/0138119 | A1 | 7/2003 | Pocino |
| 2003/0156725 | A1 | 8/2003 | Boone |
| 2003/0161485 | A1 | 8/2003 | Smith |
| 2003/0163326 | A1 | 8/2003 | Maase |
| 2003/0169888 | A1 | 9/2003 | Subotic |
| 2003/0185404 | A1 | 10/2003 | Milsap |
| 2003/0198339 | A1 | 10/2003 | Roy |
| 2003/0198359 | A1 | 10/2003 | Killion |
| 2003/0202107 | A1 | 10/2003 | Slattery |
| 2004/0013038 | A1 | 1/2004 | Kajala |
| 2004/0013252 | A1 | 1/2004 | Craner |
| 2004/0076305 | A1 | 4/2004 | Santiago |
| 2004/0105557 | A1 | 6/2004 | Matsuo |
| 2004/0125942 | A1 | 7/2004 | Beaucoup |
| 2004/0175006 | A1 | 9/2004 | Kim |
| 2004/0202345 | A1 | 10/2004 | Stenberg |
| 2004/0240664 | A1 | 12/2004 | Freed |
| 2005/0005494 | A1 | 1/2005 | Way |
| 2005/0041530 | A1 | 2/2005 | Goudie |
| 2005/0069156 | A1 | 3/2005 | Haapapuro |
| 2005/0094580 | A1 | 5/2005 | Kumar |
| 2005/0094795 | A1 | 5/2005 | Rambo |
| 2005/0149320 | A1 | 7/2005 | Kajala |
| 2005/0157897 | A1 | 7/2005 | Saltykov |
| 2005/0175189 | A1 | 8/2005 | Lee |
| 2005/0175190 | A1 | 8/2005 | Tashev |
| 2005/0213747 | A1 | 9/2005 | Popovich |
| 2005/0221867 | A1 | 10/2005 | Zurek |
| 2005/0238196 | A1 | 10/2005 | Furuno |
| 2005/0270906 | A1 | 12/2005 | Ramenzoni |
| 2005/0271221 | A1 | 12/2005 | Cerwin |
| 2005/0286698 | A1 | 12/2005 | Bathurst |
| 2005/0286729 | A1 | 12/2005 | Harwood |
| 2006/0083390 | A1 | 4/2006 | Kaderavek |
| 2006/0088173 | A1 | 4/2006 | Rodman |
| 2006/0093128 | A1 | 5/2006 | Oxford |
| 2006/0098403 | A1 | 5/2006 | Smith |
| 2006/0104458 | A1 | 5/2006 | Kenoyer |
| 2006/0109983 | A1 | 5/2006 | Young |
| 2006/0151256 | A1 | 7/2006 | Lee |
| 2006/0159293 | A1 | 7/2006 | Azima |
| 2006/0161430 | A1 | 7/2006 | Schweng |
| 2006/0165242 | A1 | 7/2006 | Miki |
| 2006/0192976 | A1 | 8/2006 | Hall |
| 2006/0198541 | A1 | 9/2006 | Henry |
| 2006/0204022 | A1 | 9/2006 | Hooley |
| 2006/0215866 | A1 | 9/2006 | Francisco |
| 2006/0222187 | A1 | 10/2006 | Jarrett |
| 2006/0233353 | A1 | 10/2006 | Beaucoup |
| 2006/0239471 | A1 | 10/2006 | Mao |
| 2006/0262942 | A1 | 11/2006 | Oxford |
| 2006/0269080 | A1 | 11/2006 | Oxford |
| 2006/0269086 | A1 | 11/2006 | Page |
| 2007/0006474 | A1 | 1/2007 | Taniguchi |
| 2007/0009116 | A1 | 1/2007 | Reining |
| 2007/0019828 | A1 | 1/2007 | Hughes |
| 2007/0053524 | A1 | 3/2007 | Haulick |
| 2007/0093714 | A1 | 4/2007 | Beaucoup |
| 2007/0116255 | A1 | 5/2007 | Derkx |
| 2007/0120029 | A1 | 5/2007 | Keung |
| 2007/0165871 | A1 | 7/2007 | Roovers |
| 2007/0230712 | A1 | 10/2007 | Belt |
| 2007/0253561 | A1 | 11/2007 | Williams |
| 2007/0269066 | A1 | 11/2007 | Derleth |
| 2008/0008339 | A1 | 1/2008 | Ryan |
| 2008/0033723 | A1 | 2/2008 | Jang |
| 2008/0046235 | A1 | 2/2008 | Chen |
| 2008/0056517 | A1 | 3/2008 | Algazi |
| 2008/0101622 | A1 | 5/2008 | Sugiyama |
| 2008/0130907 | A1 | 6/2008 | Sudo |
| 2008/0144848 | A1 | 6/2008 | Buck |
| 2008/0152167 | A1 | 6/2008 | Taenzer |
| 2008/0168283 | A1 | 7/2008 | Penning |
| 2008/0188965 | A1 | 8/2008 | Bruey |
| 2008/0212805 | A1 | 9/2008 | Fincham |
| 2008/0232607 | A1 | 9/2008 | Tashev |
| 2008/0247567 | A1 | 10/2008 | Morgan |
| 2008/0253553 | A1 | 10/2008 | Li |
| 2008/0253589 | A1 | 10/2008 | Trahms |
| 2008/0259731 | A1 | 10/2008 | Happonen |
| 2008/0260175 | A1 | 10/2008 | Elko |
| 2008/0267422 | A1 | 10/2008 | Cox |
| 2008/0279400 | A1 | 11/2008 | Knoll |
| 2008/0285772 | A1 | 11/2008 | Haulick |
| 2009/0003586 | A1 | 1/2009 | Lai |
| 2009/0003626 | A1 | 1/2009 | Burnett |
| 2009/0030536 | A1 | 1/2009 | Gur |
| 2009/0052684 | A1 | 2/2009 | Ishibashi |
| 2009/0052686 | A1 | 2/2009 | Wu |
| 2009/0052715 | A1 | 2/2009 | Zhang |
| 2009/0086998 | A1 | 4/2009 | Jeong |
| 2009/0087000 | A1 | 4/2009 | Ko |
| 2009/0087001 | A1 | 4/2009 | Jiang |
| 2009/0094817 | A1 | 4/2009 | Killion |
| 2009/0129609 | A1 | 5/2009 | Oh |
| 2009/0147967 | A1 | 6/2009 | Ishibashi |
| 2009/0150149 | A1 | 6/2009 | Cutter |
| 2009/0161880 | A1 | 6/2009 | Hooley |
| 2009/0169027 | A1 | 7/2009 | Ura |
| 2009/0173030 | A1 | 7/2009 | Gulbrandsen |
| 2009/0173570 | A1 | 7/2009 | Levit |
| 2009/0226004 | A1 | 9/2009 | Moeller |
| 2009/0233545 | A1 | 9/2009 | Sutskover |
| 2009/0237561 | A1 | 9/2009 | Kobayashi |
| 2009/0254340 | A1 | 10/2009 | Sun |
| 2009/0274318 | A1 | 11/2009 | Ishibashi |
| 2009/0287482 | A1 | 11/2009 | Hetherington |
| 2009/0310794 | A1 | 12/2009 | Ishibashi |
| 2010/0011644 | A1 | 1/2010 | Kramer |
| 2010/0034397 | A1 | 2/2010 | Nakadai |
| 2010/0074433 | A1 | 3/2010 | Zhang |
| 2010/0111323 | A1 | 5/2010 | Marton |
| 2010/0111324 | A1 | 5/2010 | Yeldener |
| 2010/0119097 | A1 | 5/2010 | Ohtsuka |
| 2010/0123785 | A1 | 5/2010 | Chen |
| 2010/0128892 | A1 | 5/2010 | Chen |
| 2010/0128901 | A1 | 5/2010 | Herman |
| 2010/0131749 | A1 | 5/2010 | Kim |
| 2010/0142721 | A1 | 6/2010 | Wada |
| 2010/0150364 | A1 | 6/2010 | Buck |
| 2010/0158268 | A1 | 6/2010 | Marton |
| 2010/0165071 | A1 | 7/2010 | Ishibashi |
| 2010/0166219 | A1 | 7/2010 | Marton |
| 2010/0189275 | A1 | 7/2010 | Christoph |
| 2010/0189299 | A1 | 7/2010 | Grant |
| 2010/0202628 | A1 | 8/2010 | Meyer |

(56) References Cited

U.S. PATENT DOCUMENTS

2010/0208605 A1 8/2010 Wang
2010/0215184 A1 8/2010 Buck
2010/0215189 A1 8/2010 Marton
2010/0217590 A1 8/2010 Nemer
2010/0245624 A1 9/2010 Beaucoup
2010/0246873 A1 9/2010 Chen
2010/0284185 A1 11/2010 Ngai
2010/0305728 A1 12/2010 Aiso
2010/0314513 A1 12/2010 Evans
2010/0329478 A1 12/2010 Kubin
2011/0002469 A1 1/2011 Ojala
2011/0007921 A1 1/2011 Stewart
2011/0033063 A1 2/2011 McGrath
2011/0038229 A1 2/2011 Beaucoup
2011/0096136 A1 4/2011 Liu
2011/0096631 A1 4/2011 Kondo
2011/0096915 A1 4/2011 Nemer
2011/0164761 A1 7/2011 McCowan
2011/0194719 A1 8/2011 Frater
2011/0211706 A1 9/2011 Tanaka
2011/0235821 A1 9/2011 Okita
2011/0268287 A1 11/2011 Ishibashi
2011/0311064 A1 12/2011 Teutsch
2011/0311085 A1 12/2011 Stewart
2011/0317862 A1 12/2011 Hosoe
2012/0002835 A1 1/2012 Stewart
2012/0014049 A1 1/2012 Ogle
2012/0027227 A1 2/2012 Kok
2012/0070015 A1 3/2012 Oh
2012/0076316 A1 3/2012 Zhu
2012/0080260 A1 4/2012 Stewart
2012/0093344 A1 4/2012 Sun
2012/0106755 A1 5/2012 Zhang
2012/0117474 A1 5/2012 Miki
2012/0128160 A1 5/2012 Kim
2012/0128166 A1 5/2012 Kim
2012/0128175 A1 5/2012 Erik
2012/0155688 A1 6/2012 Wilson
2012/0155703 A1 6/2012 Hernandez-Abrego
2012/0163625 A1 6/2012 Siotis
2012/0169826 A1 7/2012 Jeong
2012/0177219 A1 7/2012 Mullen
2012/0182429 A1 7/2012 Forutanpour
2012/0207335 A1 8/2012 Spaanderman
2012/0224709 A1 9/2012 Keddem
2012/0230511 A1 9/2012 Burnett
2012/0243698 A1 9/2012 Elko
2012/0262536 A1 10/2012 Chen
2012/0263019 A1 10/2012 Armstong-Muntner
2012/0288079 A1 11/2012 Burnett
2012/0288114 A1 11/2012 Duraiswami
2012/0294472 A1 11/2012 Hudson
2012/0327115 A1 12/2012 Chhetri
2012/0328142 A1 12/2012 Horibe
2013/0002797 A1 1/2013 Thapa
2013/0004013 A1 1/2013 Stewart
2013/0015014 A1 1/2013 Stewart
2013/0016847 A1 1/2013 Steiner
2013/0028451 A1 1/2013 De Roo
2013/0029684 A1 1/2013 Kawaguchi
2013/0034241 A1 2/2013 Pandey
2013/0039504 A1 2/2013 Pandey
2013/0083911 A1 4/2013 Bathurst
2013/0094689 A1 4/2013 Tanaka
2013/0101136 A1 4/2013 McElveen
2013/0101141 A1 4/2013 McElveen
2013/0136274 A1 5/2013 Aehgren
2013/0142343 A1 6/2013 Matsui
2013/0147835 A1 6/2013 Lee
2013/0156198 A1 6/2013 Kim
2013/0182190 A1 7/2013 McCartney
2013/0206501 A1 8/2013 Yu
2013/0216066 A1 8/2013 Yerrace
2013/0226593 A1 8/2013 Magnusson
2013/0251181 A1 9/2013 Stewart
2013/0264144 A1 10/2013 Hudson
2013/0271559 A1 10/2013 Feng
2013/0282372 A1 10/2013 Visser
2013/0294616 A1 11/2013 Mulder
2013/0297302 A1 11/2013 Pan
2013/0304476 A1 11/2013 Kim
2013/0304479 A1 11/2013 Teller
2013/0329908 A1 12/2013 Lindahl
2013/0332156 A1 12/2013 Tackin
2013/0336516 A1 12/2013 Stewart
2013/0343549 A1 12/2013 Vemireddy
2014/0003635 A1 1/2014 Mohammad
2014/0010383 A1 1/2014 Mackey
2014/0016794 A1 1/2014 Lu
2014/0029761 A1 1/2014 Maenpaa
2014/0037097 A1 2/2014 Labosco
2014/0050332 A1 2/2014 Nielsen
2014/0072151 A1 3/2014 Ochs
2014/0098233 A1 4/2014 Martin
2014/0098964 A1 4/2014 Rosca
2014/0122060 A1 5/2014 Kaszczuk
2014/0126746 A1 5/2014 Shin
2014/0177857 A1 6/2014 Kuster
2014/0233777 A1 8/2014 Tseng
2014/0233778 A1 8/2014 Hardiman
2014/0264654 A1 9/2014 Salmon
2014/0265774 A1 9/2014 Stewart
2014/0270271 A1 9/2014 Dehe
2014/0286518 A1 9/2014 Stewart
2014/0294211 A1 10/2014 Schneider
2014/0295768 A1 10/2014 Wu
2014/0301586 A1 10/2014 Stewart
2014/0307882 A1 10/2014 Leblanc
2014/0314251 A1 10/2014 Rosca
2014/0341392 A1 11/2014 Lambert
2014/0357177 A1 12/2014 Stewart
2014/0363008 A1 12/2014 Chen
2015/0003638 A1 1/2015 Kasai
2015/0024799 A1 1/2015 Swanson
2015/0025878 A1 1/2015 Gowreesunker
2015/0030172 A1 1/2015 Gaensler
2015/0033042 A1 1/2015 Iwamoto
2015/0050967 A1 2/2015 Bao
2015/0055796 A1 2/2015 Nugent
2015/0055797 A1 2/2015 Nguyen
2015/0063579 A1 3/2015 Bao
2015/0070188 A1 3/2015 Aramburu
2015/0078581 A1 3/2015 Etter
2015/0078582 A1 3/2015 Graham
2015/0097719 A1 4/2015 Balachandreswaran
2015/0104023 A1 4/2015 Bilobrov
2015/0112672 A1 4/2015 Giacobello
2015/0117672 A1 4/2015 Christoph
2015/0118960 A1 4/2015 Petit
2015/0126255 A1 5/2015 Yang
2015/0156578 A1 6/2015 Alexandridis
2015/0163577 A1 6/2015 Benesty
2015/0185825 A1 7/2015 Mullins
2015/0189423 A1 7/2015 Giannuzzi
2015/0195644 A1 7/2015 Wilson
2015/0208171 A1 7/2015 Funakoshi
2015/0237424 A1 8/2015 Wilker
2015/0281832 A1 10/2015 Kishimoto
2015/0281833 A1 10/2015 Shigenaga
2015/0281834 A1 10/2015 Takano
2015/0312662 A1 10/2015 Kishimoto
2015/0312691 A1 10/2015 Virolainen
2015/0326968 A1 11/2015 Shigenaga
2015/0341734 A1 11/2015 Sherman
2015/0350621 A1 12/2015 Sawa
2015/0358734 A1 12/2015 Butler
2016/0011851 A1 1/2016 Zhang
2016/0021478 A1 1/2016 Katagiri
2016/0029120 A1 1/2016 Nesta
2016/0031700 A1 2/2016 Sparks
2016/0037277 A1 2/2016 Matsumoto
2016/0055859 A1 2/2016 Finlow-Bates
2016/0080867 A1 3/2016 Nugent
2016/0088392 A1 3/2016 Huttunen

(56) References Cited

U.S. PATENT DOCUMENTS

| | | | |
|---|---|---|---|
| 2016/0100092 | A1 | 4/2016 | Bohac |
| 2016/0105473 | A1 | 4/2016 | Klingbeil |
| 2016/0111109 | A1 | 4/2016 | Tsujikawa |
| 2016/0127527 | A1 | 5/2016 | Mani |
| 2016/0134928 | A1 | 5/2016 | Ogle |
| 2016/0142548 | A1 | 5/2016 | Pandey |
| 2016/0142814 | A1 | 5/2016 | Deroo |
| 2016/0142815 | A1 | 5/2016 | Norris |
| 2016/0148057 | A1 | 5/2016 | Oh |
| 2016/0150315 | A1 | 5/2016 | Tzirkel-Hancock |
| 2016/0150316 | A1 | 5/2016 | Kubota |
| 2016/0155455 | A1 | 6/2016 | Ojanperä |
| 2016/0161588 | A1 | 6/2016 | Benattar |
| 2016/0165339 | A1 | 6/2016 | Benattar |
| 2016/0165340 | A1 | 6/2016 | Benattar |
| 2016/0165341 | A1 | 6/2016 | Benattar |
| 2016/0173976 | A1 | 6/2016 | Podhradsky |
| 2016/0173978 | A1 | 6/2016 | Li |
| 2016/0189727 | A1 | 6/2016 | Wu |
| 2016/0192068 | A1 | 6/2016 | Ng |
| 2016/0196836 | A1 | 7/2016 | Yu |
| 2016/0234593 | A1 | 8/2016 | Matsumoto |
| 2016/0245698 | A1 | 8/2016 | Pau |
| 2016/0249132 | A1 | 8/2016 | Oliaei |
| 2016/0275961 | A1 | 9/2016 | Yu |
| 2016/0295279 | A1 | 10/2016 | Srinivasan |
| 2016/0300584 | A1 | 10/2016 | Pandey |
| 2016/0302002 | A1 | 10/2016 | Lambert |
| 2016/0302006 | A1 | 10/2016 | Pandey |
| 2016/0323667 | A1 | 11/2016 | Shumard |
| 2016/0323668 | A1 | 11/2016 | Abraham |
| 2016/0330545 | A1 | 11/2016 | McElveen |
| 2016/0337523 | A1 | 11/2016 | Pandey |
| 2016/0353200 | A1 | 12/2016 | Bigeh |
| 2016/0357508 | A1 | 12/2016 | Moore |
| 2017/0019744 | A1 | 1/2017 | Matsumoto |
| 2017/0064451 | A1 | 3/2017 | Park |
| 2017/0105066 | A1 | 4/2017 | McLaughlin |
| 2017/0134849 | A1 | 5/2017 | Pandey |
| 2017/0134850 | A1 | 5/2017 | Graham |
| 2017/0164101 | A1 | 6/2017 | Rollow, IV |
| 2017/0164102 | A1 | 6/2017 | Ivanov |
| 2017/0180861 | A1 | 6/2017 | Chen |
| 2017/0206064 | A1 | 7/2017 | Breazeal |
| 2017/0230748 | A1 | 8/2017 | Shumard |
| 2017/0264999 | A1 | 9/2017 | Fukuda |
| 2017/0303887 | A1 | 10/2017 | Richmond |
| 2017/0308352 | A1 | 10/2017 | Kessler |
| 2017/0374454 | A1 | 12/2017 | Bernardini |
| 2018/0083848 | A1 | 3/2018 | Siddiqi |
| 2018/0102135 | A1 | 4/2018 | Ebenezer |
| 2018/0102136 | A1 | 4/2018 | Ebenezer |
| 2018/0109873 | A1 | 4/2018 | Xiang |
| 2018/0115799 | A1 | 4/2018 | Thiele |
| 2018/0160224 | A1 | 6/2018 | Graham |
| 2018/0196585 | A1 | 7/2018 | Densham |
| 2018/0219922 | A1 | 8/2018 | Bryans |
| 2018/0227666 | A1 | 8/2018 | Barnett |
| 2018/0240472 | A1 | 8/2018 | Vickers et al. |
| 2018/0292079 | A1 | 10/2018 | Branham |
| 2018/0310096 | A1 | 10/2018 | Shumard |
| 2018/0313558 | A1 | 11/2018 | Byers |
| 2018/0338205 | A1 | 11/2018 | Abraham |
| 2018/0359565 | A1 | 12/2018 | Kim |
| 2019/0042187 | A1 | 2/2019 | Truong |
| 2019/0082249 | A1 | 3/2019 | Kim |
| 2019/0124462 | A1 | 4/2019 | Lindahl |
| 2019/0166424 | A1 | 5/2019 | Harney |
| 2019/0182607 | A1 | 6/2019 | Pedersen |
| 2019/0215540 | A1 | 7/2019 | Nicol |
| 2019/0230436 | A1 | 7/2019 | Tsingos |
| 2019/0259408 | A1 | 8/2019 | Freeman |
| 2019/0268683 | A1 | 8/2019 | Miyahara |
| 2019/0295540 | A1 | 9/2019 | Grima |
| 2019/0295569 | A1 | 9/2019 | Wang |
| 2019/0297422 | A1 | 9/2019 | Anderson |
| 2019/0297542 | A1 | 9/2019 | Tang |
| 2019/0319677 | A1 | 10/2019 | Hansen |
| 2019/0371354 | A1 | 12/2019 | Lester |
| 2019/0373362 | A1 | 12/2019 | Ansai |
| 2019/0385629 | A1 | 12/2019 | Moravy |
| 2019/0387311 | A1 | 12/2019 | Schultz |
| 2020/0015021 | A1 | 1/2020 | Leppanen |
| 2020/0021910 | A1 | 1/2020 | Rollow, IV |
| 2020/0027472 | A1 | 1/2020 | Huang |
| 2020/0037068 | A1 | 1/2020 | Barnett |
| 2020/0068297 | A1 | 2/2020 | Rollow, IV |
| 2020/0100009 | A1 | 3/2020 | Lantz |
| 2020/0100025 | A1 | 3/2020 | Shumard |
| 2020/0107137 | A1 | 4/2020 | Koutrouli |
| 2020/0137485 | A1 | 4/2020 | Yamakawa |
| 2020/0145753 | A1 | 5/2020 | Rollow, IV |
| 2020/0152218 | A1 | 5/2020 | Kikuhara |
| 2020/0162618 | A1 | 5/2020 | Enteshari |
| 2020/0228663 | A1 | 7/2020 | Wells-Rutherford |
| 2020/0251119 | A1 | 8/2020 | Yang |
| 2020/0275204 | A1 | 8/2020 | Labosco |
| 2020/0278043 | A1 | 9/2020 | Cao |
| 2020/0288237 | A1 | 9/2020 | Abraham |
| 2021/0012789 | A1 | 1/2021 | Husain |
| 2021/0021940 | A1 | 1/2021 | Petersen |
| 2021/0044881 | A1 | 2/2021 | Lantz |
| 2021/0051397 | A1 | 2/2021 | Veselinovic |
| 2021/0098014 | A1 | 4/2021 | Tanaka |
| 2021/0098015 | A1 | 4/2021 | Pandey |
| 2021/0120335 | A1 | 4/2021 | Veselinovic |
| 2021/0200504 | A1 | 7/2021 | Park |
| 2021/0243522 | A1 | 8/2021 | Rollow, IV |
| 2021/0263126 | A1 | 8/2021 | Arai |
| 2021/0375298 | A1 | 12/2021 | Zhang |
| 2022/0369028 | A1 | 11/2022 | Abraham |

FOREIGN PATENT DOCUMENTS

| | | | |
|---|---|---|---|
| CA | 2475283 | | 1/2005 |
| CA | 2505496 | | 10/2006 |
| CA | 2838856 | | 12/2012 |
| CA | 2846323 | | 9/2014 |
| CN | 1780495 | | 5/2006 |
| CN | 101217830 | | 7/2008 |
| CN | 101833954 | | 9/2010 |
| CN | 101860776 | | 10/2010 |
| CN | 101894558 | | 11/2010 |
| CN | 102474680 | | 5/2012 |
| CN | 102646418 | | 8/2012 |
| CN | 102821336 | | 12/2012 |
| CN | 102833664 | | 12/2012 |
| CN | 102860039 | | 1/2013 |
| CN | 104036784 | | 9/2014 |
| CN | 104053088 | | 9/2014 |
| CN | 104080289 | A1 | 10/2014 |
| CN | 104347076 | | 2/2015 |
| CN | 104581463 | | 4/2015 |
| CN | 104681038 | | 6/2015 |
| CN | 105355210 | | 2/2016 |
| CN | 105548998 | | 5/2016 |
| CN | 105812969 | | 7/2016 |
| CN | 106162427 | | 11/2016 |
| CN | 106233751 | | 12/2016 |
| CN | 106251857 | | 12/2016 |
| CN | 106851036 | | 6/2017 |
| CN | 107205196 | | 9/2017 |
| CN | 107221336 | | 9/2017 |
| CN | 107534725 | | 1/2018 |
| CN | 108172235 | | 6/2018 |
| CN | 109087664 | | 12/2018 |
| CN | 208190895 | | 12/2018 |
| CN | 109727604 | | 5/2019 |
| CN | 110010147 | | 7/2019 |
| CN | 306391029 | | 3/2021 |
| DE | 2941485 | | 4/1981 |
| EM | 0077546430001 | | 3/2020 |
| EP | 0381498 | | 8/1990 |
| EP | 0594098 | | 4/1994 |

(56) References Cited

FOREIGN PATENT DOCUMENTS

| | | |
|---|---|---|
| EP | 0869697 | 10/1998 |
| EP | 1180914 | 2/2002 |
| EP | 1184676 | 3/2002 |
| EP | 0944228 | 6/2003 |
| EP | 1439526 | 7/2004 |
| EP | 1651001 | 4/2006 |
| EP | 1727344 | 11/2006 |
| EP | 1906707 | 4/2008 |
| EP | 1952393 | 8/2008 |
| EP | 1962547 | 8/2008 |
| EP | 2133867 | 12/2009 |
| EP | 2159789 | 3/2010 |
| EP | 2197219 | 6/2010 |
| EP | 2360940 | 8/2011 |
| EP | 2710788 | 3/2014 |
| EP | 2721837 | 4/2014 |
| EP | 2772910 | 9/2014 |
| EP | 2778310 | 9/2014 |
| EP | 2942975 | 11/2015 |
| EP | 2988527 | 2/2016 |
| EP | 3035556 | 6/2016 |
| EP | 3131311 | 2/2017 |
| GB | 2393601 | 3/2004 |
| GB | 2446620 | 8/2008 |
| GB | 2512155 | 9/2014 |
| GB | 2563857 | 1/2019 |
| JP | S63144699 | 6/1988 |
| JP | H01260967 | 10/1989 |
| JP | H0241099 | 2/1990 |
| JP | H05260589 | 10/1993 |
| JP | H07336790 | 12/1995 |
| JP | 2518823 | 7/1996 |
| JP | 3175622 | 6/2001 |
| JP | 2003060530 | 2/2003 |
| JP | 2003087890 | 3/2003 |
| JP | 2004349806 | 12/2004 |
| JP | 2004537232 | 12/2004 |
| JP | 2005323084 | 11/2005 |
| JP | 2006067127 | 3/2006 |
| JP | 2006094389 | 4/2006 |
| JP | 2006101499 | 4/2006 |
| JP | 4120646 | 8/2006 |
| JP | 4258472 | 8/2006 |
| JP | 4196956 | 9/2006 |
| JP | 2006340151 | 12/2006 |
| JP | 4760160 | 1/2007 |
| JP | 4752403 | 3/2007 |
| JP | 2007089058 | 4/2007 |
| JP | 4867579 | 6/2007 |
| JP | 2007208503 | 8/2007 |
| JP | 2007228069 | 9/2007 |
| JP | 2007228070 | 9/2007 |
| JP | 2007274131 | 10/2007 |
| JP | 2007274463 | 10/2007 |
| JP | 2007288679 | 11/2007 |
| JP | 2008005347 | 1/2008 |
| JP | 2008042754 | 2/2008 |
| JP | 2008154056 | 7/2008 |
| JP | 2008259022 | 10/2008 |
| JP | 2008263336 | 10/2008 |
| JP | 2008312002 | 12/2008 |
| JP | 2009206671 | 9/2009 |
| JP | 2010028653 | 2/2010 |
| JP | 2010114554 | 5/2010 |
| JP | 2010268129 | 11/2010 |
| JP | 2011015018 | 1/2011 |
| JP | 2011066805 | 3/2011 |
| JP | 4779748 | 9/2011 |
| JP | 2012105199 | 5/2012 |
| JP | 2012165189 | 8/2012 |
| JP | 5028944 | 9/2012 |
| JP | 5139111 | 2/2013 |
| JP | 5306565 | 10/2013 |
| JP | 5685173 | 3/2015 |
| JP | 2016051038 | 4/2016 |
| KR | 100298300 | 5/2001 |
| KR | 100901464 | 6/2009 |
| KR | 100960781 | 6/2010 |
| KR | 1020130033723 | 4/2013 |
| KR | 300856915 | 5/2016 |
| TW | 201331932 | 8/2013 |
| TW | I484478 | 5/2015 |
| TW | 201908761 | 3/2019 |
| WO | 1997008896 | 3/1997 |
| WO | 1998047291 | 10/1998 |
| WO | 2000030402 | 5/2000 |
| WO | 2003073786 | 9/2003 |
| WO | 2003088429 | 10/2003 |
| WO | 2004027754 | 4/2004 |
| WO | 2004090865 | 10/2004 |
| WO | 2006049260 | 5/2006 |
| WO | 2006071119 | 7/2006 |
| WO | 2006114015 | 11/2006 |
| WO | 2006121896 | 11/2006 |
| WO | 2007045971 | 4/2007 |
| WO | 2008074249 | 6/2008 |
| WO | 2008125523 | 10/2008 |
| WO | 2009039783 | 4/2009 |
| WO | 2009109069 | 9/2009 |
| WO | 2010001508 | 1/2010 |
| WO | 2010091999 | 8/2010 |
| WO | 2010140084 | 12/2010 |
| WO | 2010144148 | 12/2010 |
| WO | 2011104501 | 9/2011 |
| WO | 2012122132 | 9/2012 |
| WO | 2012140435 | 10/2012 |
| WO | 2012160459 | 11/2012 |
| WO | 2012174159 | 12/2012 |
| WO | 2013016986 | 2/2013 |
| WO | 2013182118 | 12/2013 |
| WO | 2014156292 | 10/2014 |
| WO | 2016176429 | 11/2016 |
| WO | 2016179211 | 11/2016 |
| WO | 2017208022 | 12/2017 |
| WO | 2018140444 | 8/2018 |
| WO | 2018140618 | 8/2018 |
| WO | 2018211806 | 11/2018 |
| WO | 2019231630 | 12/2019 |
| WO | 2020168873 | 8/2020 |
| WO | 2020191354 | 9/2020 |
| WO | 211843001 | 11/2020 |

OTHER PUBLICATIONS

Soundweb London Application Guides, BSS Audio, 2010. 120 pgs.

Symetrix, Inc., SymNet Network Audio Solutions Brochure, 2008, 32 pgs.

Tan, et al., "Pitch Detection Algorithm: Autocorrelation Method and AMDF," Department of Computer Engineering, Prince of Songkhla University, Jan. 2003, 6 pp.

Tandon, et al., "An Efficient, Low-Complexity, Normalized LMS Algorithm for Echo Cancellation," 2nd Annual IEEE Northeast Workshop on Circuits and Systems, Jun. 2004, pp. 161-164.

Tetelbaum et al., Design and Implementation of a Conference Phone Based on Microphone Array Technology, Proc. Global Signal Processing Conference and Expo (GSPx), Sep. 2004, 6 pgs.

Tiete et al., SoundCompass: A Distributed MEMS Microphone Array-Based Sensor for Sound Source Localization, SENSORS, Jan. 23, 2014, pp. 1918-1949.

TOA Corp., Ceiling Mount Microphone AN-9001 Operating Instructions, http://www.toaelectronics.com/media/an9001_mt1e.pdf, 1 pg.

Togami, et al., "Subband Beamformer Combined with Time-Frequency ICA for Extraction of Target Source Under Reverberant Environments," 17th European Signal Processing Conference, Aug. 2009, 5 pp.

U.S. Appl. No. 16/598,918, filed Oct. 10, 2019, 50 pp.

Van Compernolle, Switching Adaptive Filters for Enhancing Noisy and Reverberant Speech from Microphone Array Recordings, Proc. IEEE Int. Conf. on Acoustics, Speech, and Signal Processing, Apr. 1990, pp. 833-836.

(56) References Cited

OTHER PUBLICATIONS

Van Trees, Optimum Array Processing: Part IV of Detection, Estimation, and Modulation Theory, 2002, 54 pgs., pp. i-xxv, 90-95, 201-230.
Van Veen et al., Beamforming: A Versatile Approach to Spatial Filtering, IEEE ASSP Magazine, vol. 5, issue 2, Apr. 1988, pp. 4-24.
Vicente, "Adaptive Array Signal Processing Using the Concentric Ring Array and the Spherical Array," Ph.D. Dissertation, University of Missouri, May 2009, 226 pp.
Wang et al., Combining Superdirective Beamforming and Frequency-Domain Blind Source Separation for Highly Reverberant Signals, EURASIP Journal on Audio, Speech, and Music Processing, vol. 2010, pp. 1-13.
Warsitz, et al., "Blind Acoustic Beamforming Based on Generalized Eigenvalue Decomposition," IEEE Transactions on Audio, Speech and Language Processing, vol. 15, No. 5, 2007, 11 pp.
Weinstein, et al., "LOUD: A 1020-Node Microphone Array and Acoustic Beamformer," 14th International Congress on Sound & Vibration, Jul. 2007, 8 pgs.
Weinstein, et al., "Loud: A 1020-Node Modular Microphone Array and Beamformer for Intelligent Computing Spaces," MIT Computer Science and Artifical Intelligence Laboratory, 2004, 18 pp.
Wung, "A System Approach to Multi-Channel Acoustic Echo Cancellation and Residual Echo Suppression for Robust Hands-Free Teleconferencing," Georgia Institute of Technology, May 2015, 167 pp.
XAP Audio Conferencing Brochure, ClearOne Communications, Inc., 2002. 78 pages.
Yamaha Corp., MRX7-D Signal Processor Product Specifications, 2016, 12 pgs.
Yamaha Corp., PJP-100H IP Audio Conference System Owner's Manual, Sep. 2006, 59 pgs.
Yamaha Corp., PJP-EC200 Conference Echo Canceller Brochure, Oct. 2009, 2 pgs.
Yan et al., Convex Optimization Based Time-Domain Broadband Beamforming with Sidelobe Control, Journal of the Acoustical Society of America, vol. 121, No. 1, Jan. 2007, pp. 46-49.
Yensen et al., Synthetic Stereo Acoustic Echo Cancellation Structure with Microphone Array Beamforming for VOIP Conferences, 2000 IEEE International Conference on Acoustics, Speech, and Signal Processing, Jun. 2000, pp. 817-820.
Yermeche, et al., "Real-Time DSP Implementation of a Subband Beamforming Algorithm for Dual Microphone Speech Enhancement," 2007 IEEE International Symposium on Circuits and Systems, 4 pp.
Zavarehei, et al., "Interpolation of Lost Speech Segments Using LP-HNM Model with Codebook Post-Processing," IEEE Transactions on Multimedia, vol. 10, No. 3, Apr. 2008, 10 pp.
Zhang, et al., "F-T-LSTM based Complex Network for Joint Acoustic Echo Cancellation and Speech Enhancement," Audio, Speech and Language Processing Group, Jun. 2021, 5 pp.
Zhang, et al., "Multichannel Acoustic Echo Cancelation in Multiparty Spatial Audio Conferencing with Constrained Kalman Filtering," 11th International Workshop on Acoustic Echo and Noise Control, Sep. 14, 2008, 4 pp.
Zhang, et al., "Selective Frequency Invariant Uniform Circular Broadband Beamformer," EURASIP Journal on Advances in Signal Processing, vol. 2010, pp. 1-11.
Zheng, et al., "Experimental Evaluation of a Nested Microphone Array With Adaptive Noise Cancellers," IEEE Transactions on Instrumentation and Measurement, vol. 53, No. 3, Jun. 2004, 10 pp.
Buck, et al., "Self-Calibrating Microphone Arrays for Speech Signal Acquisition: A Systematic Approach," Signal Processing, vol. 86, 2006, pp. 1230-1238.
Burton, et al., "A New Structure for Combining Echo Cancellation and Beamforming in Changing Acoustical Environments," IEEE International Conference on Acoustics, Speech and Signal Processing, 2007, pp. 1-77-1-80.
BZ-3a Installation Instructions, XEDIT Corporation, Available at <chrome-extension://efaidnbmnnnibpcajpcglclefindmkaj/viewer.html?pdfurl=https%3A%2F%2Fwww.servoreelers.com%2Fmt-content%2Fuploads%2F2017%2F05%2Fbz-a-3universal-2017c.pdf&clen=189067&chunk=true>, 1 p.
Cabral, et al., Glottal Spectral Separation for Speech Synthesis, IEEE Journal of Selected Topics in Signal Processing, 2013, 15 pp.
Campbell, "Adaptive Beamforming Using a Microphone Array for Hands-Free Telephony," Virginia Polytechnic Institute and State University, Feb. 1999, 154 pgs.
Canetto, et al., "Speech Enhancement Systems Based on Microphone Arrays," VI Conference of the Italian Society for Applied and Industrial Mathematics, May 27, 2002, 9 pp.
Cao, "Survey on Acoustic Vector Sensor and its Applications in Signal Processing" Proceedings of the 33rd Chinese Control Conference, Jul. 2014, 17 pp.
Cech, et al., "Active-Speaker Detection and Localization with Microphones and Cameras Embedded into a Robotic Head," IEEE-RAS International Conference on Humanoid Robots, Oct. 2013, pp. 203-210.
Chan, et al., "Uniform Concentric Circular Arrays with Frequency-Invariant Characteristics-Theory, Design, Adaptive Beamforming and DOA Estimation," IEEE Transactions on Signal Processing, vol. 55, No. 1, Jan. 2007, pp. 165-177.
Chau, et al., "A Subband Beamformer on an Ultra Low-Power Miniature DSP Platform," 2002 IEEE International Conference on Acoustics, Speech, and Signal Processing, 4 pp.
Chen, et al., "A General Approach to the Design and Implementation of Linear Differential Microphone Arrays," Signal and Information Processing Association Annual Summit and Conference, 2013 Asia-Pacific, IEEE, 7 pp.
Chen, et al., "Design and Implementation of Small Microphone Arrays," PowerPoint Presentation, Northwestern Polytechnical University and Institut national de la recherche scientifique, Jan. 1, 2014, 56 pp.
Chen, et al., "Design of Robust Broadband Beamformers with Passband Shaping Characteristics using Tikhonov Regularization," IEEE Transactions on Audio, Speech, and Language Processing, vol. 17, No. 4, May 2009, pp. 565-681.
Chou, "Frequency-Independent Beamformer with Low Response Error," 1995 International Conference on Acoustics, Speech, and Signal Processing, pp. 2995-2998, May 9, 1995, 4 pp.
Chu, "Desktop Mic Array for Teleconferencing," 1995 International Conference on Acoustics, Speech, and Signal Processing, May 1995, pp. 2999-3002.
Circuit Specialists webpage for an aluminum enclosure, available at <https://www.circuitspecialists.com/metal-instrument-enclosure-la7.html?otaid=gpl&gclid=EAlalQobChMI2JTw-Ynm6AlVgbblCh3F4QKuEAkYBiABEgJZMPD_BwE>, 3 pp, 2019.
ClearOne Introduces Ceiling Microphone Array With Built-In Dante Interface, Press Release; GlobeNewswire, Jan. 8, 2019, 2 pp.
ClearOne Launches Second Generation of its Groundbreaking Beamforming Microphone Array, Press Release, Acquire Media, Jun. 1, 2016, 2 pp.
ClearOne to Unveil Beamforming Microphone Array with Adaptive Steering and Next Generation Acoustic Echo Cancellation Technology, Press Release, InfoComm, Jun. 4, 2012, 1 p.
Clearone, Clearly Speaking Blog, "Advanced Beamforming Microphone Array Technology for Corporate Conferencing Systems," Nov. 11, 2013, 5 pp., http://www.clearone.com/blog/advanced-beamforming-microphone-array-technology-for-corporate-conferencing-systems/.
Clearone, Beamforming Microphone Array, Mar. 2012, 6 pgs.
Clearone, Ceiling Microphone Array Installation Manual, Jan. 9, 2012, 20 pgs.
Clearone, Converge/Converge Pro, Manual, 2008, 51 pp.
Clearone, Professional Conferencing Microphones, Brochure, Mar. 2015, 3 pp.
Coleman, "Loudspeaker Array Processing for Personal Sound Zone Reproduction," Centre for Vision, Speech and Signal Processing, 2014, 239 pp.
Cook, et al., An Altemative Approach to Interpolated Array Processing for Uniform Circular Arrays, Asia-Pacific Conference on Circuits and Systems, 2002, pp. 411-414.

(56) References Cited

OTHER PUBLICATIONS

Cox, et al., "Robust Adaptive Beamforming," IEEE Trans. Acoust., Speech, and Signal Processing, vol. ASSP-35, No. 10, Oct. 1987, pp. 1365-1376.
CTG Audio, Ceiling Microphone CTG CM-01, Jun. 5, 2008, 2 pgs.
CTG Audio, CM-01 & CM-02 Ceiling Microphones Specifications, 2 pgs.
CTG Audio, CM-01 & CM-02 Ceiling Microphones, 2017, 4 pgs.
CTG Audio, CTG FS-400 and RS-800 with "Beamforming" Technology, Datasheet, as early as 2009, 2 pp.
CTG Audio, CTG User Manual for the FS- 400/800 Beamforming Mixers, Nov. 2008, 26 pp.
CTG Audio, Expand Your IP Teleconferencing to Full Room Audio, Obtained from website htt. )://www ct audio com/ex and-, our-i -teleconforencino-to-ful-room-audio-while-conquennc.1-echo-cancelation-issues Mull, 2014. 3 pages.
CTG Audio, Frequently Asked Questions, as early as 2009, 2 pp.
CTG Audio, Installation Manual and User Guidelines for the Soundman SM 02 System, May 2001, 29 pp.
CTG Audio, Installation Manual, Nov. 21, 2008, 25 pgs.
CTG Audio, Introducing the CTG FS-400 and FS-800 with Beamforming Technology, as early as 2008, 2 pp.
CTG Audio, Meeting the Demand for Ceiling Mics in the Enterprise 5 Best Practices, Brochure, 2012, 9 pp.
CTG Audio, White on White—Introducing the CM-02 Ceiling Microphone, https://ctgaudio.com/white-on-white-introducing-the-cm-02-ceiling-microphone/, Feb. 20, 2014, 3 pgs.
Dahl et al., Acoustic Echo Cancelling with Microphone Arrays, Research Report 3/95, Univ. of Karlskrona/Ronneby, Apr. 1995, 64 pgs.
Decawave, Application Note: APR001, UWB Regulations, a Summary of Worldwide Telecommunications Regulations governing the use of Ultra-Wideband radio, Version 1.2, 2015, 63 pp.
Desiraju, et al., "Efficient Multi-Channel Acoustic Echo Cancellation Using Constrained Sparse Filter Updates in the Subband Domain," Acoustic Speech Enhancement Research, Sep. 2014, 4 pp.
DiBiase et al., Robust Localization in Reverberent Rooms, in Brandstein, ed., Microphone Arrays: Techniques and Applications, 2001, Springer-Verlag Berlin Heidelberg, pp. 157-180.
Diethorn, "Audio Signal Processing For Next-Generation Multimedia Communication Systems," Chapter 4, 2004, 9 pp.
Digikey webpage for Converta box (last visited Apr. 22, 2020) <https://www.digikey.com/product-detail/en/bud-industries/CU-452-A/377-1969-ND/439257?utm_adgroup=Boxes&utm_source=google&utm_medium=cpc&utm_campaign=Shopping_Boxes%2C%20Enclosures%2C%20Racks_NEW&utm_term=&utm_content=Boxes&gclid=EAIaIQobChMI2JTw-Ynm6AIVgbblCh3F4QKuEAkYCSABEgKybPD_BwE>, 3 pp.
Digikey webpage for Pomona Box (last visited Apr. 22, 2020) available at <https://www.digikey.com/product-detail/en/pomonaelectronics/3306/501-2054-ND/736489>, 2 pp.
Digital Wireless Conference System, MCW-D 50, Beyerdynamic Inc., 2009, 18 pp.
Do et al., A Real-Time SRP-PHAT Source Location Implementation using Stochastic Region Contraction (SRC) on a Large-Aperture Microphone Array, 2007 IEEE International Conference on Acoustics, Speech and Signal Processing—ICASSP '07, , Apr. 2007, pp. I-121-I-124.
Dominguez, et al., "Towards an Environmental Measurement Cloud: Delivering Pollution Awareness to the Public," International Journal of Distributed Sensor Networks, vol. 10, Issue 3, Mar. 31, 2014, 17 pp.
Dormehl, "Hololens concept lets you control your smart home via augmented reality," digitaltrends, Jul. 26, 2016, 12 pp.
"Philips Hue Bulbs and Wireless Connected Lighting System," Web page https://www.philips-hue.com/en-in, 8 pp, Sep. 23, 2020, retrieved from Internet Archive Wayback Machine, <https://web.archive.org/web/20200923171037/https://www.philips-hue.com/en-in> on Sep. 27, 2021. 8 pages.
"VSA 2050 II Digitally Steerable col. Speaker," Web page https://www.rcf.it/en_US/products/product-detail/vsa-2050-ii/972389, 15 pages, Dec. 24, 2018.
Advanced Network Devices, IPSCM Ceiling Tile IP Speaker, Feb. 2011, 2 pgs.
Advanced Network Devices, IPSCM Standard 2' by 2' Ceiling Tile Speaker, 2 pgs.
Affes, et al., "A Signal Subspace Tracking Algorithm for Microphone Array Processing of Speech," IEEE Trans. on Speech and Audio Processing, vol. 5, No. 5, Sep. 1997, pp. 425-437.
Affes, et al., "A Source Subspace Tracking Array of Microphones for Double Talk Situations," 1996 IEEE International Conference on Acoustics, Speech, and Signal Processing Conference Proceedings, May 1996, pp. 909-912.
Affes, et al., "An Algorithm for Multisource Beamforming and Multitarget Tracking," IEEE Trans. on Signal Processing, vol. 44, No. 6, Jun. 1996, pp. 1512-1522.
Affes, et al., "Robust Adaptive Beamforming via LMS-Like Target Tracking," Proceedings of IEEE International Conference on Acoustics, Speech and Signal Processing, Apr. 1994, pp. IV-269-IV-272.
Ahonen, et al., "Directional Analysis of Sound Field with Linear Microphone Array and Applications in Sound Reproduction," Audio Engineering Socity, Convention Paper 7329, May 2008, 11 pp.
Alarifi, et al., "Ultra Wideband Indoor Positioning Technologies: Analysis and Recent Advances," Sensors 2016, vol. 16, No. 707, 36 pp.
Amazon webpage for Metalfab MFLCRFG (last visited Apr. 22, 2020) available at <https://www.amazon.com/RETURN-FILTERGRILLE-Drop-Ceiling/dp/B0064Q9A7I/ref=sr 12?dchild=1&keywords=drop+ceiling+return+air+grille&qid=1585862723&s=hi&sr=1-2>, 11 pp.
Armstrong "Walls" Catalog available at <https://www.armstrongceilings.com/content/dam/armstrongceilings/commercial/north-america/catalogs/armstrong-ceilings-wallsspecifiers-reference.pdf>, 2019, 30 pp.
Armstrong Tectum Ceiling & Wall Panels Catalog available at <https://www.armstrongceilings.com/content/dam/armstrongceilings/commercial/north-america/brochures/tectum-brochure.pdf>, 2019, 16 pp.
Armstrong Woodworks Concealed Catalog available at <https://sweets.construction.com/swts_content_files/3824/442581.pdf>, 2014, 6 pp.
Armstrong Woodworks Walls Catalog available at <https://www.armstrongceilings.com/pdbupimagesclg/220600.pdf/download/data-sheet-woodworks-walls.pdf>, 2019, 2 pp.
Armstrong World Industries, Inc., I-Ceilings Sound Systems Speaker Panels, 2002, 4 pgs.
Armstrong, Acoustical Design: Exposed Structure, available at <https://www.armstrongceilings.com/pdbupimagesclg/217142.pdf/download/acoustical-design-exposed-structurespaces-brochure.pdf>, 2018, 19 pp.
Armstrong, Ceiling Systems, Brochure page for Armstrong Softlook, 1995, 2 pp.
Armstrong, Excerpts from Armstrong 2011-2012 Ceiling Wall Systems Catalog, available at <https://web.archive.org/web/20121116034120/http://www.armstrong.com/commceilingsna/en_us/pdf/ceilings_catalog_screen-2011.pdf>, as early as 2012, 162 pp.
Armstrong, i-Ceilings, Brochure, 2009, 12 pp.
Arnold, et al., "A Directional Acoustic Array Using Silicon Micromachined Piezoresistive Microphones," Journal of the Acoustical Society of America, 113(1), Jan. 2003, 10 pp.
Atlas Sound, I128SYSM IP Compliant Loudspeaker System with Microphone Data Sheet, 2009, 2 pgs.
Atlas Sound, 1'x2' IP Speaker with Micophone for Suspended Ceiling Systems, https://www.atlasied.com/i128sysm, retrieved Oct. 25, 2017, 5 pgs.
Audio Technica, ES945 Omnidirectional Condenser Boundary Microphones, https://eu.audio-technica.com/resources/ES945%20Specifications.pdf, 2007, 1 pg.
Audix Microphones, Audix Introduces Innovative Ceiling Mics, http://audixusa.com/docs_12/latest_news/EFplFkAAklOtSdolke.shtml, Jun. 2011, 6 pgs.

(56) References Cited

OTHER PUBLICATIONS

Audix Microphones, M70 Flush Mount Ceiling Mic, May 2016, 2 pgs.
Automixer Gated, Information Sheet, MIT, Nov. 2019, 9 pp.
AVNetwork, "Top Five Conference Room Mic Myths," Feb. 25, 2015, 14 pp.
Beh, et al., "Combining Acoustic Echo Cancellation and Adaptive Beamforming for Achieving Robust Speech Interface in Mobile Robot," 2008 IEEE/RSJ International Conference on Intelligent Robots and Systems, Sep. 2008, pp. 1693-1698.
Benesty, et al., "A New Class of Doubletalk Detectors Based on Cross-Correlation," IEEE Transactions on Speech and Audio Processing, vol. 8, No. 2, Mar. 2000, pp. 168-172.
Benesty, et al., "Adaptive Algorithms for Mimo Acoustic Echo Cancellation," AI2 Allen Institute for Artifical Intelligence, 2003. 30 pages.
Benesty, et al., "Differential Beamforming," Fundamentals of Signal Enhancement and Array Signal Processing, First Edition, 2017, 39 pp.
Benesty, et al., "Frequency-Domain Adaptive Filtering Revisited, Generalization to the Multi-Channel Case, and Application to Acoustic Echo Cancellation," 2000 IEEE International Conference on Acoustics, Speech, and Signal Processing Proceedings, Jun. 2000, pp. 789-792.
Benesty, et al., "Microphone Array Signal Processing," Springer, 2010, 20 pp.
Berkun, et al., "Combined Beamformers for Robust Broadband Regularized Superdirective Beamforming," IEEE/ACM Transactions on Audio, Speech, and Language Processing, vol. 23, No. 5, May 2015, 10 pp.
Beyer Dynamic, Classis BM 32-33-34 DE-EN-FR 2016, 1 pg.
Beyer Dynamic, Classis-BM- 33-PZ A1, 2013, 1 pg.
Bno055, Intelligent 9-axis absolute orientation sensor, Data sheet, Bosch, Nov. 2020, 118 pp.
Boyd, et al., Convex Optimization, Mar. 15, 1999, 216 pgs.
Brandstein, et al., "Microphone Arrays: Signal Processing Techniques and Applications," Digital Signal Processing, Springer-Verlag Berlin Heidelberg, 2001, 401 pgs.
Brooks, et al., "A Quantitative Assessment of Group Delay Methods for Identifying Glottal Closures in Voiced Speech," IEEE Transaction on Audio, Speech, and Language Processing, vol. 14, No. 2, Mar. 2006, 11 pp.
Bruel & Kjaer, by J.J. Christensen and J. Hald, Technical Review: Beamforming, No. 1, 2004, 54 pgs.
BSS Audio, Soundweb London Application Guides, 2010, 120 pgs.
Buchner, et al., "An Acoustic Human-Machine Interface with Multi-Channel Sound Reproduction," IEEE Fourth Workshop on Multimedia Signal Processing, Oct. 2001, pp. 359-364.
Buchner, et al., "An Efficient Combination of Multi-Channel Acoustic Echo Cancellation with a Beamforming Microphone Array," International Workshop on Hands-Free Speech Communication (HSC2001), Apr. 2001, pp. 55-58.
Buchner, et al., "Full-Duplex Communication Systems Using Loudspeaker Arrays and Microphone Arrays," IEEE International Conference on Multimedia and Expo, Aug. 2002, pp. 509-512.
Buchner, et al., "Generalized Multichannel Frequency-Domain Adaptive Filtering: Efficient Realization and Application to Hands-Free Speech Communication," Signal Processing 85, 2005, pp. 549-570.
Buchner, et al., "Multichannel Frequency-Domain Adaptive Filtering with Application to Multichannel Acoustic Echo Cancellation," Adaptive Signal Processing, 2003, pp. 95-128.
Buck, "Aspects of First-Order Differential Microphone Arrays in the Presence of Sensor Imperfections," Transactions on Emerging Telecommunications Technologies, 13.2, 2002, 8 pp.
Buck, et al., "First Order Differential Microphone Arrays for Automotive Applications," 7th International Workshop on Acoustic Echo and Noise Control, Darmstadt University of Technology, Sep. 10-13, 2001, 4 pp.
Ito et al., Aerodynamic/Aeroacoustic Testing in Anechoic Closed Test Sections of Low-speed Wind Tunnels, 16th AIAA/CEAS Aeroacoustics Conference, 2010, 11 pgs.
Johansson et al., Robust Acoustic Direction of Arrival Estimation using Root-SRP-PHAT, a Realtime Implementation, IEEE International Conference on Acoustics, Speech, and Signal Processing, Mar. 2005, 4 pgs.
Johansson, et al., Speaker Localisation using the Far-Field SRP-PHAT in Conference Telephony, 2002 International Symposium on Intelligent Signal Processing and Communication Systems, 5 pgs.
Johnson, et al., "Array Signal Processing: Concepts and Techniques," p. 59, Prentice Hall, 1993, 3 pp.
Julstrom et al., Direction-Sensitive Gating: A New Approach to Automatic Mixing, J. Audio Eng. Soc., vol. 32, No. 7/8, Jul./Aug. 1984, pp. 490-506.
Kahrs, Ed., The Past, Present, and Future of Audio Signal Processing, IEEE Signal Processing Magazine, Sep. 1997, pp. 30-57.
Kallinger et al., Multi-Microphone Residual Echo Estimation, 2003 IEEE International Conference on Acoustics, Speech, and Signal Processing, Apr. 2003, 4 pgs.
Kammeyer, et al., New Aspects of Combining Echo Cancellers with Beamformers, IEEE International Conference on Acoustics, Speech, and Signal Processing, Mar. 2005, pp. III-137-III-140.
Kellermann, A Self-Steering Digital Microphone Array, 1991 International Conference on Acoustics, Speech, and Signal Processing, Apr. 1991, pp. 3581-3584.
Kellermann, Acoustic Echo Cancellation for Beamforming Microphone Arrays, in Brandstein, ed., Microphone Arrays: Techniques and Applications, 2001, Springer-Verlag Berlin Heidelberg, pp. 281-306.
Kellermann, Integrating Acoustic Echo Cancellation with Adaptive Beamforming Microphone Arrays, Forum Acusticum, Berlin, Mar. 1999, pp. 1-4.
Kellermann, Strategies for Combining Acoustic Echo Cancellation and Adaptive Beamforming Microphone Arrays, 1997 IEEE International Conference on Acoustics, Speech, and Signal Processing, Apr. 1997, 4 pgs.
Klegon, "Achieve Invisible Audio with the MXA910 Ceiling Array Microphone," Jun. 27, 2016, 10 pp.
Knapp, et al., The Generalized Correlation Method for Estimation of Time Delay, IEEE Transactions on Acoustics, Speech, and Signal Processing, vol. ASSP-24, No. 4, Aug. 1976, pp. 320-327.
Kobayashi et al., A Hands-Free Unit with Noise Reduction by Using Adaptive Beamformer, IEEE Transactions on Consumer Electronics, vol. 54, No. 1, Feb. 2008, pp. 116-122.
Kobayashi et al., A Microphone Array System with Echo Canceller, Electronics and Communications in Japan, Part 3, vol. 89, No. 10, Feb. 2, 2006, pp. 23-32.
Kolundžija, et al., "Baffled circular loudspeaker array with broadband high directivity," 2010 IEEE International Conference on Acoustics, Speech and Signal Processing, Dallas, TX, 2010, pp. 73-76.
Lai, et al., "Design of Robust Steerable Broadband Beamformers with Spiral Arrays and the Farrow Filter Structure," Proc. Intl. Workshop Acoustic Echo Noise Control, 2010, 4 pp.
Lebret, et al., Antenna Array Pattern Synthesis via Convex Optimization, IEEE Trans. on Signal Processing, vol. 45, No. 3, Mar. 1997, pp. 526-532.
LecNet2 Sound System Design Guide, Lectrosonics, Jun. 2, 2006. 28 pages.
Lectrosonics, LecNet2 Sound System Design Guide, Jun. 2006, 28 pgs.
Lee et al., Multichannel Teleconferencing System with Multispatial Region Acoustic Echo Cancellation, International Workshop on Acoustic Echo and Noise Control (IWAENC2003), Sep. 2003, pp. 51-54.
Li, "Broadband Beamforming and Direction Finding Using Concentric Ring Array," Ph.D. Dissertation, University of Missouri-Columbia, Jul. 2005, 163 pp.
Lindstrom et al., An Improvement of the Two-Path Algorithm Transfer Logic for Acoustic Echo Cancellation, IEEE Transactions on Audio, Speech, and Language Processing, vol. 15, No. 4, May 2007, pp. 1320-1326.

(56) References Cited

OTHER PUBLICATIONS

Liu et al., Adaptive Beamforming with Sidelobe Control: A Second-Order Cone Programming Approach, IEEE Signal Proc. Letters, vol. 10, No. 11, Nov. 2003, pp. 331-334.
Liu, et al., "Frequency Invariant Beamforming in Subbands," IEEE Conference on Signals, Systems and Computers, 2004, 5 pp.
Liu, et al., "Wideband Beamforming," Wiley Series on Wireless Communications and Mobile Computing, pp. 143-198, 2010, 297 pp.
Lobo, et al., Applications of Second-Order Cone Programming, Linear Algebra and its Applications 284, 1998, pp. 193-228.
Luo et al., Wideband Beamforming with Broad Nulls of Nested Array, Third Int'l Conf. on Info. Science and Tech., Mar. 23-25, 2013, pp. 1645-1648.
Marquardt et al., A Natural Acoustic Front-End for Interactive TV in the EU-Project DICIT, IEEE Pacific Rim Conference on Communications, Computers and Signal Processing, Aug. 2009, pp. 894-899.
Martin, Small Microphone Arrays with Postfilters for Noise and Acoustic Echo Reduction, in Brandstein, ed., Microphone Arrays: Techniques and Applications, 2001, Springer-Verlag Berlin Heidelberg, pp. 255-279.
Maruo et al., On the Optimal Solutions of Beamformer Assisted Acoustic Echo Cancellers, IEEE Statistical Signal Processing Workshop, 2011, pp. 641-644.
Matheja, et al., "Dynamic Signal Combining for Distributed Microphone Systems in Car Environments," 2011 IEEE International Conference on Acoustics, Speech and Signal Processing, May 22, 2011, 6 pp.
McCowan, Microphone Arrays: A Tutorial, Apr. 2001, 36 pgs.
MFLCRFG Datasheet, Metal_Fab Inc., Sep. 7, 2007, 1 p.
Microphone Array Primer, Shure Question and Answer Page, <https://service.shure.com/s/article/microphone-array-primer?language=en_US>, Jan. 2019, 5 pp.
Milanovic, et al., "Design and Realization of FPGA Platform for Real Time Acoustic Signal Acquisition and Data Processing" 22nd Telecommunications Forum TELFOR, 2014, 6 pp.
Mohammed, A New Adaptive Beamformer for Optimal Acoustic Echo and Noise Cancellation with Less Computational Load, Canadian Conference on Electrical and Computer Engineering, May 2008, pp. 000123-000128.
Mohammed, A New Robust Adaptive Beamformer for Enhancing Speech Corrupted with Colored Noise, AICCSA, Apr. 2008, pp. 508-515.
Mohammed, Real-time Implementation of an efficient RLS Algorithm based on IIR Filter for Acoustic Echo Cancellation, AICCSA, Apr. 2008, pp. 489-494.
Mohan, et al., "Localization of multiple acoustic sources with small arrays using a coherence test," Journal Acoustic Soc Am., 123(4), Apr. 2008, 12 pp.
Moulines, et al., "Pitch-Synchronous Waveform Processing Techniques for Text-to-Speech Synthesis Using Diphones," Speech Communication 9, 1990, 15 pp.
Multichannel Acoustic Echo Cancellation, Obtained from website http://www.buchner-net.com/mcaec.html, Jun. 2011. 3 pages.
Myllyla et al., Adaptive Beamforming Methods for Dynamically Steered Microphone Array Systems, 2008 IEEE International Conference on Acoustics, Speech and Signal Processing, Mar.-Apr. 2008, pp. 305-308.
New Shure Microflex Advance MXA910 Microphone With Intellimix Audio Processing Provides Greater Simplicity, Flexibility, Clarity, Press Release, Jun. 12, 2019, 4 pp.
Nguyen-Ky, et al., "An Improved Error Estimation Algorithm for Stereophonic Acoustic Echo Cancellation Systems," 1st International Conference on Signal Processing and Communication Systems, Dec. 17-19, 2007, 5 pp.
Office Action for Taiwan Patent Application No. 105109900 dated May 5, 2017. 10 pages.
Office Action issued for Japanese Patent Application No. 2015-023781 dated Jun. 20, 2016, 4 pp.
Oh, et al., "Hands-Free Voice Communication in an Automobile With a Microphone Array," 1992 IEEE International Conference on Acoustics, Speech, and Signal Processing, Mar. 1992, pp. I-281-1-284.
Olszewski, et al., "Steerable Highly Directional Audio Beam Loudspeaker," Interspeech 2005, 4 pp.
Omologo, Multi-Microphone Signal Processing for Distant-Speech Interaction, Human Activity and Vision Summer School (HAVSS), INRIA Sophia Antipolis, Oct. 3, 2012, 79 pgs.
Order, Conduct of the Proceeding, *Clearone, Inc.* v. *Shure Acquisition Holdings, Inc*., Nov. 2, 2020, 10 pp.
Pados et al., An Iterative Algorithm for the Computation of the MVDR Filter, IEEE Trans. on Signal Processing, vol. 49, No. 2, Feb. 2001, pp. 290-300.
Palladino, "This App Lets You Control Your Smarthome Lights via Augmented Reality," Next Reality Mobile AR News, Jul. 2, 2018, 5 pp.
Parikh, et al., "Methods for Mitigating IP Network Packet Loss in Real Time Audio Streaming Applications," GatesAir, 2014, 6 pp.
Pasha, et al., "Clustered Multi-channel Dereverberation for Ad-hoc Microphone Arrays," Proceedings of APSIPA Annual Summit and Conference, Dec. 2015, pp. 274-278.
Petitioner's Motion for Sanctions, *Clearone, Inc.* v. *Shure Acquisition Holdings, Inc*., Aug. 24, 2020, 20 pp.
Pettersen, "Broadcast Applications for Voice-Activated Microphones," db, Jul./Aug. 1985, 6 pgs.
Pfeifenberger, et al., "Nonlinear Residual Echo Suppression using a Recurrent Neural Network," Interspeech 2020, 5 pp.
Phoenix Audio Technologies, "Beamforming and Microphone Arrays—Common Myths", Apr. 2016, http://info.phnxaudio.com/blog/microphone-arrays-beamforming-myths-1, 19 pp.
Plascore, PCGA-XR1 3003 Aluminum Honeycomb Data Sheet, 2008, 2 pgs.
Polycom Inc., Vortex EF2211/EF2210 Reference Manual, 2003, 66 pgs.
Polycom, Inc., Polycom SoundStructure C16, C12, C8, and SR12 Design Guide, Nov. 2013, 743 pgs.
Polycom, Inc., Setting Up the Polycom HDX Ceiling Microphone Array Series, https://support.polycom.com/content/dam/polycom-support/products/Telepresence-and-Video/HDX%20Series/setup-maintenance/en/hdx_ceiling_microphone_array_setting_up.pdf, 2010, 16 pgs.
Polycom, Inc., Vortex EF2241 Reference Manual, 2002, 68 pgs.
Polycom, Inc., Vortex EF2280 Reference Manual, 2001, 60 pp.
Pomona, Model 3306, Datasheet, Jun. 9, 1999, 1 p.
Powers, et al., "Proving Adaptive Directional Technology Works: A Review of Studies," The Hearing Review, Apr. 6, 2004, 5 pp.
Prime, et al., "Beamforming Array Optimisation Averaged Sound Source Mapping on a Model Wind Turbine," ResearchGate, Nov. 2014, 10 pp.
Rabinkin et al., Estimation of Wavefront Arrival Delay Using the Cross-Power Spectrum Phase Technique, 132nd Meeting of the Acoustical Society of America, Dec. 1996, pp. 1-10.
Rane Corp., Halogen Acoustic Echo Cancellation Guide, AEC Guide Version 2, Nov. 2013, 16 pgs.
Rao, et al., "Fast LMS/Newton Algorithms for Stereophonic Acoustic Echo Cancelation," IEEE Transactions on Signal Processing, vol. 57, No. 8, Aug. 2009. 12 pages.
Reuven et al., Joint Acoustic Echo Cancellation and Transfer Function GSC in the Frequency Domain, 23rd IEEE Convention of Electrical and Electronics Engineers in Israel, Sep. 2004, pp. 412-415.
Reuven et al., Joint Noise Reduction and Acoustic Echo Cancellation Using the Transfer-Function Generalized Sidelobe Canceller, Speech Communication, vol. 49, 2007, pp. 623-635.
Reuven, et al., "Multichannel Acoustic Echo Cancellation and Noise Reduction in Reverberant Environments Using the Transfer-Function GSC," 2007 IEEE International Conference on Acoustics, Speech and Signal Processing, Apr. 2007, 4 pp.
Ristimaki, Distributed Microphone Array System for Two-Way Audio Communication, Helsinki Univ. of Technology, Master's Thesis, Jun. 15, 2009, 73 pgs.

(56) References Cited

OTHER PUBLICATIONS

Rombouts et al., An Integrated Approach to Acoustic Noise and Echo Cancellation, Signal Processing 85, 2005, pp. 849-871.
Sällberg, "Faster Subband Signal Processing," IEEE Signal Processing Magazine, vol. 30, No. 5, Sep. 2013, 6 pp.
Sasaki et al., A Predefined Command Recognition System Using a Ceiling Microphone Array in Noisy Housing Environments, 2008 IEEE/RSJ International Conference on Intelligent Robots and Systems, Sep. 2008, pp. 2178-2184.
Sennheiser, New microphone solutions for ceiling and desk installation, https://en-us.sennheiser.com/news-new-microphone-solutions-for-ceiling-and-desk-installation, Feb. 2011, 2 pgs.
Sennheiser, TeamConnect Ceiling, https://en-us.sennheiser.com/conference-meeting-rooms-teamconnect-ceiling, 2017, 7 pgs.
Serdes, Wikipedia article, last edited on Jun. 25, 2018; retrieved on Jun. 27, 2018, 3 pp., https://en.wikipedia.org/wiki/SerDes.
Sessler, et al., "Directional Transducers," IEEE Transactions on Audio and Electroacoustics, vol. AU-19, No. 1, Mar. 1971, pp. 19-23.
Sessler, et al., "Toroidal Microphones," Journal of Acoustical Society of America, vol. 46, No. 1, 1969, 10 pp.
Shure AMS Update, vol. 1, No. 1, 1983, 2 pgs.
Shure AMS Update, vol. 4, No. 4, 1997, 8 pgs.
Shure Debuts Microflex Advance Ceiling and Table Array Microphones, Press Release, Feb. 9, 2016, 4 pp.
Shure Inc., A910-HCM Hard Ceiling Mount, retrieved from website <http://www.shure.com/en-US/products/accessories/a910hcm> on Jan. 16, 2020, 3 pp.
Shure Inc., Microflex Advance, http://www.shure.com/americas/microflex-advance, 12 pgs.
Shure Inc., MX395 Low Profile Boundary Microphones, 2007, 2 pgs.
Shure Inc., MXA910 Ceiling Array Microphone, http://www.shure.com/americas/products/microphones/microflex-advance/mxa910-ceiling-array-microphone, 7 pgs. 2009-2017.
Shure, MXA910 With IntelliMix, Ceiling Array Microphone, available at <https://www.shure.com/en-US/products/microphones/mxa910>, as early as 2020, 12 pp.
Shure, New MXA910 Variant Now Available, Press Release, Dec. 13, 2019, 5 pp.
Shure, Q&A in Response to Recent Us Court Ruling on Shure MXA910, Available at <https://www.shure.com/en-US/meta/legal/q-and-a-inresponse-to-recent-us-court-ruling-on-shure-mxa910-response>, As early as 2020, 5 pp.
Shure, RK244G Replacement Screen and Grille, Datasheet, 2013, 1 p.
Shure, The Microflex Advance MXA310 Table Array Microphone, Available at <https://www.shure.com/en-US/products/microphones/mxa310>, as early as 2020, 12 pp.
Signal Processor MRX7-D Product Specifications, Yamaha Corporation, 2016. 12 pages.
Silverman et al., Performance of Real-Time Source-Location Estimators for a Large-Aperture Microphone Array, IEEE Transactions on Speech and Audio Processing, vol. 13, No. 4, Jul. 2005, pp. 593-606.
Sinha, Ch. 9: Noise and Echo Cancellation, in Speech Processing in Embedded Systems, Springer, 2010, pp. 127-142.
SM 69 Stereo Microphone, Datasheet, Georg Neumann GmbH, Available at <https://ende.neumann.com/product_files/6552/download>, 1 p.
Double Condenser Microphone SM 69, Datasheet, Georg Neumann GmbH, available at <https://ende.neumann.com/product_files/7453/download>, 8 pp.
Eargle, "The Microphone Handbook," Elar Publ. Co., 1st ed., 1981, 4 pp.
Enright, Notes From Logan, June edition of Scanlines, Jun. 2009, 9 pp.
Fan, et al., "Localization Estimation of Sound Source by Microphones Array," Procedia Engineering 7, 2010, pp. 312-317.
Firoozabadi, et al., "Combination of Nested Microphone Array and Subband Processing for Multiple Simultaneous Speaker Localization," 6th International Symposium on Telecommunications, Nov. 2012, pp. 907-912.
Flanagan et al., Autodirective Microphone Systems, Acustica, vol. 73, 1991, pp. 58-71.
Flanagan, et al., "Computer-Steered Microphone Arrays for Sound Transduction in Large Rooms," J. Acoust. Soc. Am. 78 (5), Nov. 1985, pp. 1508-1518.
Fohhn Audio New Generation of Beam Steering Systems Available Now, audioXpress Staff, May 10, 2017, 8 pp.
Fox, et al., "A Subband Hybrid Beamforming for In-Car Speech Enhancement," 20th European Signal rocessing Conference, Aug. 2012, 5 pp.
Frost, III, An Algorithm for Linearly Constrained Adaptive Array Processing, Proc. IEEE, vol. 60, No. 8, Aug. 1972, pp. 926-935.
Gannot et al., Signal Enhancement using Beamforming and Nonstationarity with Applications to Speech, IEEE Trans. on Signal Processing, vol. 49, No. 8, Aug. 2001, pp. 1614-1626.
Gansler et al., A Double-Talk Detector Based on Coherence, IEEE Transactions on Communications, vol. 44, No. 11, Nov. 1996, pp. 1421-1427.
Gazor et al., Robust Adaptive Beamforming via Target Tracking, IEEE Transactions on Signal Processing, vol. 44, No. 6, Jun. 1996, pp. 1589-1593.
Gazor et al., Wideband Multi-Source Beamforming with Adaptive Array Location Calibration and Direction Finding, 1995 International Conference on Acoustics, Speech, and Signal Processing, May 1995, pp. 1904-1907.
Gentner Communications Corp., AP400 Audio Perfect 400 Audioconferencing System Installation & Operation Manual, Nov. 1998, 80 pgs.
Gentner Communications Corp., XAP 800 Audio Conferencing System Installation & Operation Manual, Oct. 2001, 152 pgs.
Gil-Cacho et al., Multi-Microphone Acoustic Echo Cancellation Using Multi-Channel Warped Linear Prediction of Common Acoustical Poles, 18th European Signal Processing Conference, Aug. 2010, pp. 2121-2125.
Giuliani, et al., "Use of Different Microphone Array Configurations for Hands-Free Speech Recognition in Noisy and Reverberant Environment," IRST-Istituto per la Ricerca Scientifica e Tecnologica, Sep. 22, 1997, 4 pp.
Gritton et al., Echo Cancellation Algorithms, IEEE ASSP Magazine, vol. 1, issue 2, Apr. 1984, pp. 30-38.
Hald, et al., "A class of optimal broadband phased array geometries designed for easy construction," 2002 Int'l Congress & Expo. on Noise Control Engineering, Aug. 2002, 6 pp.
Hamalainen, et al., "Acoustic Echo Cancellation for Dynamically Steered Microphone Array Systems," 2007 IEEE Workshop on Applications of Signal Processing to Audio and Acoustics, Oct. 2007, pp. 58-61.
Hayo, Virtual Controls for Real Life, Web page downloaded from https://hayo.io/ on Sep. 18, 2019, 19 pp.
Herbordt et al., A Real-time Acoustic Human-Machine Front-End for Multimedia Applications Integrating Robust Adaptive Beamforrning and Stereophonic Acoustic Echo Cancellation, 7th International Conference on Spoken Language Processing, Sep. 2002, 4 pgs.
Herbordt et al., GSAEC—Acoustic Echo Cancellation embedded into the Generalized Sidelobe Canceller, 10th European Signal Processing Conference, Sep. 2000, 5 pgs.
Herbordt et al., Multichannel Bin-Wise Robust Frequency-Domain Adaptive Filtering and Its Application to Adaptive Beamforming, IEEE Transactions on Audio, Speech, and Language Processing, vol. 15, No. 4, May 2007, pp. 1340-1351.
Herbordt, "Combination of Robust Adaptive Beamforming with Acoustic Echo Cancellation for Acoustic Human/Machine Interfaces," Friedrich-Alexander University, 2003, 293 pgs.
Herbordt, et al., Joint Optimization of LCMV Beamforming and Acoustic Echo Cancellation for Automatic Speech Recognition, IEEE International Conference on Acoustics, Speech, and Signal Processing, Mar. 2005, pp. III-77-III-80.

(56) References Cited

OTHER PUBLICATIONS

Holm, "Optimizing Microphone Arrays for use in Conference Halls," Norwegian University of Science and Technology, Jun. 2009, 101 pp.
Huang et al., Immersive Audio Schemes: The Evolution of Multiparty Teleconferencing, IEEE Signal Processing Magazine, Jan. 2011, pp. 20-32.
ICONYX Gen5, Product Overview; Renkus-Heinz, Dec. 24, 2018, 2 pp.
International Search Report and Written Opinion for PCT/US2016/022773 dated Jun. 10, 2016. 13 pages.
International Search Report and Written Opinion for PCT/US2016/029751 dated Nov. 28, 2016, 21 pp.
International Search Report and Written Opinion for PCT/US2018/013155 dated Jun. 8, 2018. 12 pages.
International Search Report and Written Opinion for PCT/US2018/015269 dated Mar. 26, 2018, 12 pp.
International Search Report and Written Opinion for PCT/US2019/031833 dated Jul. 24, 2019, 16 pp.
International Search Report and Written Opinion for PCT/US2019/033470 dated Jul. 31, 2019, 12 pp.
International Search Report and Written Opinion for PCT/US2019/034692 dated Sep. 10, 2019, 11 pp.
International Search Report and Written Opinion for PCT/US2019/051491 dated Dec. 10, 2019, 13 pp.
International Search Report and Written Opinion for PCT/US2019/051989 dated Jan. 10, 2020, 15 pp.
International Search Report and Written Opinion for PCT/US2020/024063 dated Aug. 31, 2020, 18 pp.
International Search Report and Written Opinion for PCT/US2020/035185 dated Sep. 15, 2020, 11 pp.
International Search Report and Written Opinion for PCT/US2020/058385 dated Mar. 31, 2021, 20 pp.
International Search Report and Written Opinion for PCT/US2021/070625 dated Sep. 17, 2021, 17 pp.
International Search Report and Written Opinion for PCT/US2022/014061 dated May 10, 2022, 14 pp.
International Search Report and Written Opinion for PCT/US2022/045694 dated Mar. 17, 2023, 19 pp.
International Search Report for PCT/US2020/024005 dated Jun. 12, 2020, 12 pp.
InvenSense, "Microphone Array Beamforming," Application Note AN-1140, Dec. 31, 2013, 12 pp.
Invensense, Recommendations for Mounting and Connecting InvenSense MEMS Microphones, Application Note AN-1003, 2013, 11 pp.
Invitation to Pay Additional Fees for PCT/US2022/045694 dated Jan. 24, 2023, 13 pp.
Ishii et al., Investigation on Sound Localization using Multiple Microphone Arrays, Reflection and Spatial Information, Japanese Society for Artificial Intelligence, JSAI Technical Report, SIG-Challenge-B202-11, 2012, pp. 64-69.

AUTO FOCUS, AUTO FOCUS WITHIN REGIONS, AND AUTO PLACEMENT OF BEAMFORMED MICROPHONE LOBES WITH INHIBITION FUNCTIONALITY

CROSS-REFERENCE TO RELATED APPLICATIONS

This application is a continuation of U.S. patent application Ser. No. 17/929,467, filed on Sep. 2, 2022, which is a continuation of U.S. patent application Ser. No. 16/826,115, now U.S. Pat. No. 11,438,691, filed on Mar. 20, 2020, which claims the benefit of U.S. Provisional Patent Application No. 62/821,800, filed on Mar. 21, 2019, U.S. Provisional Patent Application No. 62/855,187, filed on May 31, 2019, and U.S. Provisional Patent Application No. 62/971,648, filed on Feb. 7, 2020. The contents of each application are fully incorporated by reference in their entirety herein.

TECHNICAL FIELD

This application generally relates to an array microphone having automatic focus and placement of beamformed microphone lobes. In particular, this application relates to an array microphone that adjusts the focus and placement of beamformed microphone lobes based on the detection of sound activity after the lobes have been initially placed, and allows inhibition of the adjustment of the focus and placement of the beamformed microphone lobes based on a remote far end audio signal.

BACKGROUND

Conferencing environments, such as conference rooms, boardrooms, video conferencing applications, and the like, can involve the use of microphones for capturing sound from various audio sources active in such environments. Such audio sources may include humans speaking, for example. The captured sound may be disseminated to a local audience in the environment through amplified speakers (for sound reinforcement), and/or to others remote from the environment (such as via a telecast and/or a webcast). The types of microphones and their placement in a particular environment may depend on the locations of the audio sources, physical space requirements, aesthetics, room layout, and/or other considerations. For example, in some environments, the microphones may be placed on a table or lectern near the audio sources. In other environments, the microphones may be mounted overhead to capture the sound from the entire room, for example. Accordingly, microphones are available in a variety of sizes, form factors, mounting options, and wiring options to suit the needs of particular environments.

Traditional microphones typically have fixed polar patterns and few manually selectable settings. To capture sound in a conferencing environment, many traditional microphones can be used at once to capture the audio sources within the environment. However, traditional microphones tend to capture unwanted audio as well, such as room noise, echoes, and other undesirable audio elements. The capturing of these unwanted noises is exacerbated by the use of many microphones.

Array microphones having multiple microphone elements can provide benefits such as steerable coverage or pick up patterns (having one or more lobes), which allow the microphones to focus on the desired audio sources and reject unwanted sounds such as room noise. The ability to steer audio pick up patterns provides the benefit of being able to be less precise in microphone placement, and in this way, array microphones are more forgiving. Moreover, array microphones provide the ability to pick up multiple audio sources with one array microphone or unit, again due to the ability to steer the pickup patterns.

However, the position of lobes of a pickup pattern of an array microphone may not be optimal in certain environments and situations. For example, an audio source that is initially detected by a lobe may move and change locations. In this situation, the lobe may not optimally pick up the audio source at the its new location.

Accordingly, there is an opportunity for an array microphone that addresses these concerns. More particularly, there is an opportunity for an array microphone that automatically focuses and/or places beamformed microphone lobes based on the detection of sound activity after the lobes have been initially placed, while also being able to inhibit the focus and/or placement of the beamformed microphone lobes based on a remote far end audio signal, which can result in higher quality sound capture and more optimal coverage of environments.

SUMMARY

The invention is intended to solve the above-noted problems by providing array microphone systems and methods that are designed to, among other things: (1) enable automatic focusing of beamformed lobes of an array microphone in response to the detection of sound activity, after the lobes have been initially placed; (2) enable automatic placement of beamformed lobes of an array microphone in response to the detection of sound activity; (3) enable automatic focusing of beamformed lobes of an array microphone within lobe regions in response to the detection of sound activity, after the lobes have been initially placed; and (4) inhibit or restrict the automatic focusing or automatic placement of beamformed lobes of an array microphone, based on activity of a remote far end audio signal.

In an embodiment, beamformed lobes that have been positioned at initial coordinates may be focused by moving the lobes to new coordinates in the general vicinity of the initial coordinates, when new sound activity is detected at the new coordinates.

In another embodiment, beamformed lobes may be placed or moved to new coordinates, when new sound activity is detected at the new coordinates.

In a further embodiment, beamformed lobes that have been positioned at initial coordinates may be focused by moving the lobes, but confined within lobe regions, when new sound activity is detected at the new coordinates.

In another embodiment, the movement or placement of beamformed lobes may be inhibited or restricted, when the activity of a remote far end audio signal exceeds a predetermined threshold.

These and other embodiments, and various permutations and aspects, will become apparent and be more fully understood from the following detailed description and accompanying drawings, which set forth illustrative embodiments that are indicative of the various ways in which the principles of the invention may be employed.

DETAILED DESCRIPTION

Figure 1:
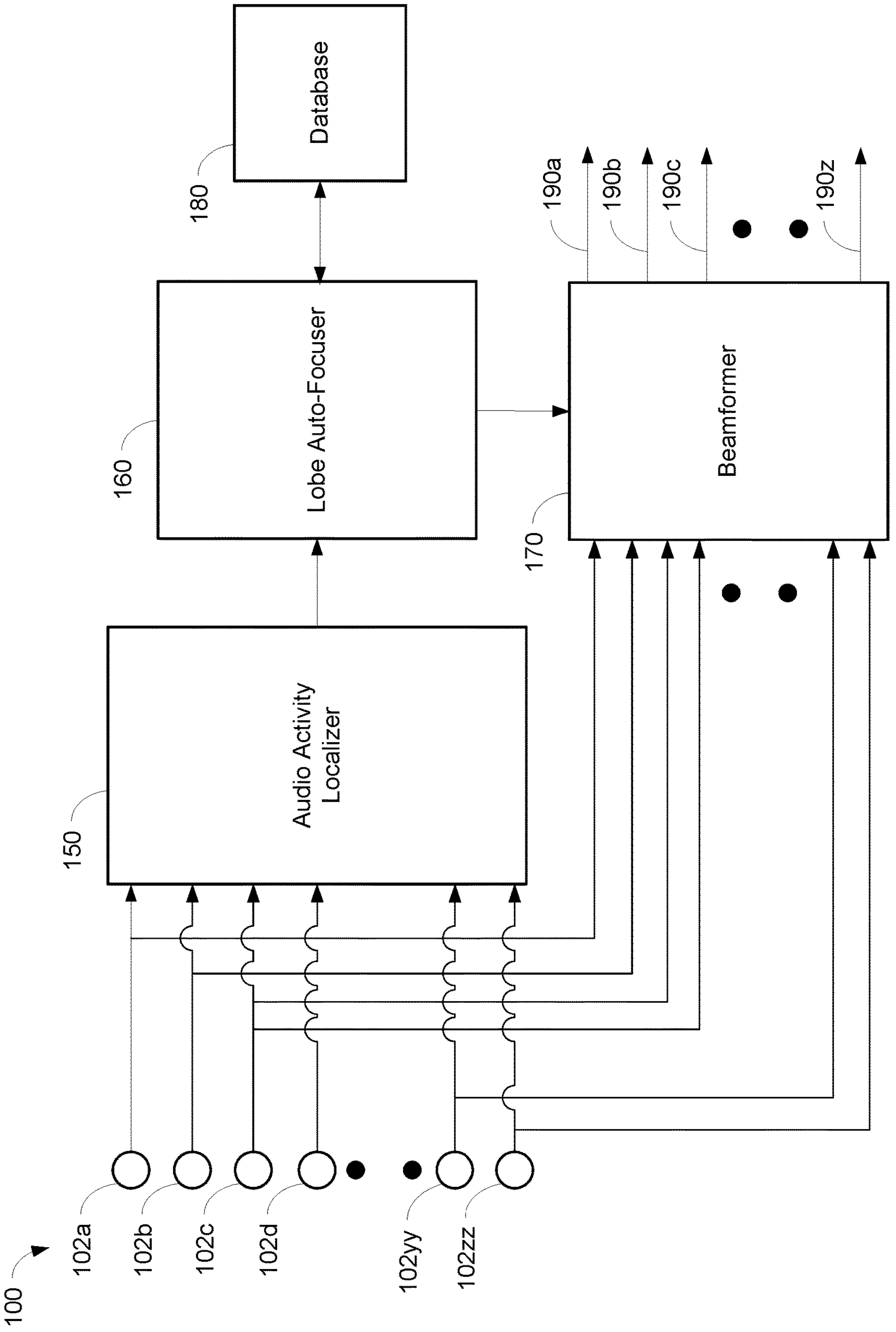
FIG. 1 is a schematic diagram of an array microphone with automatic focusing of beamformed lobes in response to the detection of sound activity, in accordance with some embodiments.

The description that follows describes, illustrates and exemplifies one or more particular embodiments of the invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the specification is intended to be taken as a whole and interpreted in accordance with the principles of the invention as taught herein and understood to one of ordinary skill in the art.

The array microphone systems and methods described herein can enable the automatic focusing and placement of beamformed lobes in response to the detection of sound activity, as well as allow the focus and placement of the beamformed lobes to be inhibited based on a remote far end audio signal. In embodiments, the array microphone may include a plurality of microphone elements, an audio activity localizer, a lobe auto-focuser, a database, and a beamformer. The audio activity localizer may detect the coordinates and confidence score of new sound activity, and the lobe auto-focuser may determine whether there is a previously placed lobe nearby the new sound activity. If there is such a lobe and the confidence score of the new sound activity is greater than a confidence score of the lobe, then the lobe auto-focuser may transmit the new coordinates to the beamformer so that the lobe is moved to the new coordinates. In these embodiments, the location of a lobe may be improved and automatically focused on the latest location of audio sources inside and near the lobe, while also preventing the lobe from overlapping, pointing in an undesirable direction (e.g., towards unwanted noise), and/or moving too suddenly.

In other embodiments, the array microphone may include a plurality of microphone elements, an audio activity localizer, a lobe auto-placer, a database, and a beamformer. The audio activity localizer may detect the coordinates of new sound activity, and the lobe auto-placer may determine whether there is a lobe nearby the new sound activity. If there is not such a lobe, then the lobe auto-placer may transmit the new coordinates to the beamformer so that an inactive lobe is placed at the new coordinates or so that an existing lobe is moved to the new coordinates. In these embodiments, the set of active lobes of the array microphone may point to the most recent sound activity in the coverage area of the array microphone.

In other embodiments, the audio activity localizer may detect the coordinates and confidence score of new sound activity, and if the confidence score of the new sound activity is greater than a threshold, the lobe auto-focuser may identify a lobe region that the new sound activity belongs to. In the identified lobe region, a previously placed lobe may be moved if the coordinates are within a look radius of the current coordinates of the lobe, i.e., a three-dimensional region of space around the current coordinates of the lobe where new sound activity can be considered. The movement of the lobe in the lobe region may be limited to within a move radius of the current coordinates of the lobe, i.e., a maximum distance in three-dimensional space that the lobe is allowed to move, and/or limited to outside a boundary cushion between lobe regions, i.e., how close a lobe can move to the boundaries between lobe regions. In these embodiments, the location of a lobe may be improved and automatically focused on the latest location of audio sources inside the lobe region associated with the lobe, while also preventing the lobes from overlapping, pointing in an undesirable direction (e.g., towards unwanted noise), and/or moving too suddenly.

In further embodiments, an activity detector may receive a remote audio signal, such as from a far end. The sound of the remote audio signal may be played in the local environment, such as on a loudspeaker within a conference room. If the activity of the remote audio signal exceeds a predetermined threshold, then the automatic adjustment (i.e., focus and/or placement) of beamformed lobes may be inhibited from occurring. For example, the activity of the remote audio signal could be measured by the energy level of the remote audio signal. In this example, the energy level of the remote audio signal may exceed the predetermined threshold when there is a certain level of speech or voice contained in the remote audio signal. In this situation, it may be desirable to prevent automatic adjustment of the beamformed lobes so that lobes are not directed to pick up the sound from the remote audio signal, e.g., that is being played in local environment. However, if the energy level of the remote audio signal does not exceed the predetermined threshold, then the automatic adjustment of beamformed lobes may be performed. The automatic adjustment of the beamformed lobes may include, for example, the automatic focus and/or placement of the lobes as described herein. In these embodiments, the location of a lobe may be improved and automatically focused and/or placed when the activity of the remote audio signal does not exceed a predetermined threshold, and inhibited or restricted from being automatically focused and/or placed when the activity of the remote audio signal exceeds the predetermined threshold.

Through the use of the systems and methods herein, the quality of the coverage of audio sources in an environment may be improved by, for example, ensuring that beamformed lobes are optimally picking up the audio sources even if the audio sources have moved and changed locations from an initial position. The quality of the coverage of audio source in an environment may also be improved by, for example, reducing the likelihood that beamformed lobes are deployed (e.g., focused or placed) to pick up unwanted sounds like voice, speech, or other noise from the far end.

Figure 4:
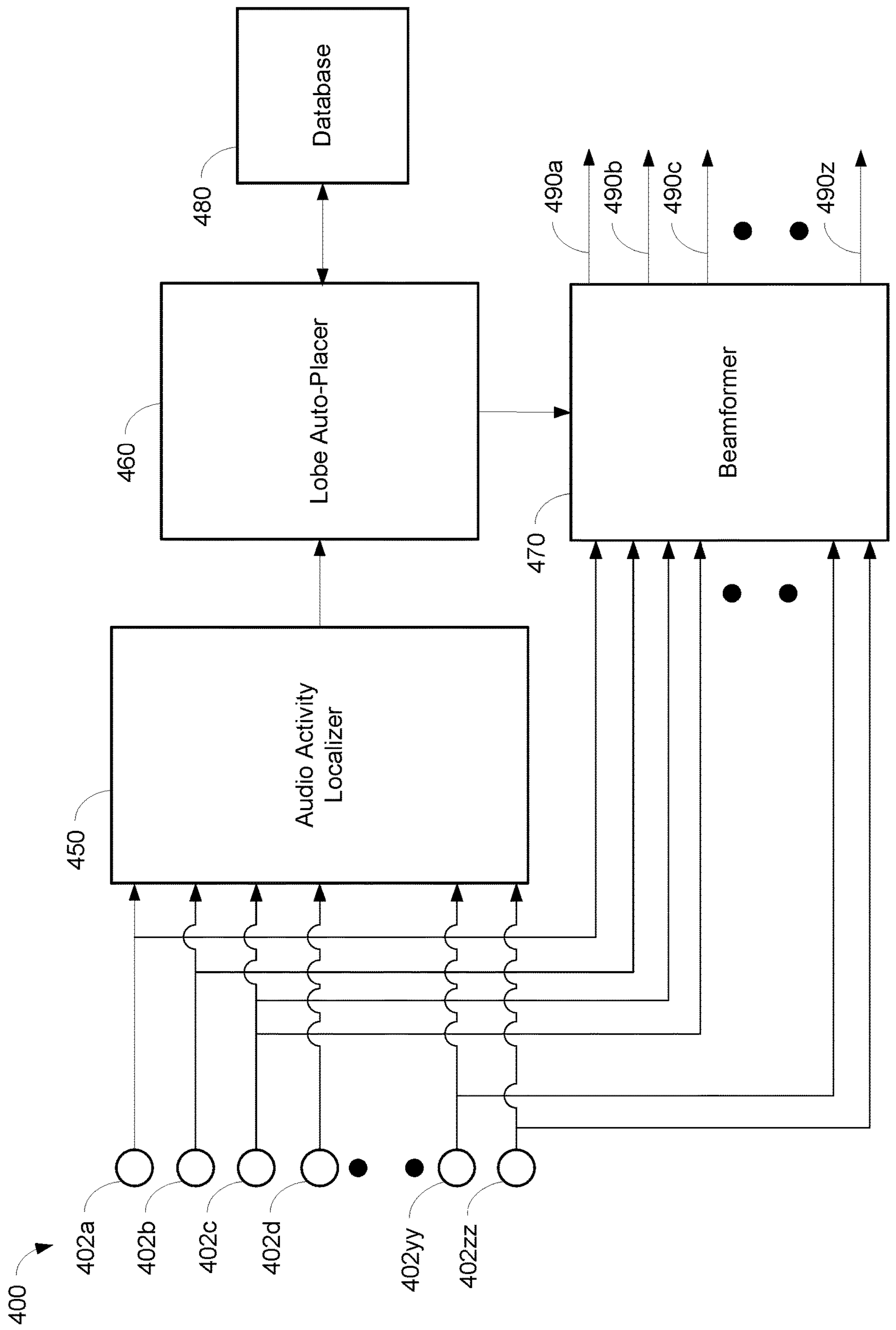
FIG. 4 is a schematic diagram of an array microphone with automatic placement of beamformed lobes of an array microphone in response to the detection of sound activity, in accordance with some embodiments.

FIGS. 1 and 4 are schematic diagrams of array microphones 100, 400 that can detect sounds from audio sources at various frequencies. The array microphone 100, 400 may be utilized in a conference room or boardroom, for example, where the audio sources may be one or more human speakers. Other sounds may be present in the environment which may be undesirable, such as noise from ventilation, other persons, audio/visual equipment, electronic devices, etc. In a typical situation, the audio sources may be seated in chairs at a table, although other configurations and placements of the audio sources are contemplated and possible.

The array microphone 100, 400 may be placed on or in a table, lectern, desktop, wall, ceiling, etc. so that the sound from the audio sources can be detected and captured, such as speech spoken by human speakers. The array microphone 100, 400 may include any number of microphone elements 102*a,b, . . . , zz*, 402*a,b, . . . , zz*, for example, and be able to form multiple pickup patterns with lobes so that the sound from the audio sources can be detected and captured. Any appropriate number of microphone elements 102, 402 are possible and contemplated.

Each of the microphone elements 102, 402 in the array microphone 100, 400 may detect sound and convert the sound to an analog audio signal. Components in the array microphone 100, 400, such as analog to digital converters, processors, and/or other components, may process the analog audio signals and ultimately generate one or more digital audio output signals. The digital audio output signals may conform to the Dante standard for transmitting audio over Ethernet, in some embodiments, or may conform to another standard and/or transmission protocol. In embodiments, each of the microphone elements 102, 402 in the array microphone 100, 400 may detect sound and convert the sound to a digital audio signal.

One or more pickup patterns may be formed by a beamformer 170, 470 in the array microphone 100, 400 from the audio signals of the microphone elements 102, 402. The beamformer 170, 470 may generate digital output signals 190*a,b,c*, . . . z, 490*a,b,c*, . . . , z corresponding to each of the pickup patterns. The pickup patterns may be composed of one or more lobes, e.g., main, side, and back lobes. In other embodiments, the microphone elements 102, 402 in the array microphone 100, 400 may output analog audio signals so that other components and devices (e.g., processors, mixers, recorders, amplifiers, etc.) external to the array microphone 100, 400 may process the analog audio signals.

The array microphone 100 of FIG. 1 that automatically focuses beamformed lobes in response to the detection of sound activity may include the microphone elements 102; an audio activity localizer 150 in wired or wireless communication with the microphone elements 102; a lobe auto-focuser 160 in wired or wireless communication with the audio activity localizer 150; a beamformer 170 in wired or wireless communication with the microphone elements 102 and the lobe auto-focuser 160; and a database 180 in wired or wireless communication with the lobe auto-focuser 160. These components are described in more detail below.

The array microphone 400 of FIG. 4 that automatically places beamformed lobes in response to the detection of sound activity may include the microphone elements 402; an audio activity localizer 450 in wired or wireless communication with the microphone elements 402; a lobe auto-placer 460 in wired or wireless communication with the audio activity localizer 450; a beamformer 470 in wired or wireless communication with the microphone elements 402 and the lobe auto-placer 460; and a database 480 in wired or wireless communication with the lobe auto-placer 460. These components are described in more detail below.

In embodiments, the array microphone 100, 400 may include other components, such as an acoustic echo canceller or an automixer, that works with the audio activity localizer 150, 450 and/or the beamformer 170, 470. For example, when a lobe is moved to new coordinates in response to detecting new sound activity, as described herein, information from the movement of the lobe may be utilized by an acoustic echo canceller to minimize echo during the movement and/or by an automixer to improve its decision making capability. As another example, the movement of a lobe may be influenced by the decision of an automixer, such as allowing a lobe to be moved that the automixer has identified as having pertinent voice activity. The beamformer 170, 470 may be any suitable beamformer, such as a delay and sum beamformer or a minimum variance distortionless response (MVDR) beamformer.

The various components included in the array microphone 100, 400 may be implemented using software executable by one or more servers or computers, such as a computing device with a processor and memory, graphics processing units (GPUs), and/or by hardware (e.g., discrete logic circuits, application specific integrated circuits (ASIC), programmable gate arrays (PGA), field programmable gate arrays (FPGA), etc.

In some embodiments, the microphone elements 102, 402 may be arranged in concentric rings and/or harmonically nested. The microphone elements 102, 402 may be arranged to be generally symmetric, in some embodiments. In other embodiments, the microphone elements 102, 402 may be arranged asymmetrically or in another arrangement. In further embodiments, the microphone elements 102, 402 may be arranged on a substrate, placed in a frame, or individually suspended, for example. An embodiment of an array microphone is described in commonly assigned U.S. Pat. No. 9,565,493, which is hereby incorporated by reference in its entirety herein. In embodiments, the microphone elements 102, 402 may be unidirectional microphones that are primarily sensitive in one direction. In other embodiments, the microphone elements 102, 402 may have other directionalities or polar patterns, such as cardioid, subcardioid, or omnidirectional, as desired. The microphone elements 102, 402 may be any suitable type of transducer that can detect the sound from an audio source and convert the sound to an electrical audio signal. In an embodiment, the microphone elements 102, 402 may be micro-electrical mechanical system (MEMS) microphones. In other embodiments, the microphone elements 102, 402 may be condenser microphones, balanced armature microphones, electret microphones, dynamic microphones, and/or other types of microphones. In embodiments, the microphone elements 102, 402 may be arrayed in one dimension or two dimensions. The array microphone 100, 400 may be placed or mounted on a table, a wall, a ceiling, etc., and may be next to, under, or above a video monitor, for example.

Figure 2:
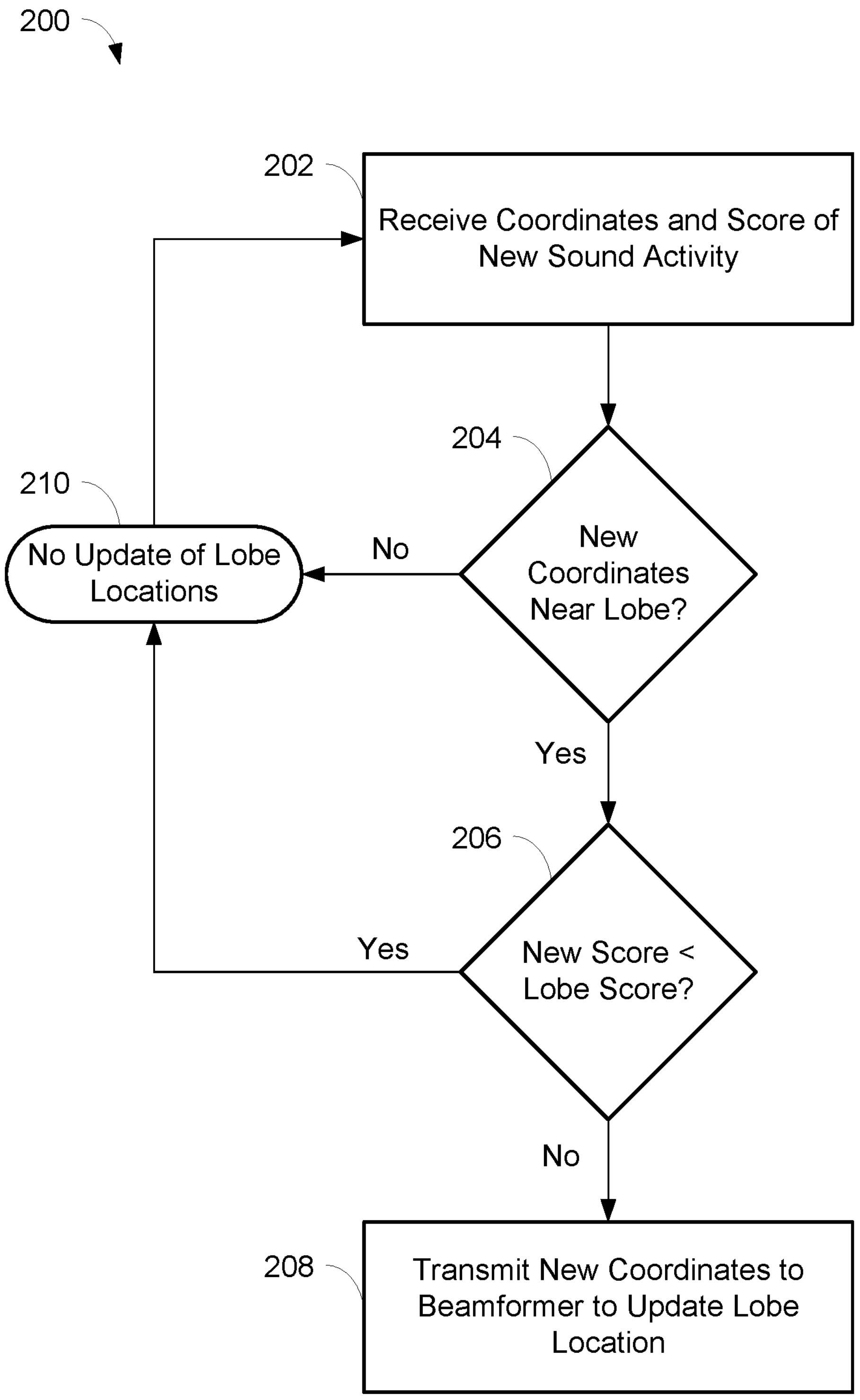
FIG. 2 is a flowchart illustrating operations for automatic focusing of beamformed lobes, in accordance with some embodiments.

An embodiment of a process 200 for automatic focusing of previously placed beamformed lobes of the array microphone 100 is shown in FIG. 2. The process 200 may be performed by the lobe auto-focuser 160 so that the array microphone 100 can output one or more audio signals 180 from the array microphone 100, where the audio signals 180 may include sound picked up by the beamformed lobes that are focused on new sound activity of an audio source. One or more processors and/or other processing components (e.g., analog to digital converters, encryption chips, etc.) within or external to the array microphone 100 may perform any, some, or all of the steps of the process 200. One or more other types of components (e.g., memory, input and/or output devices, transmitters, receivers, buffers, drivers, discrete components, etc.) may also be utilized in conjunction with the processors and/or other processing components to perform any, some, or all of the steps of the process 200.

At step 202, the coordinates and a confidence score corresponding to new sound activity may be received at the lobe auto-focuser 160 from the audio activity localizer 150. The audio activity localizer 150 may continuously scan the environment of the array microphone 100 to find new sound activity. The new sound activity found by the audio activity localizer 150 may include suitable audio sources, e.g., human speakers, that are not stationary. The coordinates of the new sound activity may be a particular three dimensional coordinate relative to the location of the array microphone 100, such as in Cartesian coordinates (i.e., x, y, z), or in spherical coordinates (i.e., radial distance/magnitude r, elevation angle θ (theta), azimuthal angle (p (phi)). The confidence score of the new sound activity may denote the certainty of the coordinates and/or the quality of the sound activity, for example. In embodiments, other suitable metrics related to the new sound activity may be received and utilized at step 202. It should be noted that Cartesian coordinates may be readily converted to spherical coordinates, and vice versa, as needed.

The lobe auto-focuser 160 may determine whether the coordinates of the new sound activity are nearby (i.e., in the vicinity of) an existing lobe, at step 204. Whether the new sound activity is nearby an existing lobe may be based on the difference in azimuth and/or elevation angles of (1) the coordinates of the new sound activity and (2) the coordinates of the existing lobe, relative to a predetermined threshold. The distance of the new sound activity away from the microphone 100 may also influence the determination of whether the coordinates of the new sound activity are nearby an existing lobe. The lobe auto-focuser 160 may retrieve the coordinates of the existing lobe from the database 180 for use in step 204, in some embodiments. An embodiment of the determination of whether the coordinates of the new sound activity are nearby an existing lobe is described in more detail below with respect to FIG. 6.

If the lobe auto-focuser 160 determines that the coordinates of the new sound activity are not nearby an existing lobe at step 204, then the process 200 may end at step 210 and the locations of the lobes of the array microphone 100 are not updated. In this scenario, the coordinates of the new sound activity may be considered to be outside the coverage area of the array microphone 100 and the new sound activity may therefore be ignored. However, if at step 204 the lobe auto-focuser 160 determines that the coordinates of the new sound activity are nearby an existing lobe, then the process 200 continues to step 206. In this scenario, the coordinates of the new sound activity may be considered to be an improved (i.e., more focused) location of the existing lobe.

At step 206, the lobe auto-focuser 160 may compare the confidence score of the new sound activity to the confidence score of the existing lobe. The lobe auto-focuser 160 may retrieve the confidence score of the existing lobe from the database 180, in some embodiments. If the lobe auto-focuser 160 determines at step 206 that the confidence score of the new sound activity is less than (i.e., worse than) the confidence score of the existing lobe, then the process 200 may end at step 210 and the locations of the lobes of the array microphone 100 are not updated. However, if the lobe auto-focuser 160 determines at step 206 that the confidence score of the new sound activity is greater than or equal to (i.e., better than or more favorable than) the confidence score of the existing lobe, then the process 200 may continue to step 208. At step 208, the lobe auto-focuser 160 may transmit the coordinates of the new sound activity to the beamformer 170 so that the beamformer 170 can update the location of the existing lobe to the new coordinates. In addition, the lobe auto-focuser 160 may store the new coordinates of the lobe in the database 180.

In some embodiments, at step 208, the lobe auto-focuser 160 may limit the movement of an existing lobe to prevent and/or minimize sudden changes in the location of the lobe. For example, the lobe auto-focuser 160 may not move a particular lobe to new coordinates if that lobe has been recently moved within a certain recent time period. As another example, the lobe auto-focuser 160 may not move a particular lobe to new coordinates if those new coordinates are too close to the lobe's current coordinates, too close to another lobe, overlapping another lobe, and/or considered too far from the existing position of the lobe.

The process 200 may be continuously performed by the array microphone 100 as the audio activity localizer 150 finds new sound activity and provides the coordinates and confidence score of the new sound activity to the lobe auto-focuser 160. For example, the process 200 may be performed as audio sources, e.g., human speakers, are moving around a conference room so that one or more lobes can be focused on the audio sources to optimally pick up their sound.

Figure 3:
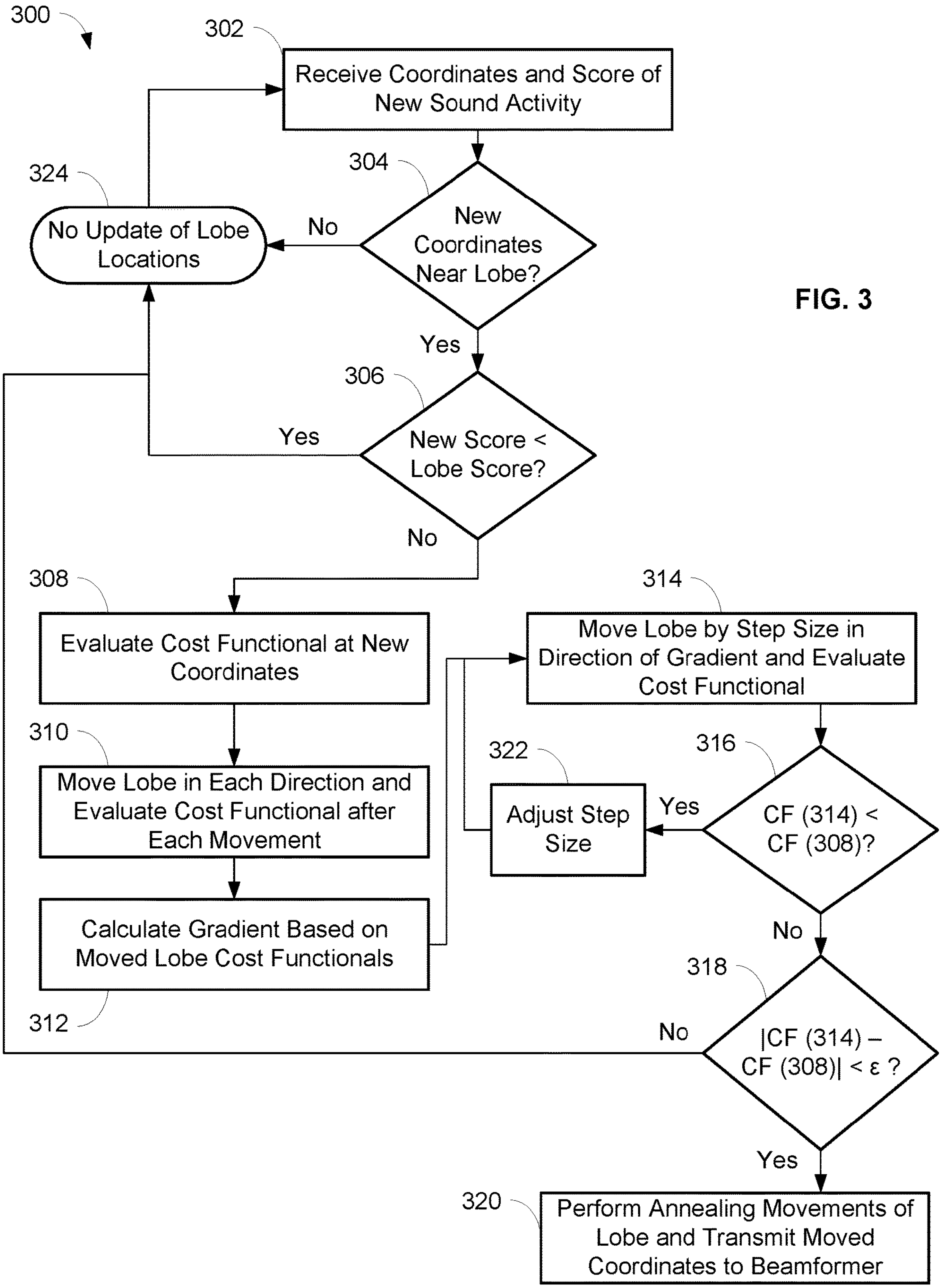
FIG. 3 is a flowchart illustrating operations for automatic focusing of beamformed lobes that utilizes a cost functional, in accordance with some embodiments.

An embodiment of a process 300 for automatic focusing of previously placed beamformed lobes of the array microphone 100 using a cost functional is shown in FIG. 3. The process 300 may be performed by the lobe auto-focuser 160 so that the array microphone 100 can output one or more audio signals 180, where the audio signals 180 may include sound picked up by the beamformed lobes that are focused on new sound activity of an audio source. One or more processors and/or other processing components (e.g., analog to digital converters, encryption chips, etc.) within or external to the microphone array 100 may perform any, some, or all of the steps of the process 300. One or more other types of components (e.g., memory, input and/or output devices, transmitters, receivers, buffers, drivers, discrete components, etc.) may also be utilized in conjunction with the processors and/or other processing components to perform any, some, or all of the steps of the process 300.

Steps 302, 304, and 306 of the process 300 for the lobe auto-focuser 160 may be substantially the same as steps 202, 204, and 206 of the process 200 of FIG. 2 described above. In particular, the coordinates and a confidence score corresponding to new sound activity may be received at the lobe auto-focuser 160 from the audio activity localizer 150. The lobe auto-focuser 160 may determine whether the coordinates of the new sound activity are nearby (i.e., in the vicinity of) an existing lobe. If the coordinates of the new sound activity are not nearby an existing lobe (or if the confidence score of the new sound activity is less than the confidence score of the existing lobe), then the process 300 may proceed to step 324 and the locations of the lobes of the array microphone 100 are not updated. However, if at step 306, the lobe auto-focuser 160 determines that the confidence score of the new sound activity is more than (i.e., better than or more favorable than) the confidence score of the existing lobe, then the process 300 may continue to step 308. In this scenario, the coordinates of the new sound activity may be considered to be a candidate location to move the existing lobe to, and a cost functional of the existing lobe may be evaluated and maximized, as described below.

A cost functional for a lobe may take into account spatial aspects of the lobe and the audio quality of the new sound activity. As used herein, a cost functional and a cost function have the same meaning. In particular, the cost functional for a lobe i may be defined in some embodiments as a function of the coordinates of the new sound activity ($LC_i$), a signal-to-noise ratio for the lobe ($SNR_i$), a gain value for the lobe ($Gain_i$), voice activity detection information related to the new sound activity ($VAD_i$), and distances from the coordinates of the existing lobe (distance($LO_i$)). In other embodiments, the cost functional for a lobe may be a function of other information. The cost functional for a lobe i can be written as $J_i(x, y, z)$ with Cartesian coordinates or $J_i$(azimuth, elevation, magnitude) with spherical coordinates, for example. Using the cost functional with Cartesian coordinates as exemplary, the cost functional $J_i(x, y, z)=f(LC_i, \text{distance}(LO_i), Gain_i, SNR_i, VAD_i)$. Accordingly, the lobe may be moved by evaluating and maximizing the cost functional $J_i$ over a spatial grid of coordinates, such that the movement of the lobe is in the direction of the gradient (i.e., steepest ascent) of the cost functional. The maximum of the cost functional may be the same as the coordinates of the new sound activity received by the lobe auto-focuser 160 at step 302 (i.e., the candidate location), in some situations. In other situations, the maximum of the cost functional may move the lobe to a different position than the coordinates of the new sound activity, when taking into account the other parameters described above.

At step 308, the cost functional for the lobe may be evaluated by the lobe auto-focuser 160 at the coordinates of the new sound activity. The evaluated cost functional may be stored by the lobe auto-focuser 160 in the database 180, in some embodiments. At step 310, the lobe auto-focuser 160 may move the lobe by each of an amount Δx, Δy, Δz in the x, y, and z directions, respectively, from the coordinates of the new sound activity. After each movement, the cost functional may be evaluated by the lobe auto-focuser 160 at each of these locations. For example, the lobe may be moved to a location (x+Δx, y, z) and the cost functional may be evaluated at that location; then moved to a location (x, y+Δy, z) and the cost functional may be evaluated at that location; and then moved to a location (x, y, z+Δz) and the cost functional may be evaluated at that location. The lobe may be moved by the amounts Δx, Δy, Δz in any order at step 310. Each of the evaluated cost functionals at these locations may be stored by the lobe auto-focuser 160 in the database 180, in some embodiments. The evaluations of the cost functional are performed by the lobe auto-focuser 160 at step 310 in order to compute an estimate of partial derivatives and the gradient of the cost functional, as described below. It should be noted that while the description above is with relation to Cartesian coordinates, a similar operation may be performed with spherical coordinates (e.g., Δazimuth, Δelevation, Δmagnitude).

At step 312, the gradient of the cost functional may be calculated by the lobe auto-focuser 160 based on the set of estimates of the partial derivatives. The gradient ∇J may calculated as follows:

$$\nabla J = (gx_i, gy_i, gz_i) \approx \left( \frac{J_i(x_i + \Delta x, y_i, z_i) - J_i(x_i, y_i, z_i)}{\Delta x}, \frac{J_i(x_i, y_i + \Delta y, z_i) - J_i(x_i, y_i, z_i)}{\Delta y}, \frac{J_i(x_i, y_i, z_i + \Delta z) - J_i(x_i, y_i, z_i)}{\Delta z} \right)$$

At step 314, the lobe auto-focuser 160 may move the lobe by a predetermined step size p in the direction of the gradient ∇J calculated at step 312. In particular, the lobe may be moved to a new location: $(x_i+\mu gx_i, y_i+\mu gy_i, z_i+\mu gz_i)$. The cost functional of the lobe at this new location may also be evaluated by the lobe auto-focuser 160 at step 314. This cost functional may be stored by the lobe auto-focuser 160 in the database 180, in some embodiments.

At step 316, the lobe auto-focuser 160 may compare the cost functional of the lobe at the new location (evaluated at step 314) with the cost functional of the lobe at the coordinates of the new sound activity (evaluated at step 308). If the cost functional of the lobe at the new location is less than the cost functional of the lobe at the coordinates of the new sound activity at step 316, then the step size p at step 314 may be considered as too large, and the process 300 may continue to step 322. At step 322, the step size may be adjusted and the process may return to step 314.

However, if the cost functional of the lobe at the new location is not less than the cost functional of the lobe at the coordinates of the new sound activity at step 316, then the process 300 may continue to step 318. At step 318, the lobe auto-focuser 160 may determine whether the difference between (1) the cost functional of the lobe at the new location (evaluated at step 314) and (2) the cost functional of the lobe at the coordinates of the new sound activity (evaluated at step 308) is close, i.e., whether the absolute value of the difference is within a small quantity E. If the condition is not satisfied at step 318, then it may be considered that a local maximum of the cost functional has not been reached. The process 300 may proceed to step 324 and the locations of the lobes of the array microphone 100 are not updated.

However, if the condition is satisfied at step 318, then it may be considered that a local maximum of the cost functional has been reached and that the lobe has been auto focused, and the process 300 proceeds to step 320. At step 320, the lobe auto-focuser 160 may transmit the coordinates of the new sound activity to the beamformer 170 so that the beamformer 170 can update the location of the lobe to the new coordinates. In addition, the lobe auto-focuser 160 may store the new coordinates of the lobe in the database 180.

In some embodiments, annealing/dithering movements of the lobe may be applied by the lobe auto-focuser 160 at step 320. The annealing/dithering movements may be applied to nudge the lobe out of a local maximum of the cost functional to attempt to find a better local maximum (and therefore a better location for the lobe). The annealing/dithering locations may be defined by $(x_i+rx_i, y_i+ry_1, z_i+rz_i)$, where $(rx_i, ry_i, rz_i)$ are small random values.

The process 300 may be continuously performed by the array microphone 100 as the audio activity localizer 150 finds new sound activity and provides the coordinates and confidence score of the new sound activity to the lobe auto-focuser 160. For example, the process 300 may be performed as audio sources, e.g., human speakers, are moving around a conference room so that one or more lobes can be focused on the audio sources to optimally pick up their sound.

In embodiments, the cost functional may be re-evaluated and updated, e.g., steps 308-318 and 322, and the coordinates of the lobe may be adjusted without needing to receive a set of coordinates of new sound activity, e.g., at step 302. For example, an algorithm may detect which lobe of the array microphone 100 has the most sound activity without providing a set of coordinates of new sound activity. Based on the sound activity information from such an algorithm, the cost functional may be re-evaluated and updated.

Figure 5:
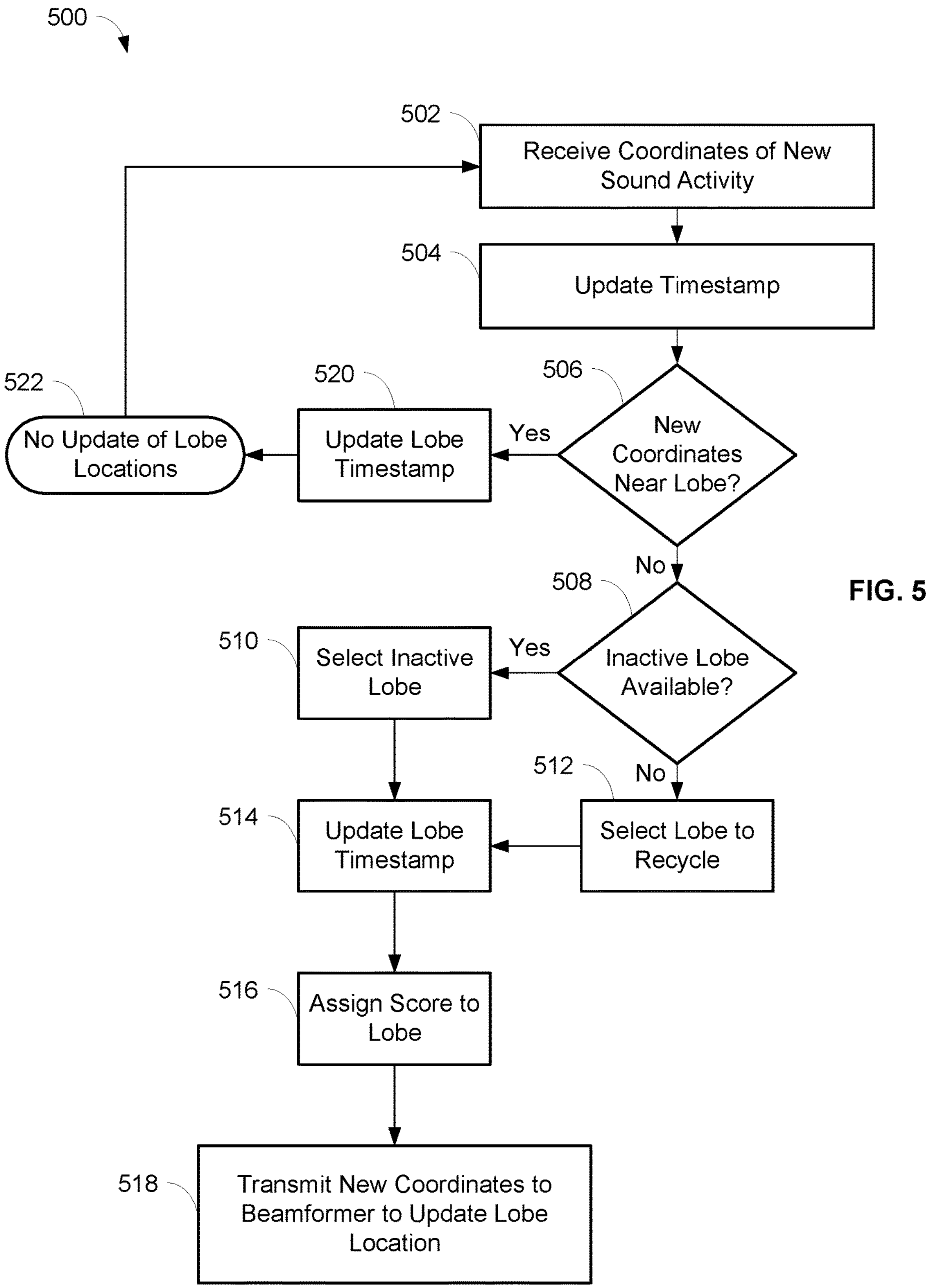
FIG. 5 is a flowchart illustrating operations for automatic placement of beamformed lobes, in accordance with some embodiments.

An embodiment of a process 500 for automatic placement or deployment of beamformed lobes of the array microphone 400 is shown in FIG. 5. The process 500 may be performed by the lobe auto-placer 460 so that the array microphone 400 can output one or more audio signals 480 from the array microphone 400 shown in FIG. 4, where the audio signals 480 may include sound picked up by the placed beamformed lobes that are from new sound activity of an audio source. One or more processors and/or other processing components (e.g., analog to digital converters, encryption chips, etc.) within or external to the microphone array 400 may perform any, some, or all of the steps of the process 500. One or more other types of components (e.g., memory, input and/or output devices, transmitters, receivers, buffers, drivers, discrete components, etc.) may also be utilized in conjunction with the processors and/or other processing components to perform any, some, or all of the steps of the process 500.

At step 502, the coordinates corresponding to new sound activity may be received at the lobe auto-placer 460 from the audio activity localizer 450. The audio activity localizer 450 may continuously scan the environment of the array microphone 400 to find new sound activity. The new sound activity found by the audio activity localizer 450 may include suitable audio sources, e.g., human speakers, that are not stationary. The coordinates of the new sound activity may be a particular three dimensional coordinate relative to the location of the array microphone 400, such as in Cartesian coordinates (i.e., x, y, z), or in spherical coordinates (i.e., radial distance/magnitude r, elevation angle θ (theta), azimuthal angle φ (phi)).

Figure 19:
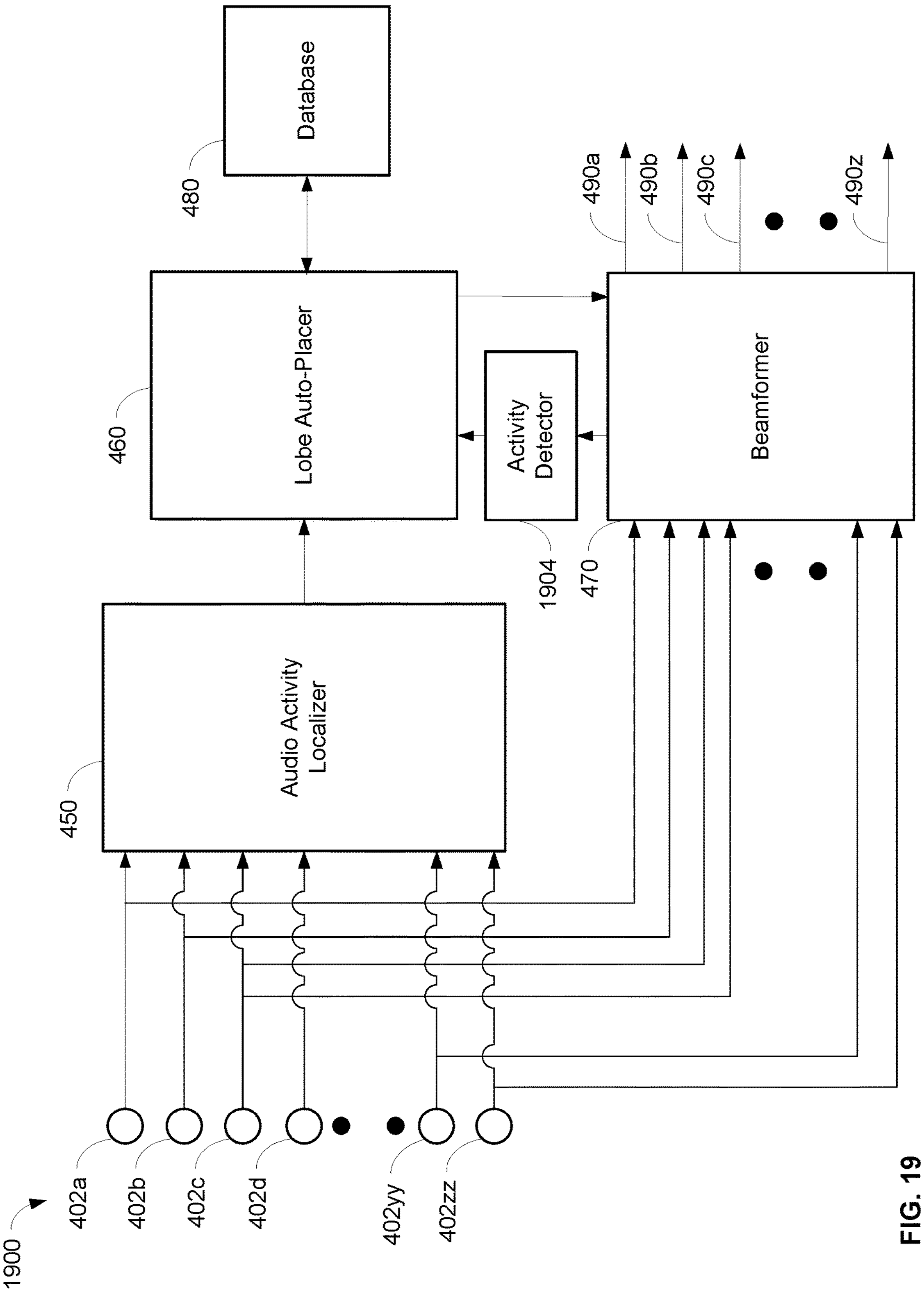
FIG. 19 is a schematic diagram of an array microphone with automatic placement of beamformed lobes of an array microphone in response to the detection of sound activity and activity detection of the sound activity, in accordance with some embodiments.

In embodiments, the placement of beamformed lobes may occur based on whether an amount of activity of the new sound activity exceeds a predetermined threshold. FIG. 19 is a schematic diagram of an array microphone 1900 that can detect sounds from audio sources at various frequencies, and automatically place beamformed lobes in response to the detection of sound activity while taking into account the amount of activity of the new sound activity. In embodiments, the array microphone 1900 may include some or all of the same components as the array microphone 400 described above, e.g., the microphones 402, the audio activity localizer 450, the lobe auto-placer 460, the beamformer 470, and/or the database 480. The array microphone 1900 may also include an activity detector 1904 in communication with the lobe auto-placer 460 and the beamformer 470.

The activity detector 1904 may detect an amount of activity in the new sound activity. In some embodiments, the amount of activity may be measured as the energy level of the new sound activity. In other embodiments, the amount of activity may be measured using methods in the time domain and/or frequency domain, such as by applying machine learning (e.g., using cepstrum coefficients), measuring signal non-stationarity in one or more frequency bands, and/or searching for features of desirable sound or speech.

In embodiments, the activity detector 1904 may be a voice activity detector (VAD) which can determine whether there is voice and/or noise present in the remote audio signal. A VAD may be implemented, for example, by analyzing the spectral variance of the remote audio signal, using linear predictive coding, applying machine learning or deep learning techniques to detect voice and/or noise, and/or using well-known techniques such as the ITU G.729 VAD, ETSI standards for VAD calculation included in the GSM specification, or long term pitch prediction.

Based on the detected amount of activity, automatic lobe placement may be performed or not performed. The automatic lobe placement may be performed when the detected activity of the new sound activity satisfies predetermined criteria. Conversely, the automatic lobe placement may not be performed when the detected activity of the new sound activity does not satisfy predetermined criteria. For example, satisfying the predetermined criteria may indicate that the new sound activity includes voice, speech, or other sound that is preferably to be picked up by a lobe. As another example, not satisfying the predetermined criteria may indicate that the new sound activity does not include voice, speech, or other sound that is preferably to be picked up by a lobe. By inhibiting automatic lobe placement in this latter scenario, a lobe will not be placed to avoid picking up sound from the new sound activity.

Figure 20:
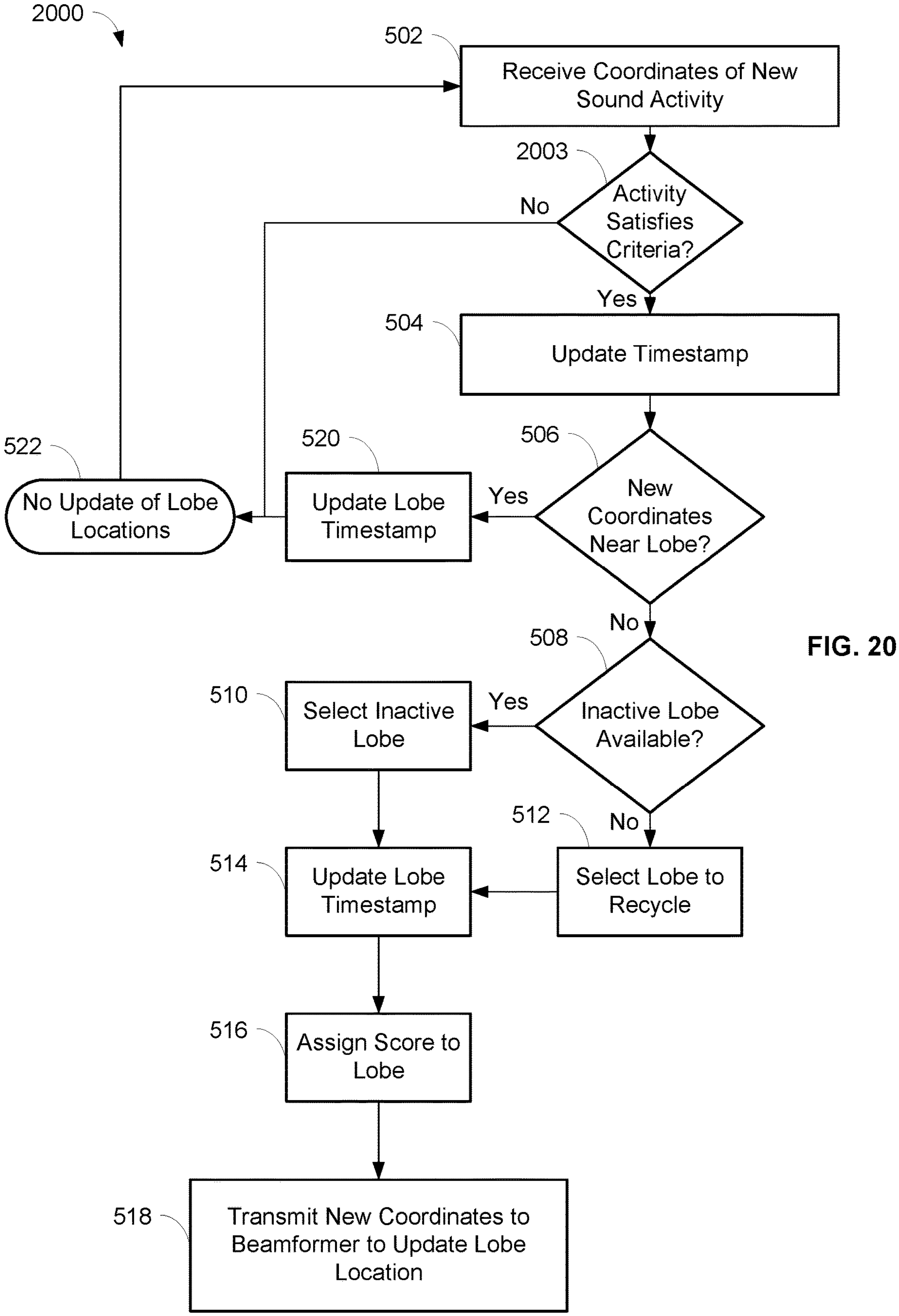
FIG. 20 is a flowchart illustrating operations for automatic placement of beamformed lobes including activity detection of sound activity, in accordance with some embodiments.

As seen in the process 2000 of FIG. 20, at step 2003 following step 502, it can be determined whether the amount of activity of the new sound activity satisfies the predetermined criteria. The new sound activity may be received by the activity detector 1904 from the beamformer 470, for example. The detected amount of activity may correspond to the amount of speech, voice, noise, etc. in the new sound activity. In embodiments, the amount of activity may be measured as the energy level of the new sound activity, or as the amount of voice in the new sound activity. In embodiments, the detected amount of activity may specifically indicate the amount of voice or speech in the new sound activity. In other embodiments, the detected amount of activity may be a voice-to-noise ratio, or indicate an amount of noise in the new sound activity.

If the amount of activity does not satisfy the predetermined criteria at step 2003, then the process 2000 may end at step 522 and the locations of the lobes of the array microphone 1900 are not updated. The detected amount of activity of the new sound activity may not satisfy the predetermined criteria when there is a relatively low amount of speech of voice in the new sound activity, and/or the voice-to-noise ratio is relatively low. Similarly, the detected amount of activity of the new sound activity may not satisfy the predetermined criteria when there is a relatively high amount of noise in the new sound activity. Accordingly, not automatically placing a lobe to detect the new sound activity may help to ensure that undesirable sound is not picked.

If the amount of activity satisfies the predetermined criteria at step 2003, then the process 2000 may continue to step 504 as described below. The detected amount of activity of the new sound activity may satisfy the predetermined criteria when there is a relatively high amount of speech or voice in the new sound activity, and/or the voice-to-noise ratio is relatively high. Similarly, the detected amount of activity of the new sound activity may satisfy the predetermined criteria when there is a relatively low amount of noise in the new sound activity. Accordingly, automatically placing a lobe to detect the new sound activity may be desirable in this scenario.

Returning to the process 500, at step 504, the lobe auto-placer 460 may update a timestamp, such as to the current value of a clock. The timestamp may be stored in the database 480, in some embodiments. In embodiments, the timestamp and/or the clock may be real time values, e.g., hour, minute, second, etc. In other embodiments, the timestamp and/or the clock may be based on increasing integer values that may enable tracking of the time ordering of events.

The lobe auto-placer 460 may determine at step 506 whether the coordinates of the new sound activity are nearby (i.e., in the vicinity of) an existing active lobe. Whether the new sound activity is nearby an existing lobe may be based on the difference in azimuth and/or elevation angles of (1) the coordinates of the new sound activity and (2) the coordinates of the existing lobe, relative to a predetermined threshold. The distance of the new sound activity away from the microphone 400 may also influence the determination of whether the coordinates of the new sound activity are nearby an existing lobe. The lobe auto-placer 460 may retrieve the coordinates of the existing lobe from the database 480 for use in step 506, in some embodiments. An embodiment of the determination of whether the coordinates of the new sound activity are nearby an existing lobe is described in more detail below with respect to FIG. 6.

If at step 506 the lobe auto-placer 460 determines that the coordinates of the new sound activity are nearby an existing lobe, then the process 500 continues to step 520. At step 520, the timestamp of the existing lobe is updated to the current timestamp from step 504. In this scenario, the existing lobe is considered able to cover (i.e., pick up) the new sound activity. The process 500 may end at step 522 and the locations of the lobes of the array microphone 400 are not updated.

However, if at step 506 the lobe auto-placer 460 determines that the coordinates of the new sound activity are not nearby an existing lobe, then the process 500 continues to step 508. In this scenario, the coordinates of the new sound activity may be considered to be outside the current coverage area of the array microphone 400, and therefore the new sound activity needs to be covered. At step 508, the lobe auto-placer 460 may determine whether an inactive lobe of the array microphone 400 is available. In some embodiments, a lobe may be considered inactive if the lobe is not pointed to a particular set of coordinates, or if the lobe is not deployed (i.e., does not exist). In other embodiments, a deployed lobe may be considered inactive based on whether a metric of the deployed lobe (e.g., time, age, etc.) satisfies certain criteria. If the lobe auto-placer 460 determines that there is an inactive lobe available at step 508, then the inactive lobe is selected at step 510 and the timestamp of the newly selected lobe is updated to the current timestamp (from step 504) at step 514.

However, if the lobe auto-placer 460 determines that there is not an inactive lobe available at step 508, then the process 500 may continue to step 512. At step 512, the lobe auto-placer 460 may select a currently active lobe to recycle to be pointed at the coordinates of the new sound activity. In some embodiments, the lobe selected for recycling may be an active lobe with the lowest confidence score and/or the oldest timestamp. The confidence score for a lobe may denote the certainty of the coordinates and/or the quality of the sound activity, for example. In embodiments, other suitable metrics related to the lobe may be utilized. The oldest timestamp for an active lobe may indicate that the lobe has not recently detected sound activity, and possibly that the audio source is no longer present in the lobe. The lobe selected for recycling at step 512 may have its timestamp updated to the current timestamp (from step 504) at step 514.

At step 516, a new confidence score may be assigned to the lobe, both when the lobe is a selected inactive lobe from step 510 or a selected recycled lobe from step 512. At step 518, the lobe auto-placer 460 may transmit the coordinates of the new sound activity to the beamformer 470 so that the beamformer 470 can update the location of the lobe to the new coordinates. In addition, the lobe auto-placer 460 may store the new coordinates of the lobe in the database 480.

The process 500 may be continuously performed by the array microphone 400 as the audio activity localizer 450 finds new sound activity and provides the coordinates of the new sound activity to the lobe auto-placer 460. For example, the process 500 may be performed as audio sources, e.g., human speakers, are moving around a conference room so that one or more lobes can be placed to optimally pick up the sound of the audio sources.

Figure 6:
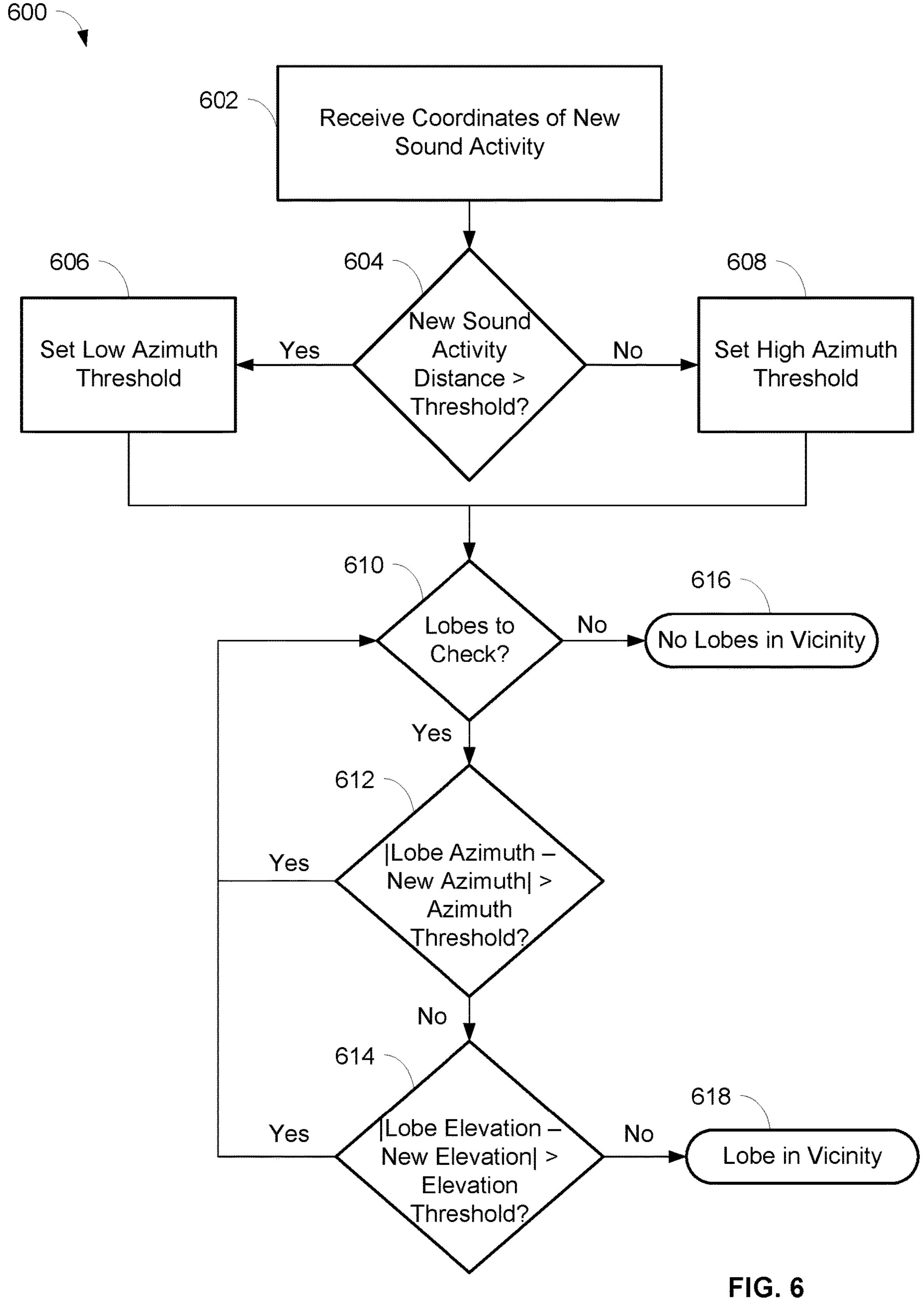
FIG. 6 is a flowchart illustrating operations for finding lobes near detected sound activity, in accordance with some embodiments.

An embodiment of a process 600 for finding previously placed lobes near sound activity is shown in FIG. 6. The process 600 may be utilized by the lobe auto-focuser 160 at step 204 of the process 200, at step 304 of the process 300, and/or at step 806 of the process 800, and/or by the lobe auto-placer 460 at step 506 of the process 500. In particular, the process 600 may determine whether the coordinates of the new sound activity are nearby an existing lobe of an array microphone 100, 400. Whether the new sound activity is nearby an existing lobe may be based on the difference in azimuth and/or elevation angles of (1) the coordinates of the new sound activity and (2) the coordinates of the existing lobe, relative to a predetermined threshold. The distance of the new sound activity away from the array microphone 100, 400 may also influence the determination of whether the coordinates of the new sound activity are nearby an existing lobe.

At step 602, the coordinates corresponding to new sound activity may be received at the lobe auto-focuser 160 or the lobe auto-placer 460 from the audio activity localizer 150, 450, respectively. The coordinates of the new sound activity may be a particular three dimensional coordinate relative to the location of the array microphone 100, 400, such as in Cartesian coordinates (i.e., x, y, z), or in spherical coordinates (i.e., radial distance/magnitude r, elevation angle θ (theta), azimuthal angle φ(phi)). It should be noted that Cartesian coordinates may be readily converted to spherical coordinates, and vice versa, as needed.

At step 604, the lobe auto-focuser 160 or the lobe auto-placer 460 may determine whether the new sound activity is relatively far away from the array microphone 100, 400 by evaluating whether the distance of the new sound activity is greater than a determined threshold. The distance of the new sound activity may be determined by the magnitude of the vector representing the coordinates of the new sound activity. If the new sound activity is determined to be relatively far away from the array microphone 100, 400 at step 604 (i.e., greater than the threshold), then at step 606 a lower azimuth threshold may be set for later usage in the process 600. If the new sound activity is determined to not be relatively far away from the array microphone 100, 400 at step 604 (i.e., less than or equal to the threshold), then at step 608 a higher azimuth threshold may be set for later usage in the process 600.

Following the setting of the azimuth threshold at step 606 or step 608, the process 600 may continue to step 610. At step 610, the lobe auto-focuser 160 or the lobe auto-placer 460 may determine whether there are any lobes to check for their vicinity to the new sound activity. If there are no lobes of the array microphone 100, 400 to check at step 610, then the process 600 may end at step 616 and denote that there are no lobes in the vicinity of the array microphone 100, 400.

However, if there are lobes of the array microphone 100, 400 to check at step 610, then the process 600 may continue to step 612 and examine one of the existing lobes. At step 612, the lobe auto-focuser 160 or the lobe auto-placer 460 may determine whether the absolute value of the difference between (1) the azimuth of the existing lobe and (2) the azimuth of the new sound activity is greater than the azimuth threshold (that was set at step 606 or step 608). If the condition is satisfied at step 612, then it may be considered that the lobe under examination is not within the vicinity of the new sound activity. The process 600 may return to step 610 to determine whether there are further lobes to examine.

However, if the condition is not satisfied at step 612, then the process 600 may proceed to step 614. At step 614, the lobe auto-focuser 160 or the lobe auto-placer 460 may determine whether the absolute value of the difference between (1) the elevation of the existing lobe and (2) the elevation of the new sound activity is greater than a predetermined elevation threshold. If the condition is satisfied at step 614, then it may be considered that the lobe under examination is not within the vicinity of the new sound activity. The process 600 may return to step 610 to determine whether there are further lobes to examine. However, if the condition is not satisfied at step 614, then the process 600 may end at step 618 and denote that the lobe under examination is in the vicinity of the new sound activity.

Figure 7:
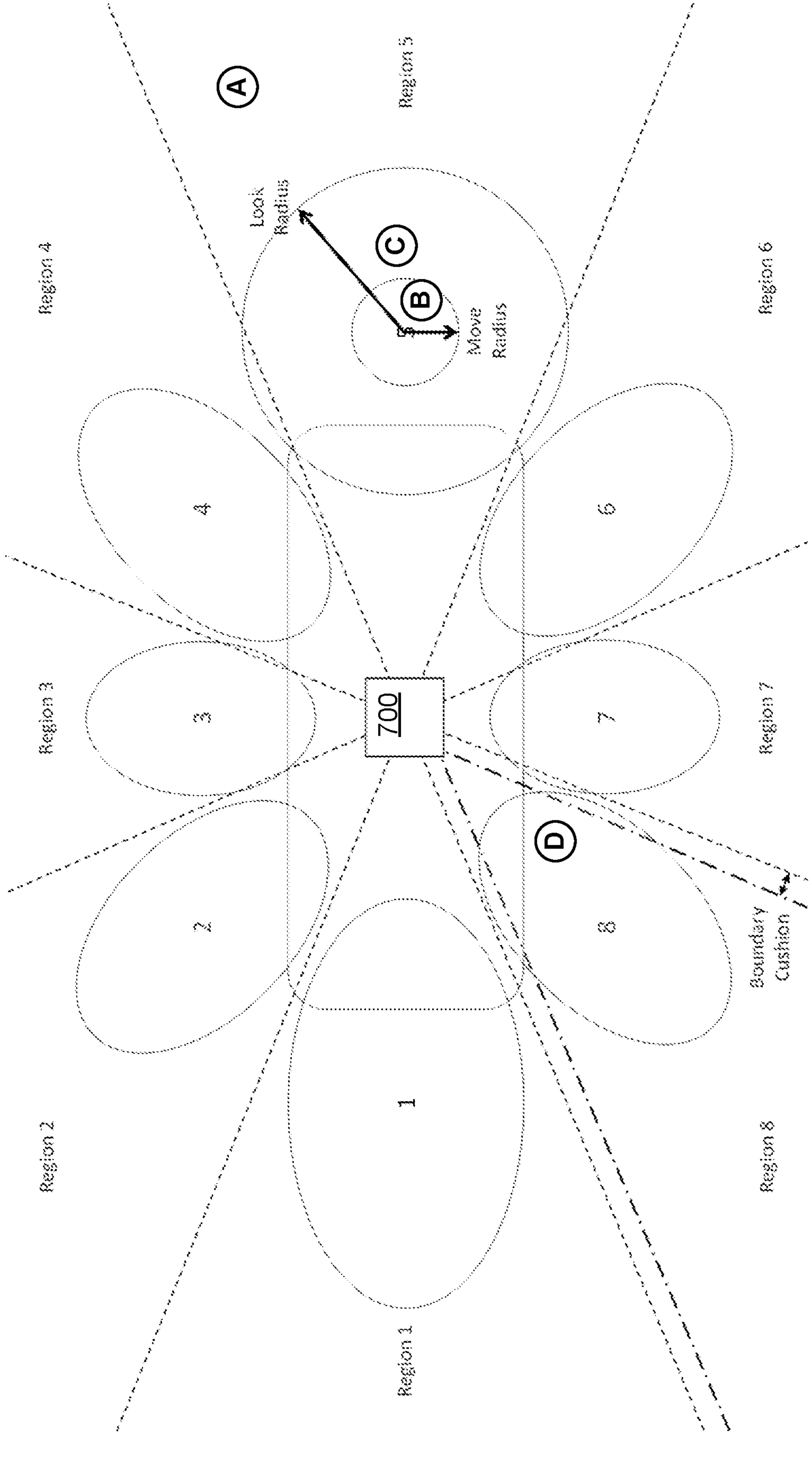
FIG. 7 is an exemplary depiction of an array microphone with beamformed lobes within lobe regions, in accordance with some embodiments.

FIG. 7 is an exemplary depiction of an array microphone 700 that can automatically focus previously placed beamformed lobes within associated lobe regions in response to the detection of new sound activity. In embodiments, the array microphone 700 may include some or all of the same components as the array microphone 100 described above, e.g., the audio activity localizer 150, the lobe auto-focuser 160, the beamformer 170, and/or the database 180. Each lobe of the array microphone 700 may be moveable within its associated lobe region, and a lobe may not cross the boundaries between the lobe regions. It should be noted that while FIG. 7 depicts eight lobes with eight associated lobe regions, any number of lobes and associated lobe regions is possible and contemplated, such as the four lobes with four associated lobe regions depicted in FIGS. 10, 12, 13, and 15. It should also be noted that FIGS. 7, 10, 12, 13, and 15 are depicted as two-dimensional representations of the three-dimensional space around an array microphone.

At least two sets of coordinates may be associated with each lobe of the array microphone 700: (1) original or initial coordinates $LO_i$(e.g., that are configured automatically or manually at the time of set up of the array microphone 700), and (2) current coordinates $\overrightarrow{LC_1}$ where a lobe is currently pointing at a given time. The sets of coordinates may indicate the position of the center of a lobe, in some embodiments. The sets of coordinates may be stored in the database 180, in some embodiments.

In addition, each lobe of the array microphone 700 may be associated with a lobe region of three-dimensional space around it. In embodiments, a lobe region may be defined as a set of points in space that is closer to the initial coordinates $LO_i$ of a lobe than to the coordinates of any other lobe of the array microphone. In other words, if p is defined as a point in space, then the point p may belong to a particular lobe region $LR_i$, if the distance D between the point p and the center of a lobe i ($LO_i$) is the smallest than for any other lobe, as in the following:

$$p \in LR_i \text{ iff } i = \underset{1 \le i \le N}{\operatorname{argmin}}(D(p, LO_i)).$$

Regions that are defined in this fashion are known as Voronoi regions or Voronoi cells. For example, it can be seen in FIG. 7 that there are eight lobes with associated lobe regions that have boundaries depicted between each of the lobe regions. The boundaries between the lobe regions are the sets of points in space that are equally distant from two or more adjacent lobes. It is also possible that some sides of a lobe region may be unbounded. In embodiments, the distance D may be the Euclidean distance between point p and $LO_i$, e.g., $\sqrt{(x_1-x_2)^2+(y_1-y_2)^2+(z_1-z_2)^2}$. In some embodiments, the lobe regions may be recalculated as particular lobes are moved.

In embodiments, the lobe regions may be calculated and/or updated based on sensing the environment (e.g., objects, walls, persons, etc.) that the array microphone 700 is situated in using infrared sensors, visual sensors, and/or other suitable sensors. For example, information from a sensor may be used by the array microphone 700 to set the approximate boundaries for lobe regions, which in turn can be used to place the associated lobes. In further embodiments, the lobe regions may be calculated and/or updated based on a user defining the lobe regions, such as through a graphical user interface of the array microphone 700.

As further shown in FIG. 7, there may be various parameters associated with each lobe that can restrict its movement during the automatic focusing process, as described below. One parameter is a look radius of a lobe that is a three-dimensional region of space around the initial coordinates $LO_i$ of the lobe where new sound activity can be considered. In other words, if new sound activity is detected in a lobe region but is outside the look radius of the lobe, then there would be no movement or automatic focusing of the lobe in response to the detection of the new sound activity. Points that are outside of the look radius of a lobe can therefore be considered as an ignore or “don’t care” portion of the associated lobe region. For example, in FIG. 7, the point denoted as A is outside the look radius of lobe 5 and its associated lobe region 5, so any new sound activity at point A would not cause the lobe to be moved. Conversely, if new sound activity is detected in a particular lobe region and is inside the look radius of its lobe, then the lobe may be automatically moved and focused in response to the detection of the new sound activity.

Another parameter is a move radius of a lobe that is a maximum distance in space that the lobe is allowed to move. The move radius of a lobe is generally less than the look radius of the lobe, and may be set to prevent the lobe from moving too far away from the array microphone or too far away from the initial coordinates $LO_i$ of the lobe. For example, in FIG. 7, the point denoted as B is both within the look radius and the move radius of lobe 5 and its associated lobe region 5. If new sound activity is detected at point B, then lobe 5 could be moved to point B. As another example, in FIG. 7, the point denoted as C is within the look radius of lobe 5 but outside the move radius of lobe 5 and its associated lobe region 5. If new sound activity is detected at point C, then the maximum distance that lobe 5 could be moved is limited to the move radius.

A further parameter is a boundary cushion of a lobe that is a maximum distance in space that the lobe is allowed to move towards a neighboring lobe region and toward the boundary between the lobe regions. For example, in FIG. 7, the point denoted as D is outside of the boundary cushion of lobe 8 and its associated lobe region 8 (that is adjacent to lobe region 7). The boundary cushions of the lobes may be set to minimize the overlap of adjacent lobes. In FIGS. 7, 10, 12, 13, and 15, the boundaries between lobe regions are denoted by a dashed line, and the boundary cushions for each lobe region are denoted by dash-dot lines that are parallel to the boundaries.

Figure 8:
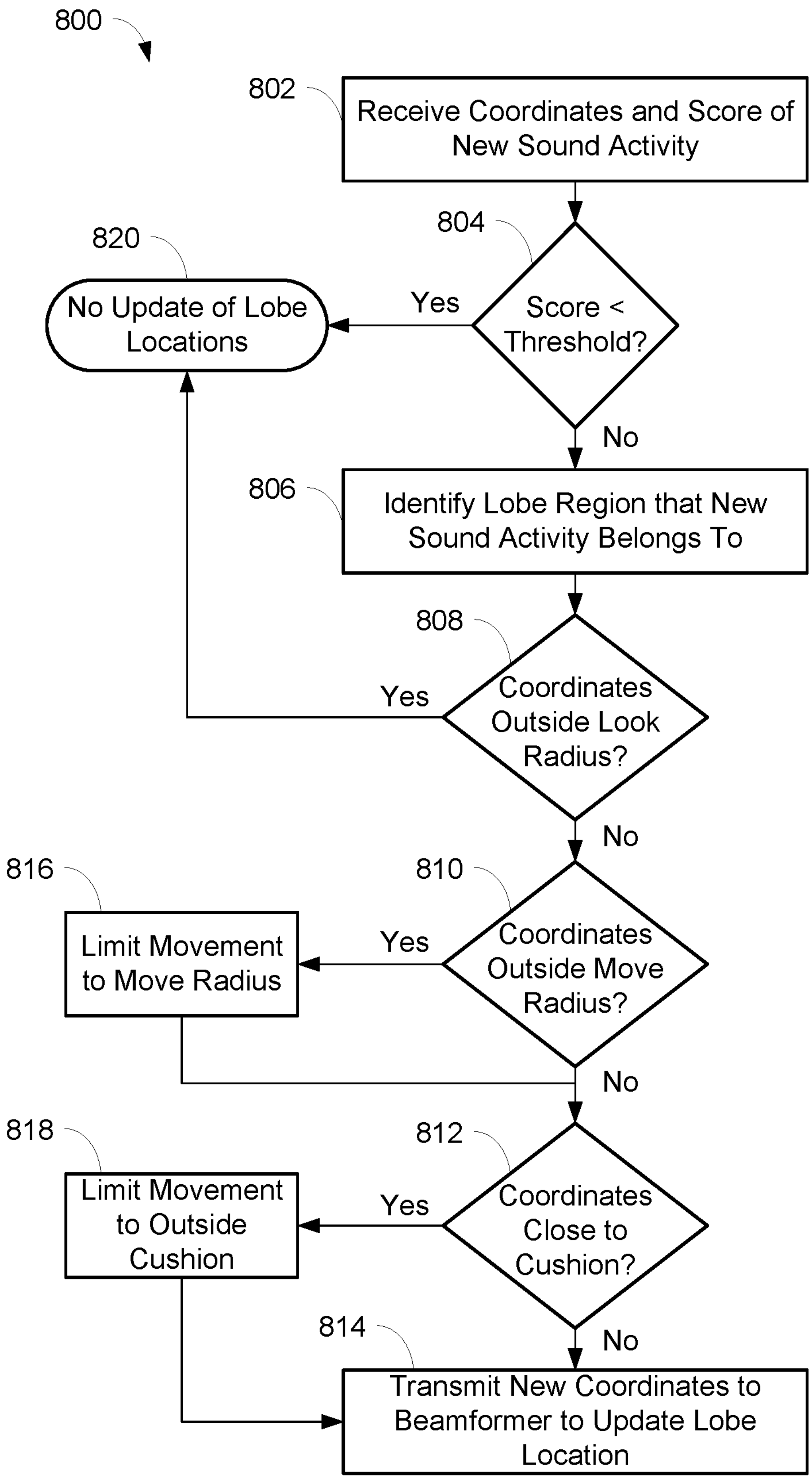
FIG. 8 is a flowchart illustrating operations for automatic focusing of beamformed lobes within lobe regions, in accordance with some embodiments.

An embodiment of a process 800 for automatic focusing of previously placed beamformed lobes of the array microphone 700 within associated lobe regions is shown in FIG. 8. The process 800 may be performed by the lobe auto-focuser 160 so that the array microphone 700 can output one or more audio signals 180 from the array microphone 700, where the audio signals 180 may include sound picked up by the beamformed lobes that are focused on new sound activity of an audio source. One or more processors and/or other processing components (e.g., analog to digital converters, encryption chips, etc.) within or external to the array microphone 700 may perform any, some, or all of the steps of the process 800. One or more other types of components (e.g., memory, input and/or output devices, transmitters, receivers, buffers, drivers, discrete components, etc.) may also be utilized in conjunction with the processors and/or other processing components to perform any, some, or all of the steps of the process 800.

Step 802 of the process 800 for the lobe auto-focuser 160 may be substantially the same as step 202 of the process 200 of FIG. 2 described above. In particular, the coordinates and a confidence score corresponding to new sound activity may be received at the lobe auto-focuser 160 from the audio activity localizer 150 at step 802. In embodiments, other suitable metrics related to the new sound activity may be received and utilized at step 802. At step 804, the lobe auto-focuser 160 may compare the confidence score of the new sound activity to a predetermined threshold to determine whether the new confidence score is satisfactory. If the lobe auto-focuser 160 determines at step 804 that the confidence score of the new sound activity is less than the predetermined threshold (i.e., that the confidence score is not satisfactory), then the process 800 may end at step 820 and the locations of the lobes of the array microphone 700 are not updated. However, if the lobe auto-focuser 160 determines at step 804 that the confidence score of the new sound activity is greater than or equal to the predetermined threshold (i.e., that the confidence score is satisfactory), then the process 800 may continue to step 806.

At step 806, the lobe auto-focuser 160 may identify the lobe region that the new sound activity is within, i.e., the lobe region which the new sound activity belongs to. In embodiments, the lobe auto-focuser 160 may find the lobe closest to the coordinates of the new sound activity in order to identify the lobe region at step 806. For example, the lobe region may be identified by finding the initial coordinates $LO_i$ of a lobe that are closest to the new sound activity, such as by finding an index i of a lobe such that the distance between the coordinates of the new sound activity and the initial coordinates $LO_i$ of a lobe is minimized:

$$i = \underset{1 \le i \le N}{\operatorname{argmin}}(D(s, LO_i)).$$

The lobe and its associated lobe region that contain the new sound activity may be determined as the lobe and lobe region identified at step 806.

After the lobe region has been identified at step 806, the lobe auto-focuser 160 may determine whether the coordinates of the new sound activity are outside a look radius of the lobe at step 808. If the lobe auto-focuser 160 determines that the coordinates of the new sound activity are outside the look radius of the lobe at step 808, then the process 800 may end at step 820 and the locations of the lobes of the array microphone 700 are not updated. In other words, if the new sound activity is outside the look radius of the lobe, then the new sound activity can be ignored and it may be considered that the new sound activity is outside the coverage of the lobe. As an example, point A in FIG. 7 is within lobe region 5 that is associated with lobe 5, but is outside the look radius of lobe 5. Details of determining whether the coordinates of the new sound activity are outside the look radius of a lobe are described below with respect to FIGS. 9 and 10.

However, if at step 808 the lobe auto-focuser 160 determines that the coordinates of the new sound activity are not outside (i.e., are inside) the look radius of the lobe, then the process 800 may continue to step 810. In this scenario, the lobe may be moved towards the new sound activity contingent on assessing the coordinates of the new sound activity with respect to other parameters such as a move radius and a boundary cushion, as described below. At step 810, the lobe auto-focuser 160 may determine whether the coordinates of the new sound activity are outside a move radius of the lobe. If the lobe auto-focuser 160 determines that the coordinates of the new sound activity are outside the move radius of the lobe at step 810, then the process 800 may continue to step 816 where the movement of the lobe may be limited or restricted. In particular, at step 816, the new coordinates where the lobe may be provisionally moved to can be set to no more than the move radius. The new coordinates may be provisional because the movement of the lobe may still be assessed with respect to the boundary cushion parameter, as described below. In embodiments, the movement of the lobe at step 816 may be restricted based on a scaling factor $\alpha$ (where $0<\alpha\leq 1$), in order to prevent the lobe from moving too far from its initial coordinates $LO_i$. As an example, point C in FIG. 7 is outside the move radius of lobe 5 so the farthest distance that lobe 5 could be moved is the move radius. After step 816, the process 800 may continue to step 812. Details of limiting the movement of a lobe to within its move radius are described below with respect to FIGS. 11 and 12.

The process 800 may also continue to step 812 if at step 810 the lobe auto-focuser 160 determines that the coordinates of the new sound activity are not outside (i.e., are inside) the move radius of the lobe. As an example, point B in FIG. 7 is inside the move radius of lobe 5 so lobe 5 could be moved to point B. At step 812, the lobe auto-focuser 160 may determine whether the coordinates of the new sound activity are close to a boundary cushion and are therefore too close to an adjacent lobe. If the lobe auto-focuser 160 determines that the coordinates of the new sound activity are close to a boundary cushion at step 812, then the process 800 may continue to step 818 where the movement of the lobe may be limited or restricted. In particular, at step 818, the new coordinates where the lobe may be moved to may be set to just outside the boundary cushion. In embodiments, the movement of the lobe at step 818 may be restricted based on a scaling factor $\beta$ (where $0<\beta\leq 1$). As an example, point D in FIG. 7 is outside the boundary cushion between adjacent lobe region 8 and lobe region 7. The process 800 may continue to step 814 following step 818. Details regarding the boundary cushion are described below with respect to FIGS. 13-15.

The process 800 may also continue to step 814 if at step 812 the lobe auto-focuser 160 determines that the coordinates of the new sound activity are not close to a boundary cushion. At step 812, the lobe auto-focuser 160 may transmit the new coordinates of the lobe to the beamformer 170 so that the beamformer 170 can update the location of the existing lobe to the new coordinates. In embodiments, the new coordinates $\overrightarrow{LC_i}$ of the lobe may be defined as $\overrightarrow{LC_i}=\overrightarrow{LO_i}+\min(\alpha,\beta)\vec{M}=\overrightarrow{LO_i}+\overrightarrow{M_r}$, where $\vec{M}$ is a motion vector and $\overrightarrow{M_r}$ is a restricted motion vector, as described in more detail below. In embodiments, the lobe auto-focuser 160 may store the new coordinates of the lobe in the database 180.

Depending on the steps of the process 800 described above, when a lobe is moved due to the detection of new sound activity, the new coordinates of the lobe may be: (1) the coordinates of the new sound activity, if the coordinates of the new sound activity are within the look radius of the lobe, within the move radius of the lobe, and not close to the boundary cushion of the associated lobe region; (2) a point in the direction of the motion vector towards the new sound activity and limited to the range of the move radius, if the coordinates of the new sound activity are within the look radius of the lobe, outside the move radius of the lobe, and not close to the boundary cushion of the associated lobe region; or (3) just outside the boundary cushion, if the coordinates of the new sound activity are within the look radius of the lobe and close to the boundary cushion.

The process 800 may be continuously performed by the array microphone 700 as the audio activity localizer 150 finds new sound activity and provides the coordinates and confidence score of the new sound activity to the lobe auto-focuser 160. For example, the process 800 may be performed as audio sources, e.g., human speakers, are moving around a conference room so that one or more lobes can be focused on the audio sources to optimally pick up their sound.

Figure 9:
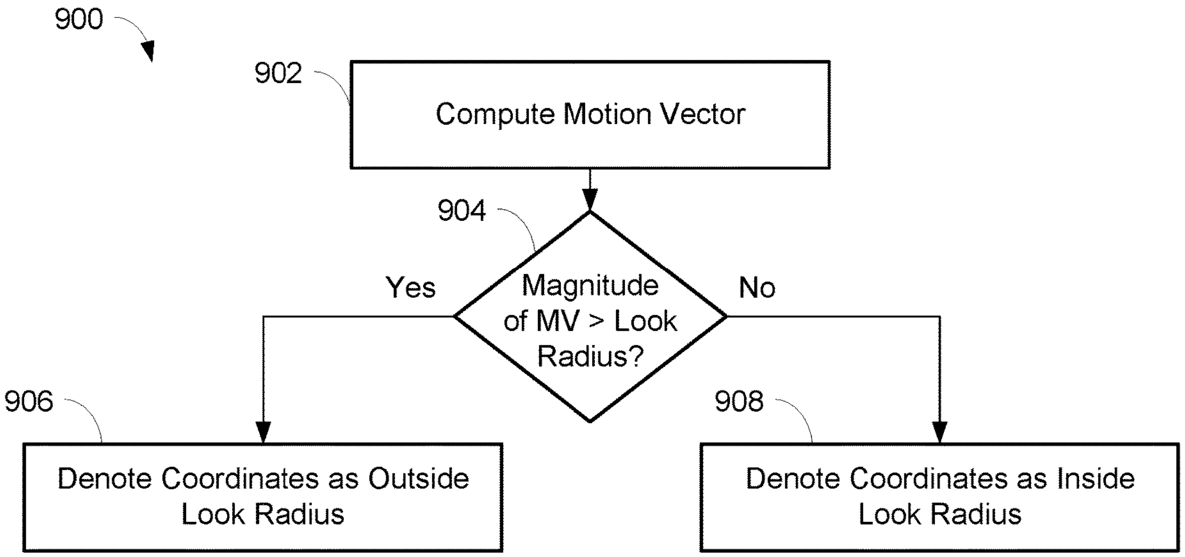
FIG. 9 is a flowchart illustrating operations for determining whether detected sound activity is within a look radius of a lobe, in accordance with some embodiments.
Figure 10:
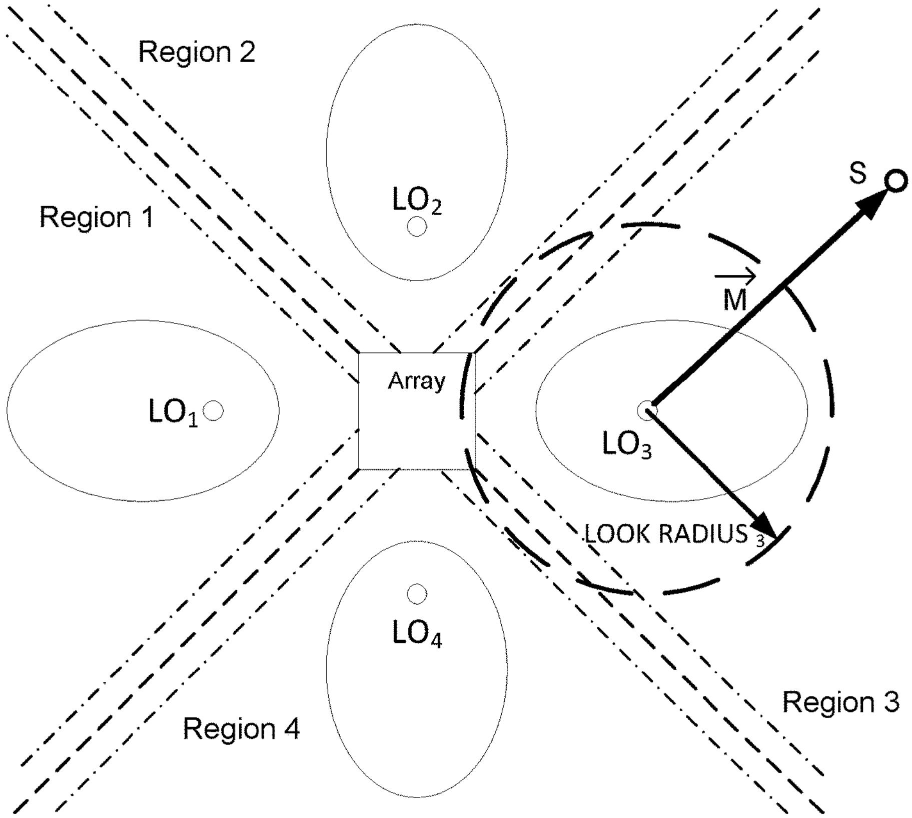
FIG. 10 is an exemplary depiction of an array microphone with beamformed lobes within lobe regions and showing a look radius of a lobe, in accordance with some embodiments.

An embodiment of a process 900 for determining whether the coordinates of new sound activity are outside the look radius of a lobe is shown in FIG. 9. The process 900 may be utilized by the lobe auto-focuser 160 at step 808 of the process 800, for example. In particular, the process 900 may begin at step 902 where a motion vector $\vec{M}$ may be computed as $\vec{M}=\vec{s}-\overrightarrow{LO_i}$. The motion vector may be the vector connecting the center of the original coordinates $LO_i$ of the lobe to the coordinates $\vec{s}$ of the new sound activity. For example, as shown in FIG. 10, new sound activity S is present in lobe region 3 and the motion vector $\vec{M}$ is shown between the original coordinates $LO_3$ of lobe 3 and the coordinates of the new sound activity S. The look radius for lobe 3 is also depicted in FIG. 10.

After computing the motion vector $\vec{M}$ at step 902, the process 900 may continue to step 904. At step 904, the lobe auto-focuser 160 may determine whether the magnitude of the motion vector is greater than the look radius for the lobe, as in the following: $|\vec{M}|=\sqrt{(m_x)^2+(m_y)^2+(m_z)^2}>(\text{LookRadius})_i$. If the magnitude of the motion vector $\vec{M}$ is greater than the look radius for the lobe at step 904, then at step 906, the coordinates of the new sound activity may be denoted as outside the look radius for the lobe. For example, as shown in FIG. 10, because the new sound activity S is outside the look radius of lobe 3, the new sound activity S would be ignored. However, if the magnitude of the motion vector $\vec{M}$ is less than or equal to the look radius for the lobe at step 904, then at step 908, the coordinates of the new sound activity may be denoted as inside the look radius for the lobe.

Figure 11:
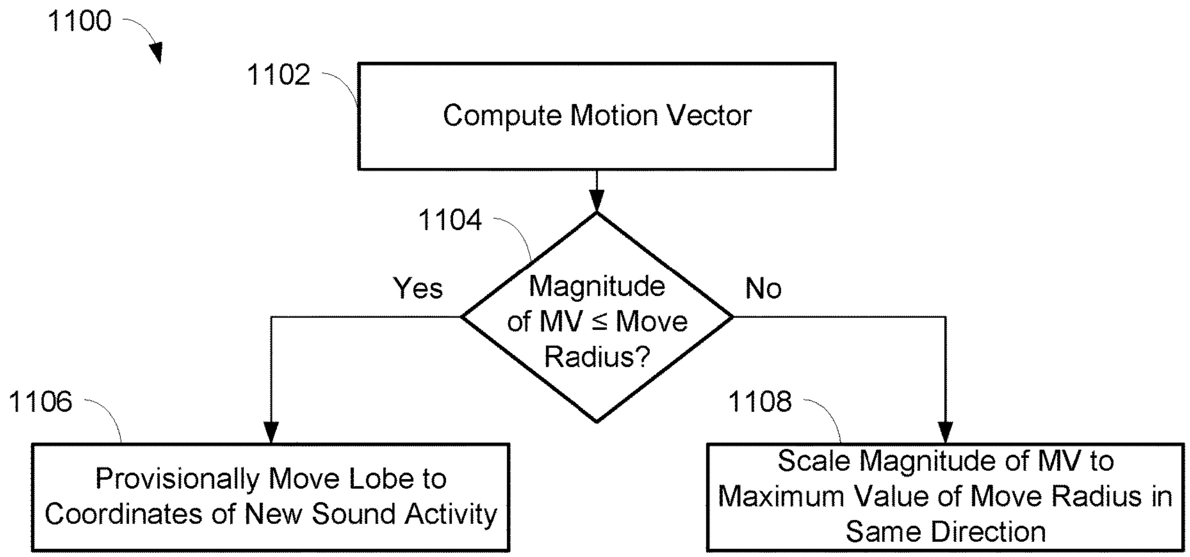
FIG. 11 is a flowchart illustrating operations for determining movement of a lobe within a move radius of a lobe, in accordance with some embodiments.
Figure 12:
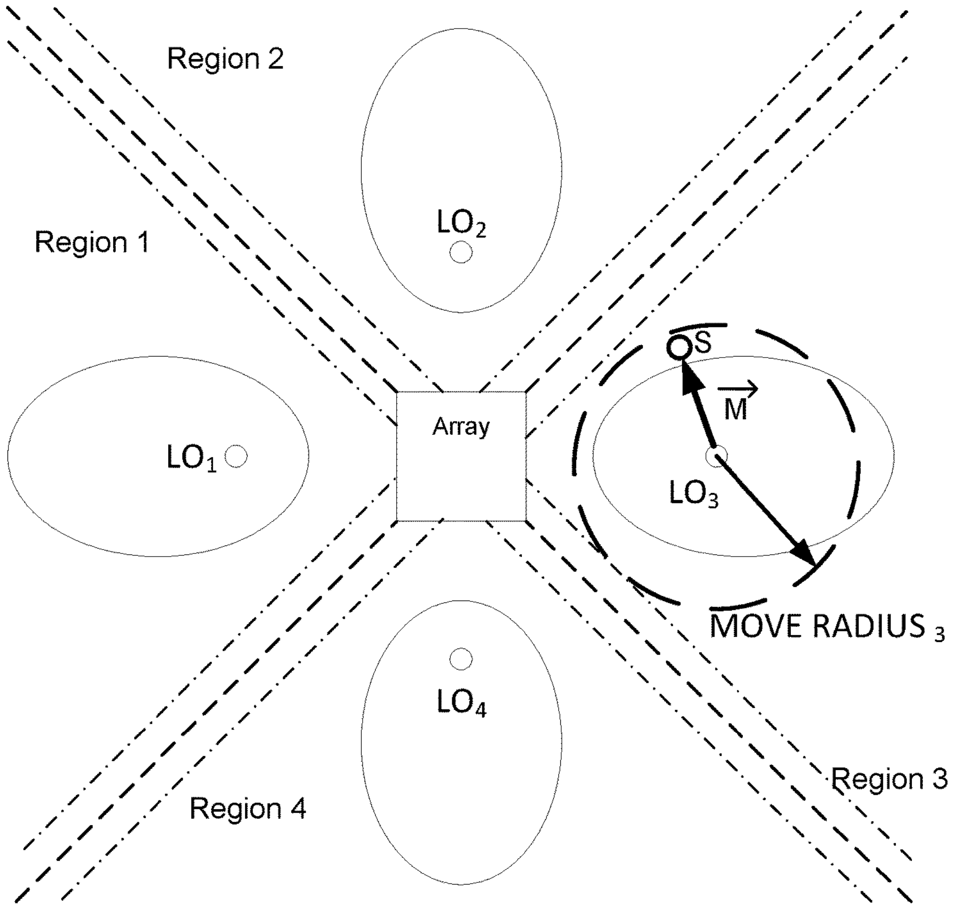
FIG. 12 is an exemplary depiction of an array microphone with beamformed lobes within lobe regions and showing a move radius of a lobe, in accordance with some embodiments.

An embodiment of a process 1100 for limiting the movement of a lobe to within its move radius is shown in FIG. 11. The process 1100 may be utilized by the lobe auto-focuser 160 at step 816 of the process 800, for example. In particular, the process 1100 may begin at step 1102 where a motion vector M may be computed as $\vec{M}=\vec{s}-\overrightarrow{LO_i}$, similar to as described above with respect to step 902 of the process 900 shown in FIG. 9. For example, as shown in FIG. 12, new sound activity S is present in lobe region 3 and the motion vector M is shown between the original coordinates $LO_3$ of lobe 3 and the coordinates of the new sound activity S. The move radius for lobe 3 is also depicted in FIG. 12.

After computing the motion vector $\vec{M}$ at step 1102, the process 1100 may continue to step 1104. At step 1104, the lobe auto-focuser 160 may determine whether the magnitude of the motion vector $\vec{M}$ is less than or equal to the move radius for the lobe, as in the following: $|\vec{M}|$ $(MoveRadius)_i$. If the magnitude of the motion vector $\vec{M}$ is less than or equal to the move radius at step 1104, then at step 1106, the new coordinates of the lobe may be provisionally moved to the coordinates of the new sound activity. For example, as shown in FIG. 12, because the new sound activity S is inside the move radius of lobe 3, the lobe would provisionally be moved to the coordinates of the new sound activity S.

However, if the magnitude of the motion vector $\vec{M}$ is greater than the move radius at step 1104, then at step 1108, the magnitude of the motion vector $\vec{M}$ may be scaled by a scaling factor α to the maximum value of the move radius while keeping the same direction, as in the following:

$$\vec{M} = \frac{(MoveRadius)_i}{|\vec{M}|}\vec{M} = \alpha\vec{M},$$

where the scaling factor α may be defined as:

$$\alpha = \begin{cases} \frac{(MoveRadius)_i}{|\vec{M}|}, & |\vec{M}| > (MoveRadius)_i \\ 1, & |\vec{M}| \leq (MoveRadius)_i \end{cases}.$$

Figure 13:
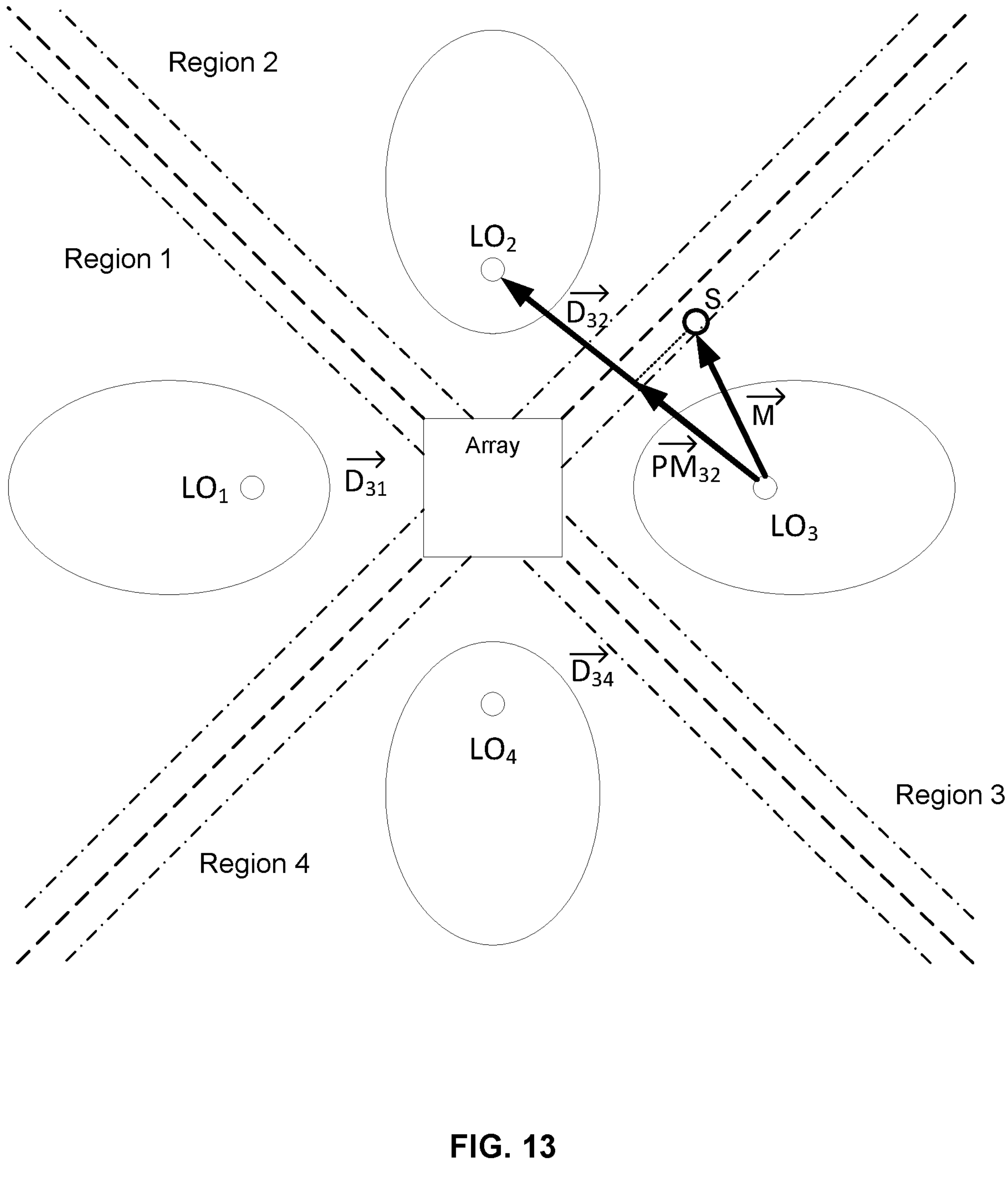
FIG. 13 is an exemplary depiction of an array microphone with beamformed lobes within lobe regions and showing boundary cushions between lobe regions, in accordance with some embodiments.
Figure 14:
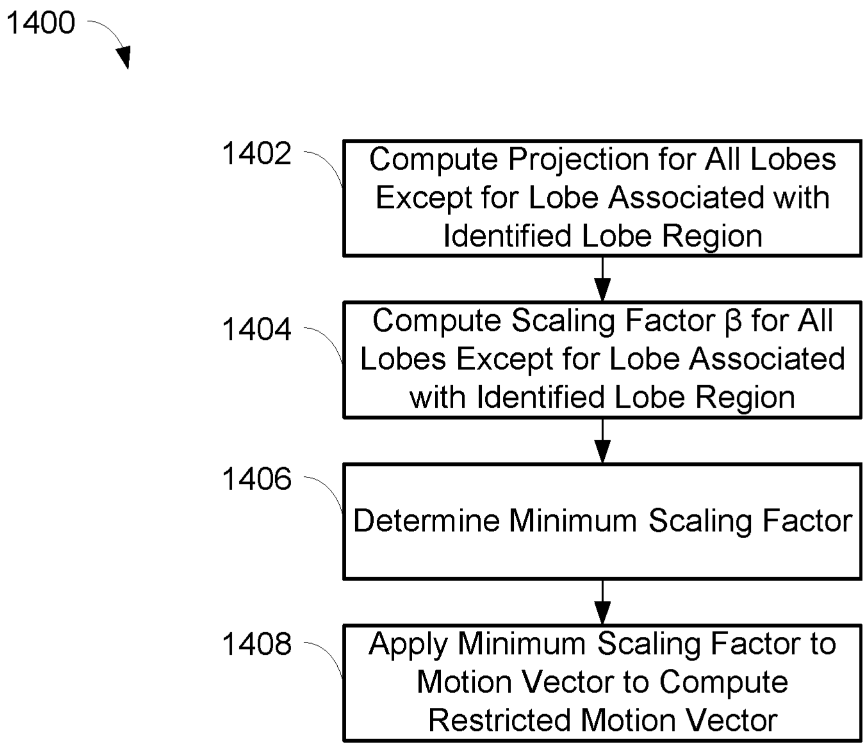
FIG. 14 is a flowchart illustrating operations for limiting movement of a lobe based on boundary cushions between lobe regions, in accordance with some embodiments.
Figure 15:
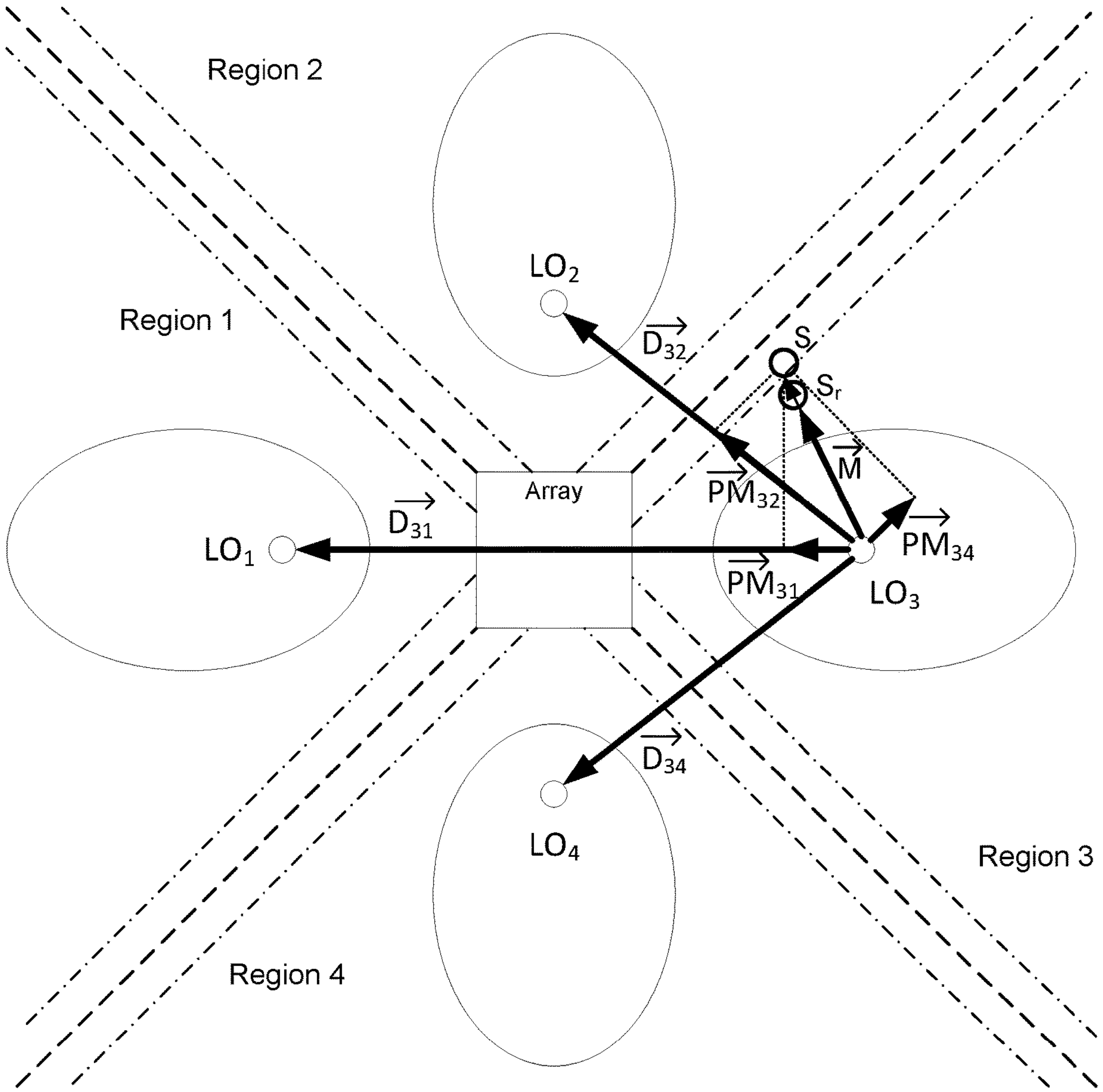
FIG. 15 is an exemplary depiction of an array microphone with beamformed lobes within regions and showing the movement of a lobe based on boundary cushions between regions, in accordance with some embodiments.

FIGS. 13-15 relate to the boundary cushion of a lobe region, which is the portion of the space next to the boundary or edge of the lobe region that is adjacent to another lobe region. In particular, the boundary cushion next to the boundary between two lobes i and j may be described indirectly using a vector $\vec{D_{ij}}$ that connects the original coordinates of the two lobes (i.e., $LO_i$ and $LO_j$) Accordingly, such a vector can be described as: $\vec{D_{ij}}=\vec{LO_j}-\vec{LO_i}$. The midpoint of this vector may be a point that is at the boundary between the two lobe regions. In particular, moving from the original coordinates $LO_i$ of lobe i in the direction of the vector $\vec{D_{ij}}$ is the shortest path towards the adjacent lobe j. Furthermore, moving from the original coordinates $LO_i$ of lobe i in the direction of the vector $\vec{D_{ij}}$ but keeping the amount of movement to half of the magnitude of the vector $\vec{D_{ij}}$ will be the exact boundary between the two lobe regions.

Based on the above, moving from the original coordinates $LO_i$ of lobe i in the direction of the vector $\vec{D_{ij}}$ but restricting the amount of movement based on a value A (where 0<A<1) (i.e., $$A\frac{|\vec{D_{ij}}|}{2}\Big)$$

will be within (100*A) % of the boundary between the lobe regions. For example, if A is 0.8 (i.e., 80%), then the new coordinates of a moved lobe would be within 80% of the boundary between lobe regions. Therefore, the value A can be utilized to create the boundary cushion between two adjacent lobe regions. In general, a larger boundary cushion can prevent a lobe from moving into another lobe region, while a smaller boundary cushion can allow a lobe to move closer to another lobe region.

In addition, it should be noted that if a lobe i is moved in a direction towards a lobe j due to the detection of new sound activity (e.g., in the direction of a motion vector $\vec{M}$ as described above), there is a component of movement in the direction of the lobe j, i.e., in the direction of the vector $\vec{D_{ij}}$. In order to find the component of movement in the direction of the vector $\vec{D_{ij}}$, the motion vector $\vec{M}$ can be projected onto the unit vector $\vec{Du_{ij}}=\vec{D_{ij}}/|\vec{D_{ij}}|$ (which has the same direction as the vector $\vec{D_{ij}}$ with unity magnitude) to compute a projected vector $\vec{PM_{ij}}$. As an example, FIG. 13 shows a vector $\vec{D_{32}}$ that connects lobes 3 and 2, which is also the shortest path from the center of lobe 3 towards lobe region 2. The projected vector $\vec{PM_{32}}$ shown in FIG. 13 is the projection of the motion vector $\vec{M}$ onto the unit vector $\vec{D_{32}}/|\vec{D_{23}}|$.

An embodiment of a process 1400 for creating a boundary cushion of a lobe region using vector projections is shown in FIG. 14. The process 1400 may be utilized by the lobe auto-focuser 160 at step 818 of the process 800, for example. The process 1400 may result in restricting the magnitude of a motion vector $\vec{M}$ such that a lobe is not moved in the direction of any other lobe region by more than a certain percentage that characterizes the size of the boundary cushion.

Prior to performing the process 1400, a vector $\vec{D_{ij}}$ and unit vectors $\vec{Du_{ij}}=\vec{D_{ij}}/|\vec{D_{ij}}|$ can be computed for all pairs of active lobes. As described previously, the vectors $\vec{D_{ij}}$ may connect the original coordinates of lobes i and j. The parameter $A_i$ (where $0<A_i<1$) may be determined for all active lobes, which characterizes the size of the boundary cushion for each lobe region. As described previously, prior to the process 1400 being performed (i.e., prior to step 818 of the process 800), the lobe region of new sound activity may be identified (i.e., at step 806) and a motion vector may be computed (i.e., using the process 1100/step 810).

At step 1402 of the process 1400, the projected vector $\vec{PM_{ij}}$ may be computed for all lobes that are not associated with the lobe region identified for the new sound activity. The magnitude of a projected vector $\vec{PM_{ij}}$ (as described above with respect to FIG. 13) can determine the amount of movement of a lobe in the direction of a boundary between lobe regions. Such a magnitude of the projected vector $\vec{PM_{ij}}$ can be computed as a scalar, such as by a dot product of the motion vector $\vec{M}$ and the unit vector $\vec{Du_{ij}}=\vec{D_{ij}}/|\vec{D_{ij}}|$; such that projection $$PM_{ij} = M_x Du_{ij,z} + M_y Du_{ij,y} + M_z Du_{ij,z}.$$

When $PM_{ij}<0$, the motion vector $\vec{M}$ has a component in the opposite direction of the vector $\vec{D_{ij}}$. This means that movement of a lobe i would be in the direction opposite of the boundary with a lobe j. In this scenario, the boundary cushion between lobes i and j is not a concern because the movement of the lobe i would be away from the boundary with lobe j. However, when $PM_{ij}>0$, the motion vector $\vec{M}$ has a component in the same direction as the direction of the vector $\vec{D_{ij}}$. This means that movement of a lobe i would be in the same direction as the boundary with lobe j. In this scenario, movement of the lobe i can be limited to outside the boundary cushion so that $$PM_{rij} < A_i \frac{|\vec{D_{ij}}|}{2},$$

where $A_i$(with $0<A_i<1$) is a parameter that characterizes the boundary cushion for a lobe region associated with lobe i.

A scaling factor β may be utilized to ensure that $$PM_{rij} < A_i \frac{|\vec{D_{ij}}|}{2}.$$

The scaling factor β may be used to scale the motion vector $\vec{M}$ and be defined as $$\beta_j = \begin{cases} \dfrac{A_i \frac{|\vec{D_{ij}}|}{2}}{PM_{ij}}, & PM_{ij} > A_i \dfrac{|\vec{D_{ij}}|}{2} \\ 1, & PM_{ij} \le A_i \dfrac{|\vec{D_{ij}}|}{2} \end{cases}.$$

Accordingly, if new sound activity is detected that is outside the boundary cushion of a lobe region, then the scaling factor β may be equal to 1, which indicates that there is no scaling of the motion vector $\vec{M}$. At step 1404, the scaling factor β may be computed for all the lobes that are not associated with the lobe region identified for the new sound activity.

At step 1406, the minimum scaling factor β can be determined that corresponds to the boundary cushion of the nearest lobe regions, as in the following:

$$\beta = \min_j \beta_j.$$

After the minimum scaling factor β has been determined at step 1406, then at step 1408, the minimum scaling factor β may be applied to the motion vector $\vec{M}$ to determine a restricted motion vector $$\vec{M_r} = \min(\alpha, \beta)\vec{M}.$$

For example, FIG. 15 shows new sound activity S that is present in lobe region 3 as well as a motion vector $\vec{M}$ between the initial coordinates $LO_3$ of lobe 3 and the coordinates of the new sound activity S. Vectors $\vec{D_{31}}$, $\vec{D_{32}}$, $\vec{D_{34}}$ and projected vectors $PM_{31}$, $PM_{32}$, $PM_{34}$ are depicted between lobe 3 and each of the other lobes that are not associated with lobe region 3 (i.e., lobes 1, 2, and 4). In particular, vectors $\vec{D_{31}}$, $\vec{D_{32}}$, $\vec{D_{34}}$ may be computed for all pairs of active lobes (i.e., lobes 1, 2, 3, and 4), and projections $PM_{31}$, $PM_{32}$, $PM_{34}$ are computed for all lobes that are not associated with lobe region 3 (that is identified for the new sound activity S). The magnitude of the projected vectors may be utilized to compute scaling factors β, and the minimum scaling factor β may be used to scale the motion vector $\vec{M}$. The motion vector $\vec{M}$ may therefore be restricted to outside the boundary cushion of lobe region 3 because the new sound activity S is too close to the boundary between lobe 3 and lobe 2. Based on the restricted motion vector, the coordinates of lobe 3 may be moved to a coordinate $S_r$ that is outside the boundary cushion of lobe region 3.

The projected vector $\vec{PM_{34}}$ depicted in FIG. 15 is negative and the corresponding scaling factor $\beta_4$ (for lobe 4) is equal to 1. The scaling factor $\beta_1$ (for lobe 1) is also equal to 1 because $$PM_{31} < A_3 \frac{|\vec{D_{31}}|}{2},$$

while the scaling factor $\beta_2$ (for lobe 2) is less than 1 because the new sound activity S is inside the boundary cushion between lobe region 2 and lobe region 3 (i.e., $$\left. PM_{32} > A_3 \frac{|\vec{D_{32}}|}{2} \right).$$

Accordingly, the minimum scaling factor $\beta_2$ may be utilized to ensure that lobe 3 moves to the coordinate $S_r$.

Figure 16:
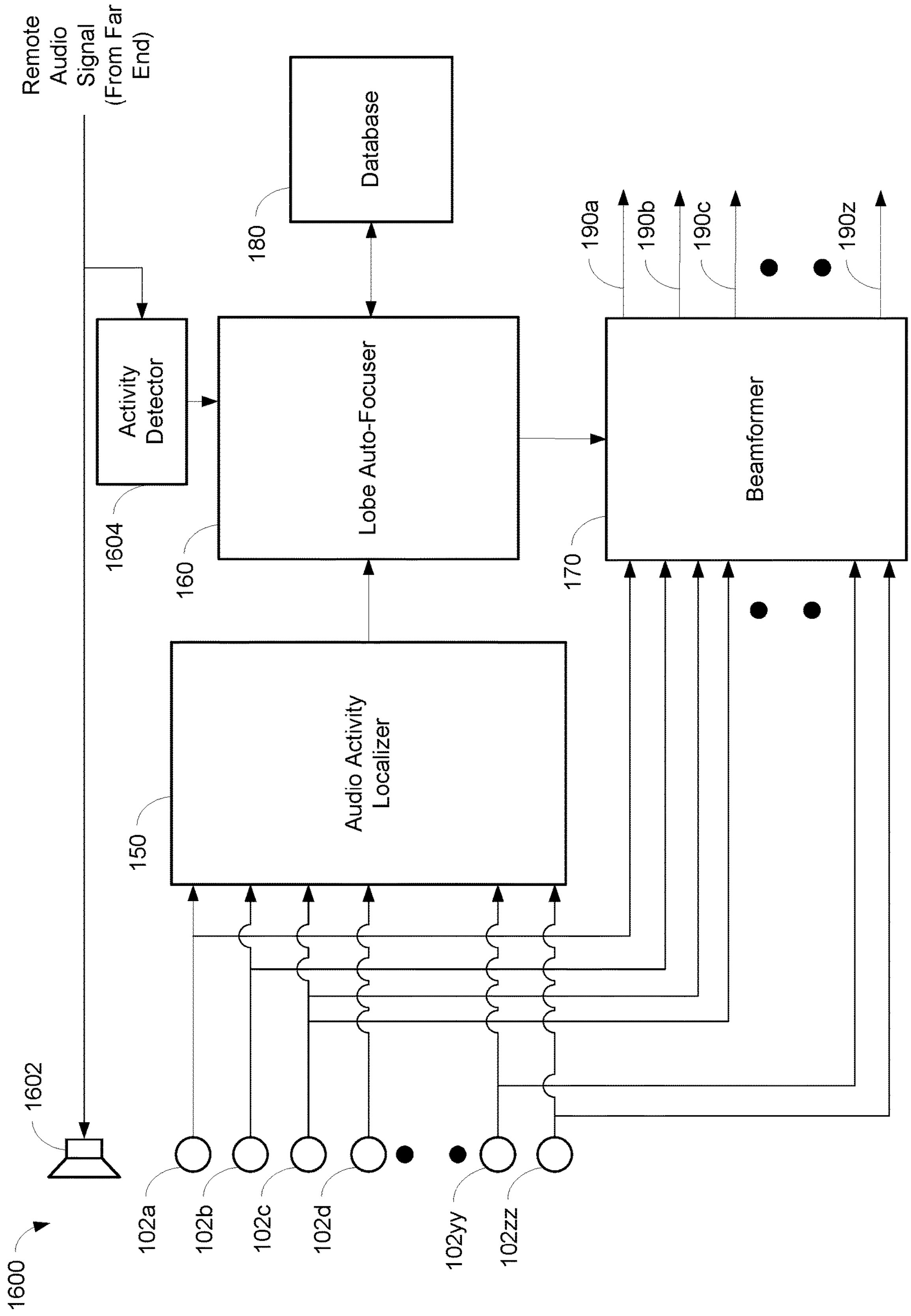
FIG. 16 is a schematic diagram of an array microphone with automatic focusing of beamformed lobes in response to the detection of sound activity and inhibition of the automatic focusing based on a remote far end audio signal, in accordance with some embodiments.
Figure 17:
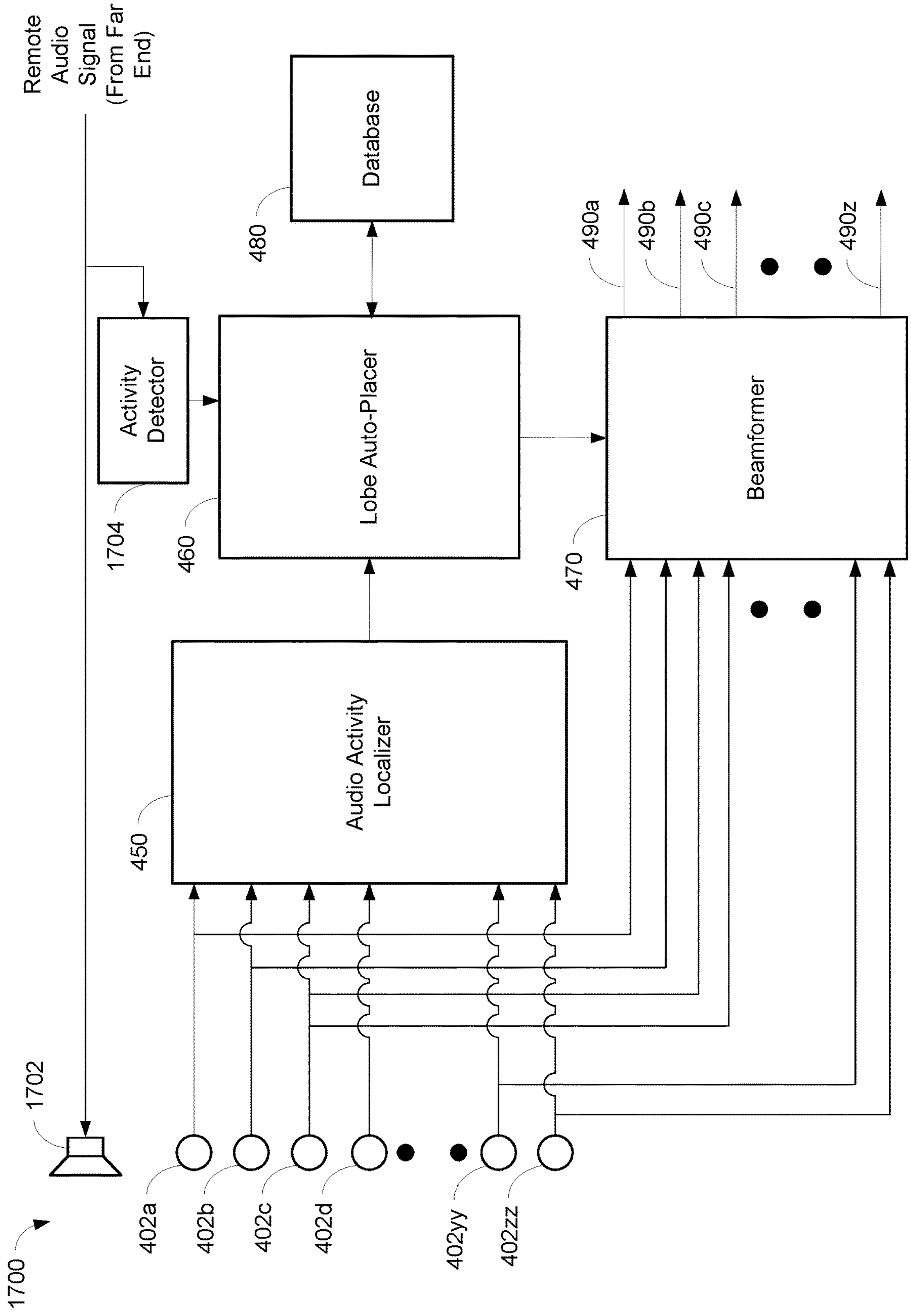
FIG. 17 is a schematic diagram of an array microphone with automatic placement of beamformed lobes of an array microphone in response to the detection of sound activity and inhibition of the automatic placement based on a remote far end audio signal, in accordance with some embodiments.

FIGS. 16 and 17 are schematic diagrams of array microphones 1600, 1700 that can detect sounds from audio sources at various frequencies. The array microphone 1600 of FIG. 16 can automatically focus beamformed lobes in response to the detection of sound activity, while enabling inhibition of the automatic focus of the beamformed lobes when the activity of a remote audio signal from a far end exceeds a predetermined threshold. In embodiments, the array microphone 1600 may include some or all of the same components as the array microphone 100 described above, e.g., the microphones 102, the audio activity localizer 150, the lobe auto-focuser 160, the beamformer 170, and/or the database 180. The array microphone 1600 may also include a transducer 1602, e.g., a loudspeaker, and an activity detector 1604 in communication with the lobe auto-focuser 160. The remote audio signal from the far end may be in communication with the transducer 1602 and the activity detector 1604.

The array microphone 1700 of FIG. 17 can automatically place beamformed lobes in response to the detection of sound activity, while enabling inhibition of the automatic placement of the beamformed lobes when the activity of a remote audio signal from a far end exceeds a predetermined threshold. In embodiments, the array microphone 1700 may include some or all of the same components as the array microphone 400 described above, e.g., the microphones 402, the audio activity localizer 450, the lobe auto-placer 460, the beamformer 470, and/or the database 480. The array microphone 1700 may also include a transducer 1702, e.g., a loudspeaker, and an activity detector 1704 in communication with the lobe auto-placer 460. The remote audio signal from the far end may be in communication with the transducer 1702 and the activity detector 1704.

The transducer 1602, 1702 may be utilized to play the sound of the remote audio signal in the local environment where the array microphone 1600, 1700 is located. The activity detector 1604, 1704 may detect an amount of activity in the remote audio signal. In some embodiments, the amount of activity may be measured as the energy level of the remote audio signal. In other embodiments, the amount of activity may be measured using methods in the time domain and/or frequency domain, such as by applying machine learning (e.g., using cepstrum coefficients), measuring signal non-stationarity in one or more frequency bands, and/or searching for features of desirable sound or speech.

In embodiments, the activity detector 1604, 1704 may be a voice activity detector (VAD) which can determine whether there is voice present in the remote audio signal. A VAD may be implemented, for example, by analyzing the spectral variance of the remote audio signal, using linear predictive coding, applying machine learning or deep learning techniques to detect voice, and/or using well-known techniques such as the ITU G.729 VAD, ETSI standards for VAD calculation included in the GSM specification, or long term pitch prediction.

Based on the detected amount of activity, automatic lobe adjustment may be performed or inhibited. Automatic lobe adjustment may include, for example, auto focusing of lobes, auto focusing of lobes within regions, and/or auto placement of lobes, as described herein. The automatic lobe adjustment may be performed when the detected activity of the remote audio signal does not exceed a predetermined threshold. Conversely, the automatic lobe adjustment may be inhibited (i.e., not be performed) when the detected activity of the remote audio signal exceeds the predetermined threshold. For example, exceeding the predetermined threshold may indicate that the remote audio signal includes voice, speech, or other sound that is preferably not to be picked up by a lobe. By inhibiting automatic lobe adjustment in this scenario, a lobe will not be focused or placed to avoid picking up sound from the remote audio signal.

In some embodiments, the activity detector 1604, 1704 may determine whether the detected amount of activity of the remote audio signal exceeds the predetermined threshold. When the detected amount of activity does not exceed the predetermined threshold, the activity detector 1604, 1704 may transmit an enable signal to the lobe auto-focuser 160 or the lobe auto-placer 460, respectively, to allow lobes to be adjusted. In addition to or alternatively, when the detected amount of activity of the remote audio signal exceeds the predetermined threshold, the activity detector 1604, 1704 may transmit a pause signal to the lobe auto-focuser 160 or the lobe auto-placer 460, respectively, to stop lobes from being adjusted.

In other embodiments, the activity detector 1604, 1704 may transmit the detected amount of activity of the remote audio signal to the lobe auto-focuser 160 or to the lobe auto-placer 460, respectively. The lobe auto-focuser 160 or the lobe auto-placer 460 may determine whether the detected amount of activity exceeds the predetermined threshold. Based on whether the detected amount of activity exceeds the predetermined threshold, the lobe auto-focuser 160 or lobe auto-placer 460 may execute or pause the adjustment of lobes.

The various components included in the array microphone 1600, 1700 may be implemented using software executable by one or more servers or computers, such as a computing device with a processor and memory, graphics processing units (GPUs), and/or by hardware (e.g., discrete logic circuits, application specific integrated circuits (ASIC), programmable gate arrays (PGA), field programmable gate arrays (FPGA), etc.

Figure 18:
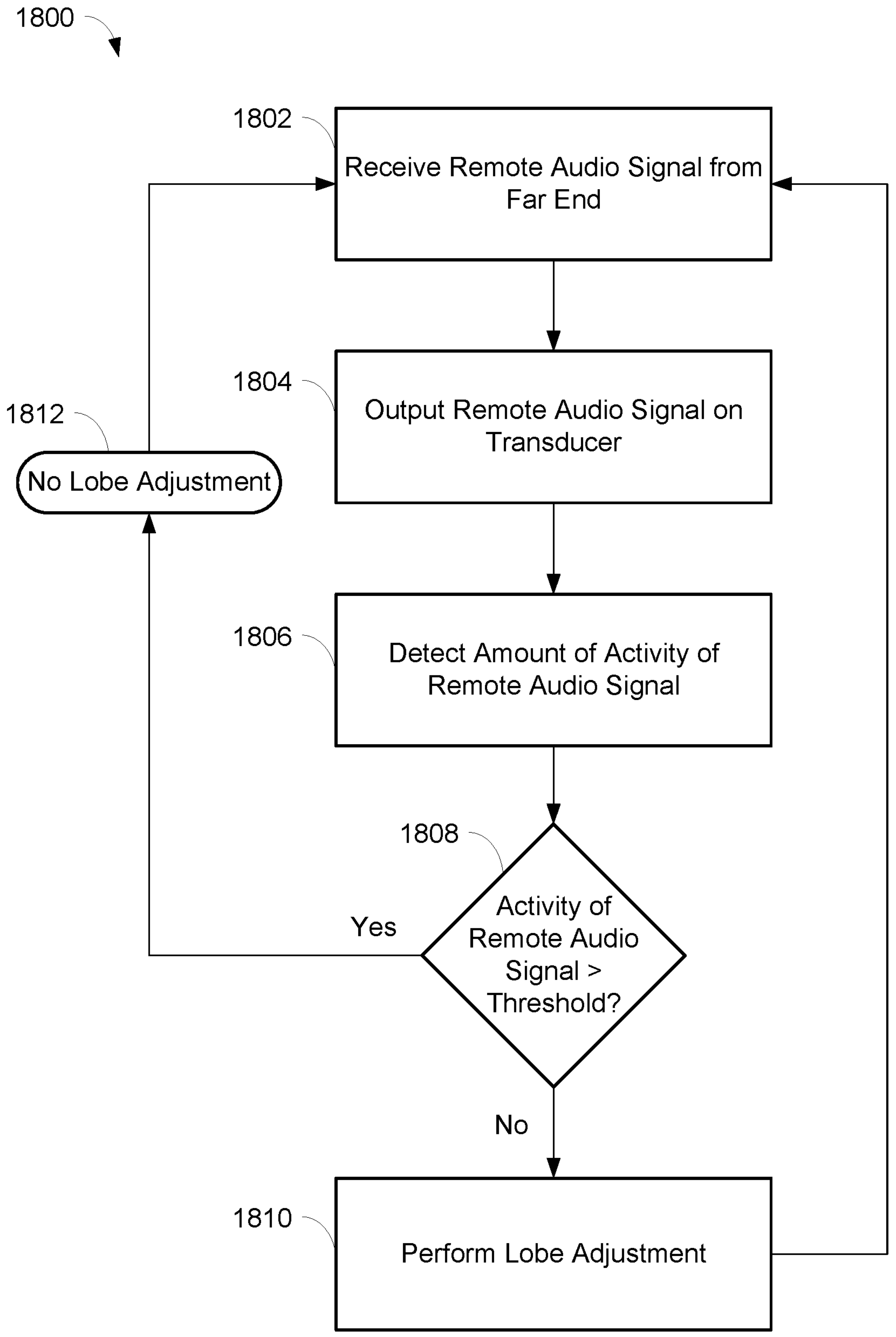
FIG. 18 is a flowchart illustrating operations for inhibiting automatic adjustment of beamformed lobes of an array microphone based on a remote far end audio signal, in accordance with some embodiments.

An embodiment of a process 1800 for inhibiting automatic adjustment of beamformed lobes of an array microphone based on a remote far end audio signal is shown in FIG. 18. The process 1800 may be performed by the array microphones 1600, 1700 so that the automatic focus or the automatic placement of beamformed lobes can be performed or inhibited based on the amount of activity of a remote audio signal from a far end. One or more processors and/or other processing components (e.g., analog to digital converters, encryption chips, etc.) within or external to the array microphones 1600, 1700 may perform any, some, or all of the steps of the process 1800. One or more other types of components (e.g., memory, input and/or output devices, transmitters, receivers, buffers, drivers, discrete components, etc.) may also be utilized in conjunction with the processors and/or other processing components to perform any, some, or all of the steps of the process 1800.

At step 1802, a remote audio signal may be received at the array microphone 1600, 1700. The remote audio signal may be from a far end (e.g., a remote location), and may include sound from the far end (e.g., speech, voice, noise, etc.). The remote audio signal may be output on a transducer 1602, 1702 at step 1804, such as a loudspeaker in the local environment. Accordingly, the sound from the far end may be played in the local environment, such as during a conference call so that the local participants can hear the remote participants.

The remote audio signal may be received by an activity detector 1604, 1704, which may detect an amount of activity of the remote audio signal at step 1806. The detected amount of activity may correspond to the amount of speech, voice, noise, etc. in the remote audio signal. In embodiments, the amount of activity may be measured as the energy level of the remote audio signal. At step 1808, if the detected amount of activity of the remote audio signal does not exceed a predetermined threshold, then the process 1800 may continue to step 1810. The detected amount of activity of the remote audio signal not exceeding the predetermined threshold may indicate that there is a relatively low amount of speech, voice, noise, etc. in the remote audio signal. In embodiments, the detected amount of activity may specifically indicate the amount of voice or speech in the remote audio signal. At step 1810, lobe adjustments may be performed. Step 1810 may include, for example, the processes 200 and 300 for automatic focusing of beamformed lobes, the process 400 for automatic placement of beamformed lobes, and/or the process 800 for automatic focusing of beamformed lobes within lobe regions, as described herein. Lobe adjustments may be performed in this scenario because even though lobes may be focused or placed, there is a lower likelihood that such a lobe will pick up undesirable sound from the remote audio signal that is being output in the local environment. After step 1810, the process 1800 may return to step 1802.

However, if at step 1808 the detected amount of activity of the remote audio signal exceeds the predetermined threshold, then the process 1800 may continue to step 1812. At step 1812, no lobe adjustment may be performed, i.e., lobe adjustment may be inhibited. The detected amount of activity of the remote audio signal exceeding the predetermined threshold may indicate that there is a relatively high amount of speech, voice, noise, etc. in the remote audio signal. Inhibiting lobe adjustments from occurring in this scenario may help to ensure that a lobe is not focused or placed to pick up sound from the remote audio signal that is being output in the local environment. In some embodiments, the process 1800 may return to step 1802 after step 1812. In other embodiments, the process 1800 may wait for a certain time duration at step 1812 before returning to step 1802. Waiting for a certain time duration may allow reverberations in the local environment (e.g., caused by playing the sound of the remote audio signal) to dissipate.

The process 1800 may be continuously performed by the array microphones 1600, 1700 as the remote audio signal from the far end is received. For example, the remote audio signal may include a low amount of activity (e.g., no speech or voice) that does not exceed the predetermined threshold. In this situation, lobe adjustments may be performed. As another example, the remote audio signal may include a high amount of activity (e.g., speech or voice) that exceeds the predetermined threshold. In this situation, the performance of lobe adjustments may be inhibited. Whether lobe adjustments are performed or inhibited may therefore change as the amount of activity of the remote audio signal changes. The process 1800 may result in more optimal pick up of sound in the local environment by reducing the likelihood that sound from the far end is undesirably picked up.

Any process descriptions or blocks in figures should be understood as representing modules, segments, or portions of code which include one or more executable instructions for implementing specific logical functions or steps in the process, and alternate implementations are included within the scope of the embodiments of the invention in which functions may be executed out of order from that shown or discussed, including substantially concurrently or in reverse order, depending on the functionality involved, as would be understood by those having ordinary skill in the art.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

The invention claimed is:

1. A method, comprising:

deploying a plurality of lobes from an array microphone in an environment;

determining whether a metric associated with sound activity is greater than or equal to a metric threshold, and when it is determined that the metric associated with the sound activity is greater than or equal to the metric threshold:

selecting one of the plurality of lobes to move, based on location data of the sound activity in the environment;

determining limited location data for movement of the selected lobe, based on the location data of the sound activity and a parameter associated with the selected lobe; and relocating the selected lobe based on the limited location data.

2. The method of claim 1:

wherein each of the plurality of lobes is associated with one of a plurality of lobe regions;

the method further comprising identifying the lobe region including the sound activity, based on the location data of the sound activity in the environment, wherein the identified lobe region is associated with the selected lobe;

wherein the parameter is further associated with the identified lobe region.

3. The method of claim 1, wherein the location data of the sound activity comprises coordinates of the sound activity in the environment.

4. The method of claim 1, further comprising:

determining whether the selected lobe is near the sound activity, based on the location data of the sound activity and the parameter associated with the selected lobe; and when it is determined that the selected lobe is near the sound activity, performing the steps of determining the limited location data and relocating the selected lobe.

5. The method of claim 4, wherein the parameter comprises a look radius around the selected lobe, the look radius comprising a space around the selected lobe where the sound activity can be considered; and wherein determining whether the selected lobe is near the sound activity comprises determining whether the sound activity is within the look radius, based on the location data of the sound activity.

6. The method of claim 1, wherein the parameter comprises a move radius, the move radius comprising a maximum distance from the selected lobe that the selected lobe is permitted to move; and wherein the limited location data comprises:

the location data of the sound activity, when the location data of the sound activity denotes that the sound activity is within the move radius; or the move radius, when the location data of the sound activity denotes that the sound activity is outside of the move radius.

7. The method of claim 2, wherein the parameter comprises a boundary cushion in the lobe region, the boundary cushion comprising a maximum distance from the selected lobe that the selected lobe is permitted to move towards a boundary of a neighboring lobe region; and wherein the limited location data comprises:

the location data of the sound activity, when the location data of the sound activity denotes that the sound activity is outside of the boundary cushion; or a location outside of the boundary cushion, when the location data of the sound activity denotes that the sound activity is within the boundary cushion.

8. The method of claim 7, wherein the boundary of the neighboring lobe region comprises a set of points that is equally distant from the selected lobe and a neighboring lobe associated with the neighboring lobe region.

9. The method of claim 3, wherein selecting the one of the plurality of lobes to move is based on one or more of: (1) a difference in an azimuth of the coordinates of the sound activity and an azimuth of the selected lobe, relative to an azimuth threshold, or (2) a difference in an elevation angle of the coordinates of the sound activity and an elevation angle of the selected lobe, relative to an elevation angle threshold.

10. The method of claim 3, wherein selecting the one of the plurality of lobes to move is based on a distance of the coordinates of the sound activity from the array microphone.

11. The method of claim 2, wherein each of the plurality of lobe regions comprises a space around its associated lobe that is closer to the associated lobe than to any other of the plurality of lobes.

12. The method of claim 2, further comprising calculating each of the plurality of lobe regions based on information from a sensor detecting the environment the array microphone is situated in.

13. The method of claim 1, further comprising:
receiving a remote audio signal from a far end;
detecting an amount of activity of the remote audio signal; and
when the amount of activity of the remote audio signal exceeds a predetermined threshold, inhibiting performance of the steps of selecting the one of the plurality of lobes to move, determining the limited location data, and relocating the selected lobe.

14. An array microphone system, comprising:
a plurality of microphone elements, each of the plurality of microphone elements configured to detect sound and output an audio signal;
a beamformer in communication with the plurality of microphone elements, the beamformer configured to generate one or more beamformed signals based on the audio signals of the plurality of microphone elements, wherein the one or more beamformed signals correspond with one or more lobes each positioned at a location in an environment;
an audio activity localizer in communication with the plurality of microphone elements, the audio activity localizer configured to determine (1) coordinates of new sound activity in the environment and (2) a metric associated with the new sound activity; and
a lobe auto-focuser in communication with the audio activity localizer and the beamformer, the lobe auto-focuser configured to:
receive the coordinates of the new sound activity and the metric associated with the new sound activity;
determine whether the metric associated with the new sound activity is greater than or equal to a metric threshold;
when it is determined that the metric associated with the new sound activity is greater than or equal to the metric threshold:
determine a lobe region that the coordinates of the new sound activity is within, wherein the lobe region comprises an existing lobe and the existing lobe comprises one of the one or more lobes;
determine whether the coordinates of the new sound activity are near the existing lobe, based on the coordinates of the new sound activity and a parameter associated with the existing lobe and the lobe region;
when it is determined that the coordinates of the new sound activity are near the existing lobe:
restrict the update of the location of the existing lobe to limited coordinates within the lobe region around the existing lobe, wherein the limited coordinates are based on the coordinates of the new sound activity and the parameter associated with the existing lobe and the lobe region; and
transmit the limited coordinates to the beamformer to cause the beamformer to update the location of the existing lobe to the limited coordinates.

15. The system of claim 14:
wherein the parameter comprises a look radius in the lobe region around the existing lobe, the look radius comprising a space around the location of the existing lobe where the new sound activity can be considered; and
wherein the lobe auto-focuser is further configured to determine whether the coordinates of the new sound activity are near the existing lobe by determining whether the coordinates of the new sound activity are within the look radius.

16. The system of claim 14:
wherein the parameter comprises a move radius in the lobe region, the move radius comprising a maximum distance from the location of the existing lobe that the existing lobe is permitted to move; and
wherein the limited coordinates comprise:
the coordinates of the new sound activity, when the coordinates of the new sound activity are within the move radius; or
the move radius, when the coordinates of the new sound activity are outside the move radius.

17. The system of claim 14:
wherein the parameter comprises a boundary cushion in the lobe region, the boundary cushion comprising a maximum distance from the location of the existing lobe that the existing lobe is permitted to move towards a boundary of a neighboring lobe region; and
wherein the limited coordinates comprise:
the coordinates of the new sound activity, when the coordinates of the new sound activity are outside of the boundary cushion; or
a location outside of the boundary cushion, when the coordinates of the new sound activity are within the boundary cushion.

18. The system of claim 17, wherein the boundary of the neighboring lobe region comprises a set of points that is equally distant from the location of the existing lobe and a location of a neighboring lobe associated with the neighboring lobe region.

19. The system of claim 14:
wherein the metric comprises a confidence score of the new sound activity; and
wherein the lobe auto-focuser is configured to determine whether the metric associated with the new sound activity is greater than or equal to the metric threshold by determining whether the confidence score of the new sound activity is greater than or equal to the metric threshold.

20. The system of claim 19, wherein the confidence score denotes one or more of a certainty of the coordinates of the new sound activity or a quality of the new sound activity.

21. The system of claim 14, wherein the lobe auto-focuser is configured to determine the lobe region that the coordinates of the new sound activity is within by determining the existing lobe that is near the new sound activity which is associated with the lobe region, based on a distance of the coordinates of the new sound activity from the system.

22. The system of claim 14, wherein the lobe region comprises a space around the location of the existing lobe that is closer to the existing lobe than to the location of any other of the one or more lobes.

23. The system of claim 14, wherein the lobe auto-focuser is further configured to calculate the lobe region associated with each of the one or more lobes based on a definition received through a user interface.

24. The system of claim 14:

further comprising an activity detector in communication with a far end and the lobe auto-focuser, the activity detector configured to:

receive a remote audio signal from the far end;

detect an amount of activity of the remote audio signal; and transmit the detected amount of activity to the lobe auto-focuser; and wherein the lobe auto-focuser is further configured to:

when the amount of activity of the remote audio signal exceeds a predetermined threshold, inhibit the lobe auto-focuser from performing the steps of determining whether the metric associated with the new sound activity is greater than or equal to the metric threshold, determining the lobe region that the coordinates of the new sound activity is within, determining whether the coordinates of the new sound activity are near the existing lobe, restricting the update of the location of the existing lobe to the limited coordinates within the lobe region around the existing lobe, and transmitting the coordinates of the new sound activity to the beamformer.

* * * * *